US008010095B2

(12) United States Patent
Natsuno et al.

(10) Patent No.: US 8,010,095 B2
(45) Date of Patent: *Aug. 30, 2011

(54) SYSTEM FOR MANAGING PROGRAM APPLICATIONS STORABLE IN A MOBILE TERMINAL

(75) Inventors: Takeshi Natsuno, Tokyo (JP); Masaaki Yamamoto, Yokohama (JP); Satoshi Washio, Tokyo (JP); Hiroshi Kawabata, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 634 days.

This patent is subject to a terminal disclaimer.

(21) Appl. No.: 12/117,541

(22) Filed: May 8, 2008

(65) Prior Publication Data

US 2008/0214167 A1 Sep. 4, 2008

Related U.S. Application Data

(63) Continuation of application No. 10/333,678, filed as application No. PCT/JP02/04643 on May 14, 2002, now Pat. No. 7,379,731.

(30) Foreign Application Priority Data

May 14, 2001 (JP) ................................. 2001-143810

(51) Int. Cl.
*H04M 3/00* (2006.01)
(52) U.S. Cl. .................. 455/418; 455/550.1; 455/412.1; 711/170; 714/42
(58) Field of Classification Search .................. 455/418, 455/550.1, 412.1; 711/170; 714/42
See application file for complete search history.

(56) References Cited

U.S. PATENT DOCUMENTS

| 6,031,568 | A | * | 2/2000 | Wakitani | ........................ 348/169 |
| 6,035,423 | A | | 3/2000 | Hodges et al. | ................... 714/38 |
| 6,052,684 | A | | 4/2000 | Du | ..................... 707/8 |
| 6,275,570 | B1 | * | 8/2001 | Homan et al. | ............. 379/88.17 |
| 6,378,069 | B1 | | 4/2002 | Sandler et al. | ................ 713/153 |
| 6,385,606 | B2 | | 5/2002 | Inohara et al. | .................... 707/4 |

(Continued)

FOREIGN PATENT DOCUMENTS

CN 1219076 A 6/1999

(Continued)

OTHER PUBLICATIONS

U.S. Office Action in U.S. Appl. No. 12/117,554 dated Dec. 2, 2009 (9 pgs.).

(Continued)

*Primary Examiner* — Danh Le
(74) *Attorney, Agent, or Firm* — Brinks Hofer Gilson & Lione

(57) ABSTRACT

Management server 16 may obtain application programs from content server 20 in response to requests of mobile terminal 11. Management server 16 may transmit the obtained application programs to mobile terminal 11 with information concerning reliabilities of the application programs. After mobile terminal 11 receives the application programs from management server 16, mobile terminal 11 manages operations of the application programs. Operations of the application programs are coordinated with operations of other programs using the information concerning the reliabilities corresponding to the application programs. Management of the coordinated operations of the application programs avoids problems concerning information security, where valuable information may be distributed unexpectedly because of operations of low reliable application programs. As a result, convenience of users of mobile terminals 11 can be improved without deteriorating the information security of mobile terminals 11.

9 Claims, 41 Drawing Sheets

U.S. PATENT DOCUMENTS

| | | | |
|---|---|---|---|
| 6,418,326 B1 | 7/2002 | Heinonen et al. | 455/558 |
| 6,434,364 B1 | 8/2002 | O'Riordain | 455/67.1 |
| 6,453,468 B1 * | 9/2002 | D'Souza | 717/168 |
| 6,496,979 B1 | 12/2002 | Chen et al. | 717/178 |
| 6,691,114 B1 | 2/2004 | Nakamura | 707/10 |
| 6,757,710 B2 | 6/2004 | Reed | 709/203 |
| 6,879,891 B1 * | 4/2005 | Bederna | 701/29 |
| 6,954,932 B2 | 10/2005 | Nakamura et al. | 719/313 |
| 7,010,314 B1 | 3/2006 | Taillens | 455/518 |
| 7,089,427 B1 | 8/2006 | Takata et al. | 713/193 |
| 7,379,731 B2 | 5/2008 | Natsuno et al. | 455/412.1 |
| 7,478,136 B2 | 1/2009 | Yamada et al. | 709/207 |
| 7,706,786 B2 | 4/2010 | Natsuno et al. | 455/418 |
| 7,742,756 B2 | 6/2010 | Natsuno et al. | 455/412.1 |
| 2001/0046854 A1 | 11/2001 | Henry et al. | 455/419 |
| 2002/0029197 A1 | 3/2002 | Kailamaki et al. | 705/40 |
| 2002/0032754 A1 | 3/2002 | Logston et al. | 709/219 |
| 2002/0049931 A1 * | 4/2002 | Goto | 714/42 |
| 2002/0053011 A1 | 5/2002 | Aiken et al. | 711/710 |
| 2002/0095454 A1 | 7/2002 | Reed et al. | 709/201 |
| 2002/0123329 A1 | 9/2002 | Murray | 455/414 |
| 2002/0143901 A1 | 10/2002 | Lupo et al. | 709/219 |
| 2002/0144108 A1 | 10/2002 | Benantar | 713/156 |
| 2002/0150243 A1 | 10/2002 | Craft et al. | 380/201 |
| 2002/0194242 A1 | 12/2002 | Chandrasekaran et al. | 709/101 |
| 2002/0194551 A1 * | 12/2002 | Mueller et al. | 714/48 |
| 2003/0053448 A1 | 3/2003 | Craig et al. | 370/353 |
| 2003/0135536 A1 | 7/2003 | Lyons | 709/103 |
| 2008/0222162 A1 | 9/2008 | Natsuno et al. | 707/10 |
| 2008/0222411 A1 | 9/2008 | Natsuno et al. | 713/153 |
| 2008/0235359 A1 | 9/2008 | Natsuno et al. | 709/220 |
| 2009/0327825 A1 | 12/2009 | Natsuno et al. | 714/748 |

FOREIGN PATENT DOCUMENTS

| | | |
|---|---|---|
| EP | 0 778 522 A2 | 11/1997 |
| EP | 0 811 942 A2 | 12/1997 |
| EP | 0 813 132 A2 | 12/1997 |
| EP | 0 813 133 A2 | 11/1998 |
| EP | 0 875 815 A2 | 11/1998 |
| EP | 1 130 495 A2 | 9/2001 |
| GB | 2 332 126 A | 6/1999 |
| JP | H2-122330 | 10/1990 |
| JP | 06-500878 | 1/1994 |
| JP | 06-195217 | 7/1994 |
| JP | H8-249312 | 9/1996 |
| JP | H9-244900 | 9/1997 |
| JP | 10-069382 | 3/1998 |
| JP | 10-078867 | 3/1998 |
| JP | 10-260873 | 9/1998 |
| JP | 11-085686 | 3/1999 |
| JP | 11-212770 | 8/1999 |
| JP | 2000-010782 | 1/2000 |
| JP | 2000-029672 | 1/2000 |
| JP | 2000-293584 | 10/2000 |
| JP | 2000-305776 | 11/2000 |
| JP | 2001-028786 | 1/2001 |
| JP | 2001-117885 | 4/2001 |
| JP | 2001-125791 | 5/2001 |
| KR | 1999-29292 | 4/1999 |
| KR | 1999-0033432 | 5/1999 |
| WO | WO 97/16938 | 5/1997 |
| WO | WO 00/42498 | 7/2000 |
| WO | WO 00/62290 | 10/2000 |

OTHER PUBLICATIONS

U.S. Appl. No. 12/117,589, filed May 8, 2008, Natsuno et al.
Office Action dated Jun. 2, 2009, for U.S. Appl. No. 12/117,554, 13 pgs.
International Search Report, International Application No. PCT/JP02/04643.
European Search Report dated Mar. 14, 2008, for European Patent Application No. 02769588.1.
European Office Action dated Aug. 5, 2008.
European Office Action issued in European Application No. 02769588.1 on Jul. 13, 2010 (6 pgs).
U.S. Office Action in U.S. Appl. No. 12/117,589, dated Jan. 14, 2011 (27 pgs.).
U.S. Office Action in U.S. Appl. No. 12/117,569, dated Jan. 19, 2011 (27 pgs.).
European Search Report issued in European Application No. 10179312.3 on Jan. 20, 2011 (5 pgs).
U.S. Office Action in U.S. Appl. No. 12/117,589, dated Jun. 22, 2011 (19 pgs.).
U.S. Office Action in U.S. Appl. No. 12/117,569, dated Jun. 29, 2011 (21 pgs.).

* cited by examiner

FIG. 7

| MEMORY AREA | | IDENTIFICATION NUMBER OF APPLICATION | ACTIVATION | STORAGE NUMBER |
|---|---|---|---|---|
| DOWNLOADED APPLICATION AREA | MANAGEMENT AREA | 1 | AP-2568 | Yes | — |
| | | 2 | AP-0123 | No | — |
| | | 3 | AP-1015 | Yes | — |
| | | ⋮ | ⋮ | ⋮ | ⋮ |
| | | n | UNUSED | — | — |
| | FREE AREA | 1 | F-0325 | Yes | — |
| | | 2 | F-7485 | Yes | — |
| | | 3 | UNUSED | — | — |
| | | ⋮ | ⋮ | ⋮ | ⋮ |
| | | m | UNUSED | — | — |
| DOWNLOAD-READY APPLICATION AREA | | 1 | AP-4125 | — | T-7851 |
| | | 2 | F-5963 | — | T-3256 |
| | | 3 | AP-3021 | — | DELETED |
| | | 4 | AP-4513 | — | — |
| | | 5 | UNUSED | — | — |
| | | 6 | UNUSED | — | — |
| | | 7 | UNUSED | — | — |
| | | 8 | UNUSED | — | — |
| | | 9 | UNUSED | — | — |
| | | ⋮ | ⋮ | ⋮ | ⋮ |

FIG. 8

| IDENTIFICATION NUMBER OF APPLICATION | RELIABILITY INDEX | PUBLICATION | COLLECTION OF USAGE CHARGES | STORAGE LOCATION INFORMATION |
|---|---|---|---|---|
| AP-2568 | 3 | Yes | Yes | APPLICATION ITSELF IS STORED |
| AP-3712 | 5 | Yes | No | ftp://ftp.abc_software.com/application/ap_0306.exe |
| AP-4513 | 2 | No | Yes | APPLICATION ITSELF IS STORED |
| AP-3021 | 1 | No | No | ftp://ftp.software_world.com/software/app_view.exe |
| F-3251 | 0 | — | — | ftp://ftp.softpocket.com/root/app/miracle.exe |
| ... | ... | ... | ... | ... |

FIG. 9

| STORAGE NUMBER | |
|---|---|
| T-1025 | APPLICATION ITSELF IS STORED |
| T-7851 | APPLICATION ITSELF IS STORED |
| T-3639 | APPLICATION ITSELF IS STORED |
| T-7142 | APPLICATION ITSELF IS STORED |
| T-3256 | APPLICATION ITSELF IS STORED |
| ... | ... |

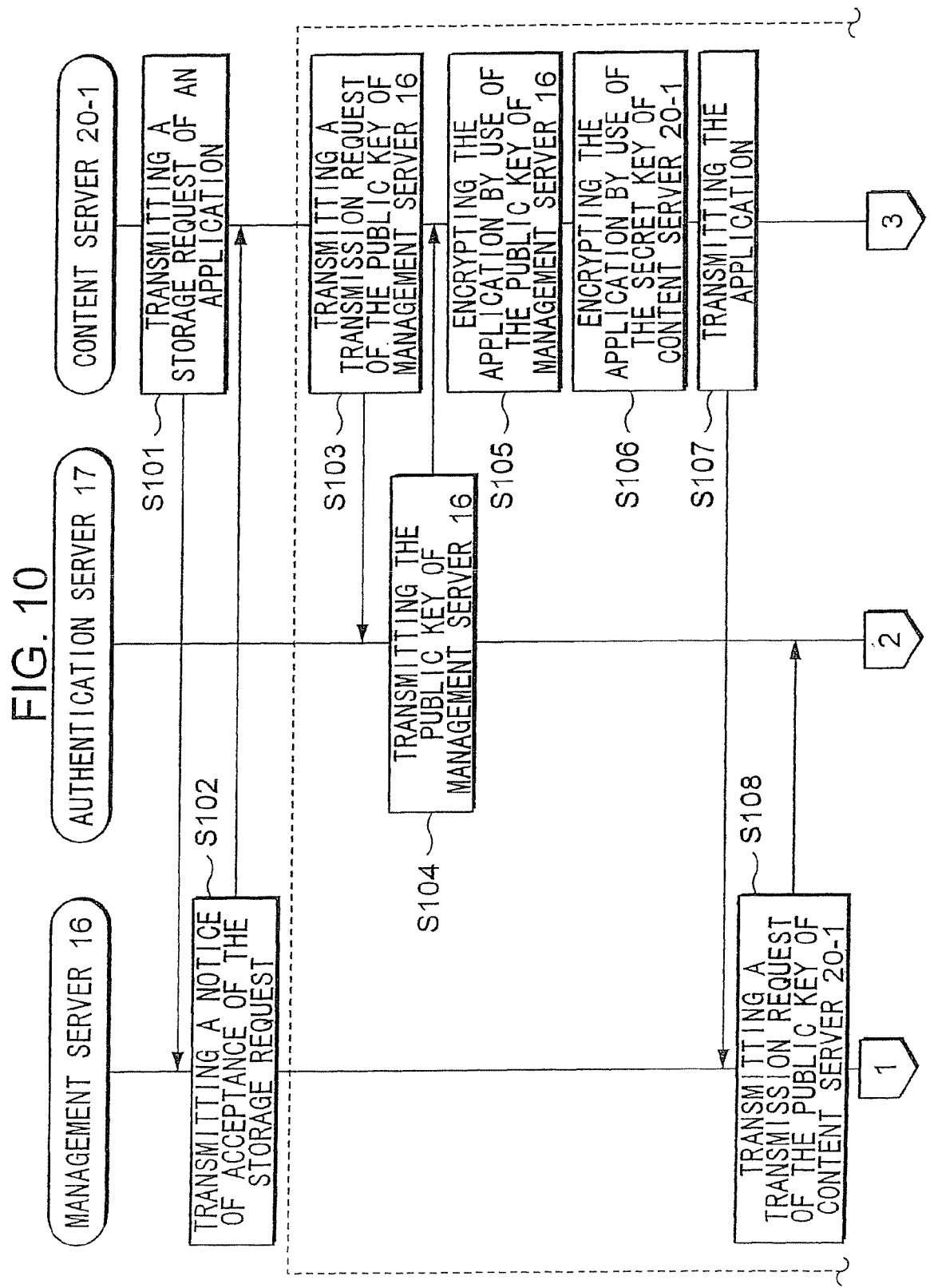

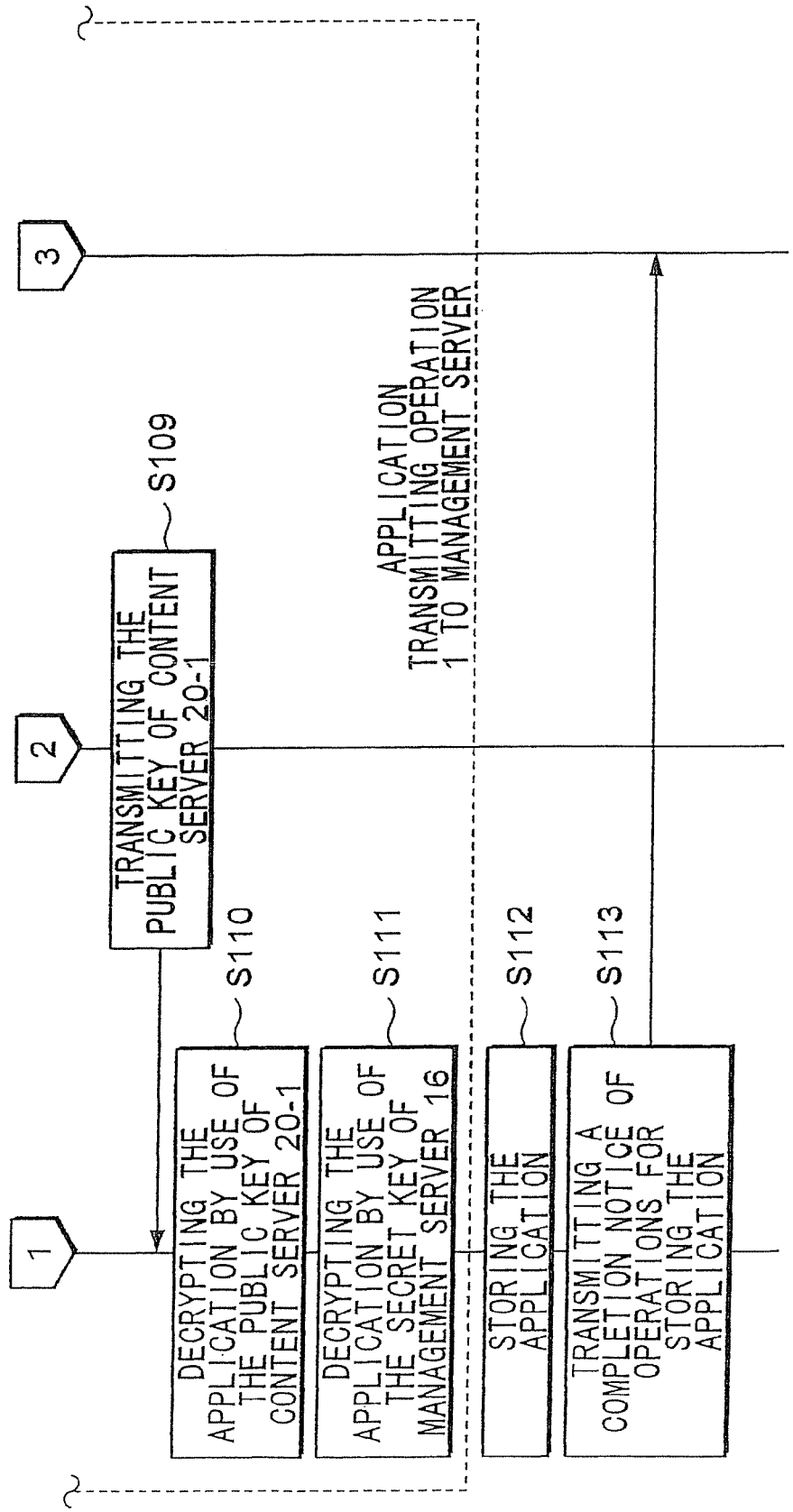

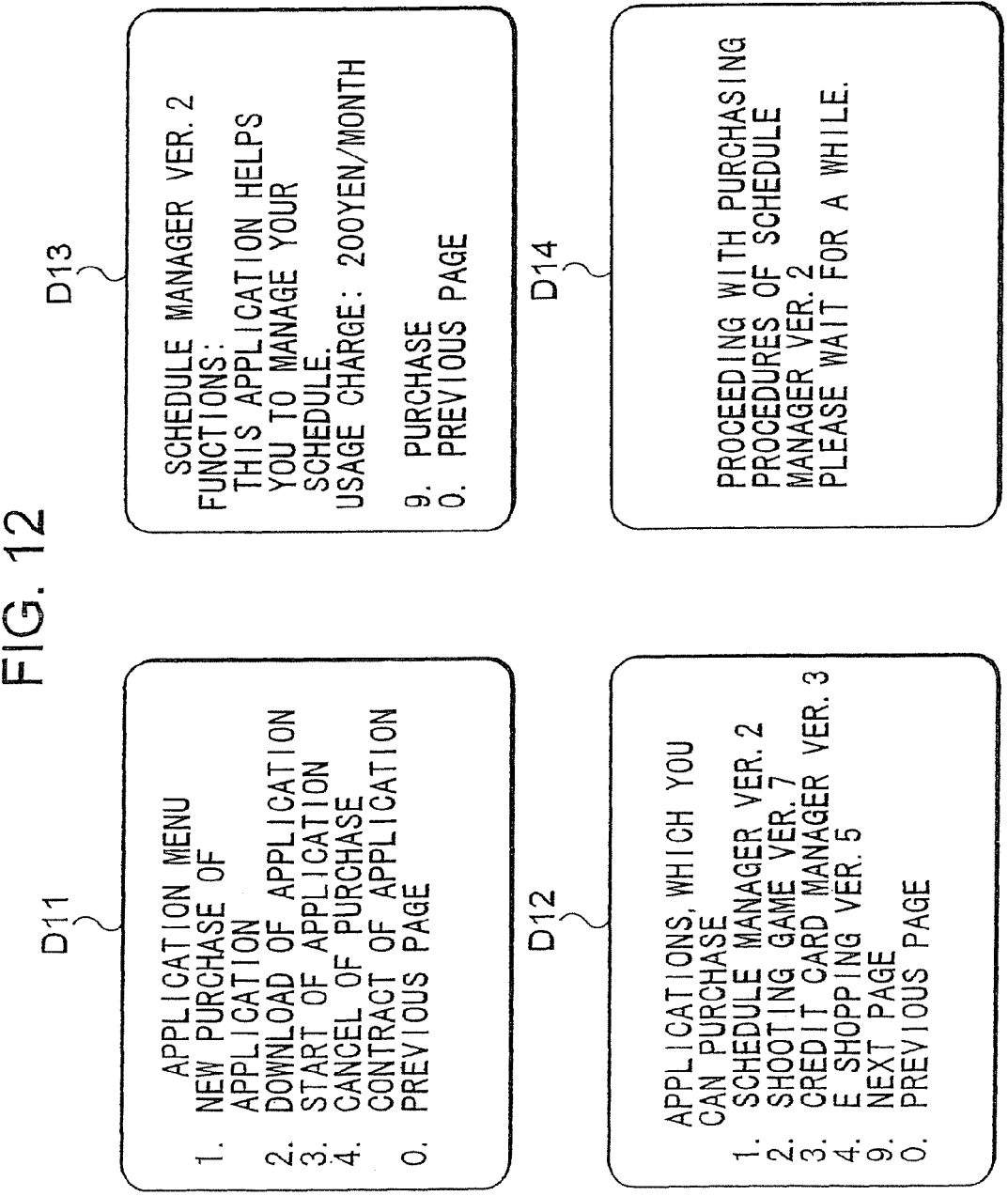

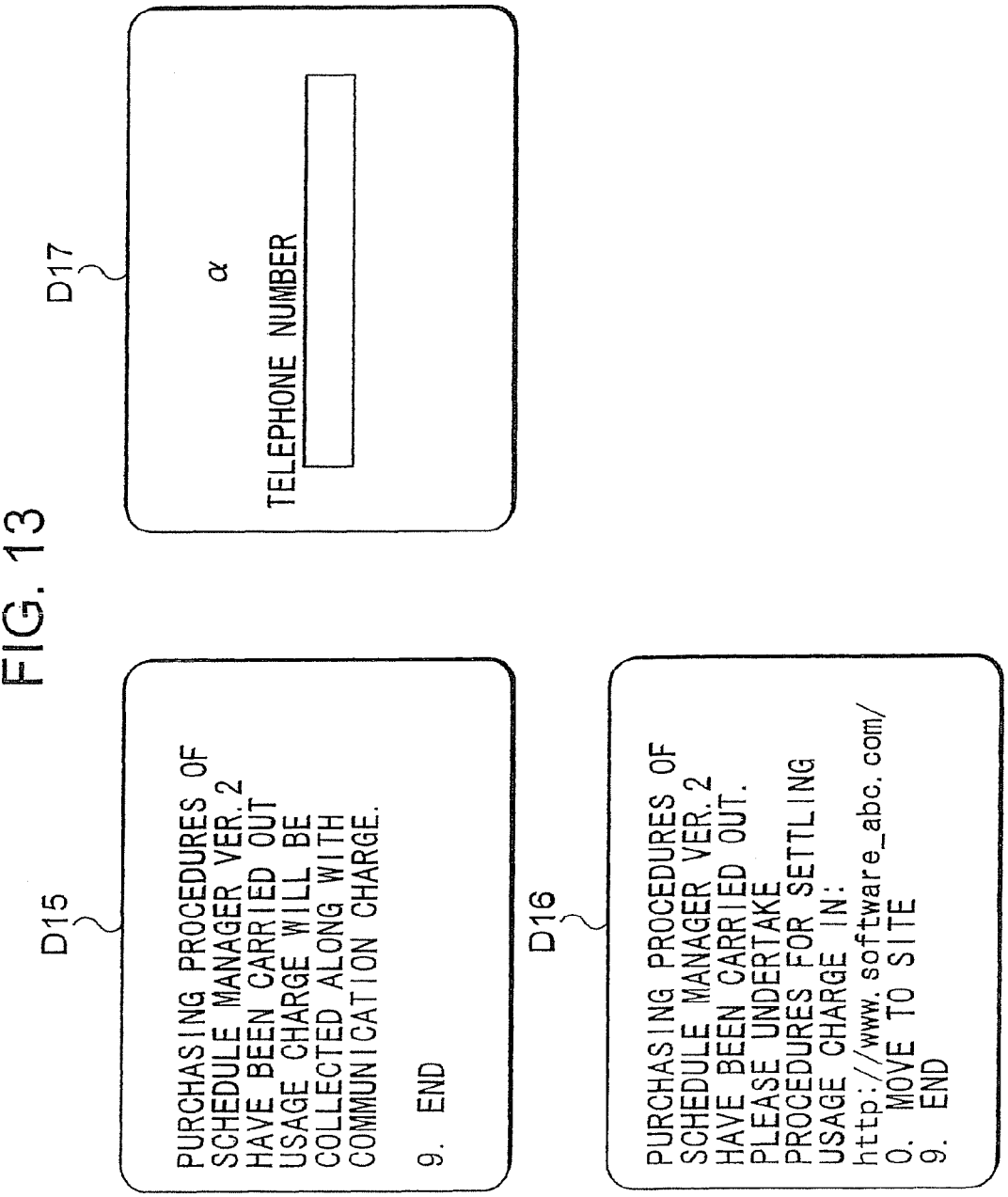

FIG. 22

D25: PROCEEDING DOWNLOADING PROCEDURES OF SCHEDULE MANAGER VER.2 PLEASE WAIT FOR A WHILE.

D26: TELEPHONE NUMBER

FIG. 31
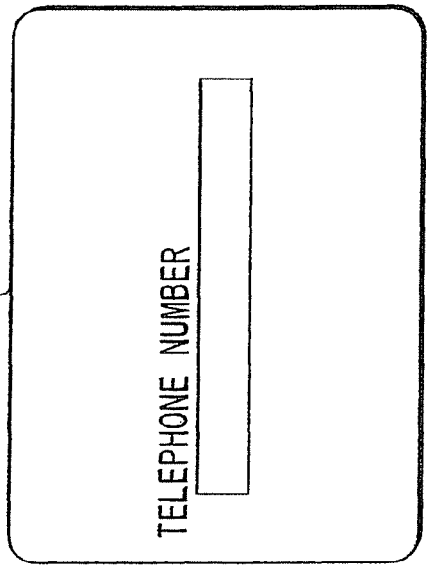
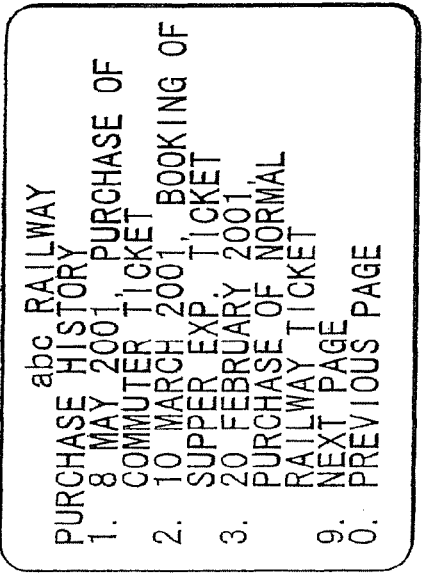
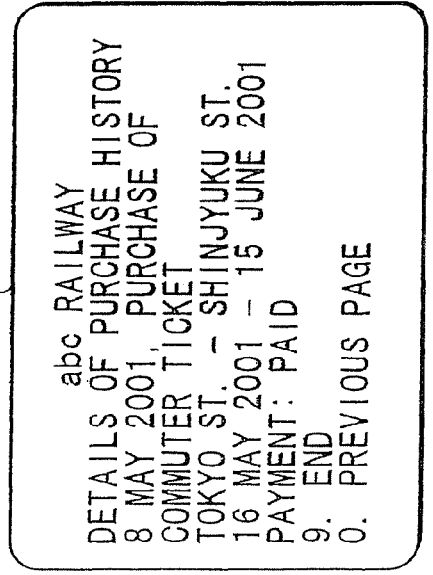

FIG. 33

D75
CYBER SHOP zz
PLEASE SELECT A METHOD OF
SETTLEMENT OF PAYMENT.
1. SETTLEMENT APP. xx BANK
3. CREDIT APP. cc CREDIT
   CO.
2. OTHERS
0. PREVIOUS PAGE

D77
xx BANK
PLEASE CONFIRM INFORMATION
FOR REMITTANCE.
SENDING FROM: xx BANK SAVING
ACC. 54987625
BENEFICIARY: CYBER SHOP zz
nn BANK SAVING ACC.
41256378
MOUNT: 5,000 YEN
9. EXECUTION
0. PREVIOUS PAGE

D76
xx BANK
SAVING ACC. 54987625
PASSWORD [           ]
9. EXECUTION
0. PREVIOUS PAGE

D78
CYBER SHOP zz
PAYMENT PROCEDURES HAVE BEEN
CARRIED OUT.
PURCHASED COMMODITY WILL BE
DELIVERED ON 1 MAY 2001.
ORDER NO.: 987-654-191
THANK YOU.
9. END
0. PREVIOUS PAGE

FIG. 35

| REQUEST FROM AP-3568 ||| REQUEST TO AP-3568 |||
| READING APPLICATION | READING DATA | EDITING DATA | DELETING DATA | READING APPLICATION | READING DATA | EDITING DATA | DELETING DATA |
|---|---|---|---|---|---|---|---|
| AP-3712 | AP-8125 | AP-1346 | AP-2349 | AP-4315 | AP-1523 | AP-2349 | AP-3125 |
| AP-0123 | AP-5724 | AP-2349 | AP-1272 | AP-2349 | AP-0312 | AP-8125 | AP-6789 |
| ... | ... | ... | ... | ... | ... | ... | ... |

FIG. 36

| IDENTIFICATION NUMBER OF APPLICATION | RELIABILITY RELATED INFORMATION ||||| PUBLICATION | COLLECTION OF USAGE CHARGES | STORAGE LOCATION INFORMATION |
| --- | --- | --- | --- | --- | --- | --- | --- |
| | READING APPLICATION | READING DATA | EDITING DATA | DELETING DATA | | | |
| AP-2568 | AP-4315 AP-2349 ... | AP-1523 AP-0312 ... | AP-2349 AP-8125 ... | AP-3125 AP-6789 ... | Yes | Yes | APPLICATION ITSELF IS STORED |
| AP-3712 | AP-2436 AP-9870 ... | AP-1297 AP-0879 ... | AP-2635 AP-8187 ... | AP-3251 AP-6789 ... | Yes | No | ftp://ftp.abc_software.com/application/ap_0306.exe |
| AP-4513 | AP-9870 AP-1121 ... | AP-9009 AP-0012 ... | AP-7614 AP-8198 ... | AP-1231 AP-6763 ... | No | Yes | APPLICATION ITSELF IS STORED |
| AP-3021 | AP-4121 AP-5454 ... | AP-1231 AP-8192 ... | AP-1213 AP-8125 ... | AP-9809 AP-1265 ... | No | No | ftp://ftp.software_world.com/software/app_view.exe |
| F-3251 | — | — | — | — | — | — | ftp://ftp.softpocket.com/root/app/miracle.exe |
| ... | ... | ... | ... | ... | ... | ... | ... |

FIG. 37

| IDENTIFICATION NUMBER OF APPLICATION | RELIABILITY INDEX | COLLECTION OF USAGE CHARGES | STORAGE LOCATION INFORMATION | |
|---|---|---|---|---|
| AP-2568 | 3 | Yes | ftp://ftp.neonetwonk.com/public/apbinder.exe | MESSAGE DIGEST |
| AP-3712 | 5 | No | ftp://ftp.abc_software.com/application7/ap_0306.exe | MESSAGE DIGEST |
| AP-4513 | 2 | Yes | ftp://ftp.humantec.com/mobile/application007.jar | MESSAGE DIGEST |
| AP-3021 | 1 | No | ftp://ftp.software_world.com/software/app_view.exe | MESSAGE DIGEST |
| F-3251 | 0 | — | ftp://ftp.softpocket.com/root/app/miracle.exe | MESSAGE DIGEST |
| ... | ... | ... | ... | ... |

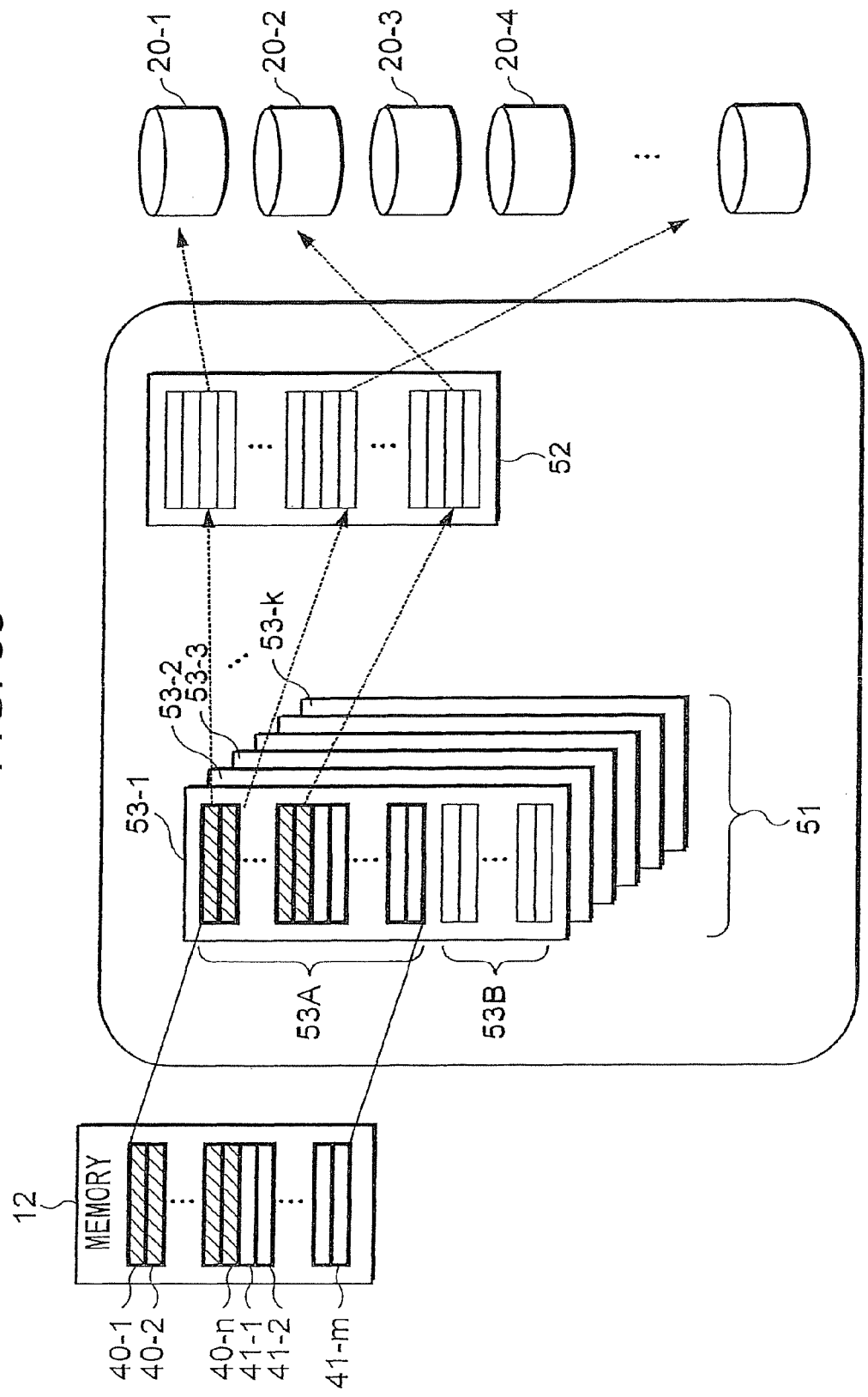

FIG. 39

| | MEMORY AREA | | IDENTIFICATION NUMBER OF APPLICATION | ACTIVATION |
|---|---|---|---|---|
| DOWNLOADED APPLICATION AREA | MANAGEMENT AREA | 1 | AP-2568 | Yes |
| | | 2 | AP-0123 | No |
| | | 3 | AP-1015 | Yes |
| | | ⋮ | ⋮ | ⋮ |
| | | n | UNUSED | — |
| | FREE AREA | 1 | F-0325 | Yes |
| | | 2 | F-7485 | Yes |
| | | 3 | UNUSED | — |
| | | ⋮ | ⋮ | ⋮ |
| | | m | UNUSED | — |
| DOWNLOAD-READY APPLICATION AREA | | 1 | AP-4125 | — |
| | | 2 | F-5963 | — |
| | | 3 | AP-3021 | — |
| | | 4 | AP-4513 | — |
| | | 5 | UNUSED | — |
| | | 6 | UNUSED | — |
| | | 7 | UNUSED | — |
| | | 8 | UNUSED | — |
| | | 9 | UNUSED | — |
| | | ⋮ | ⋮ | ⋮ |

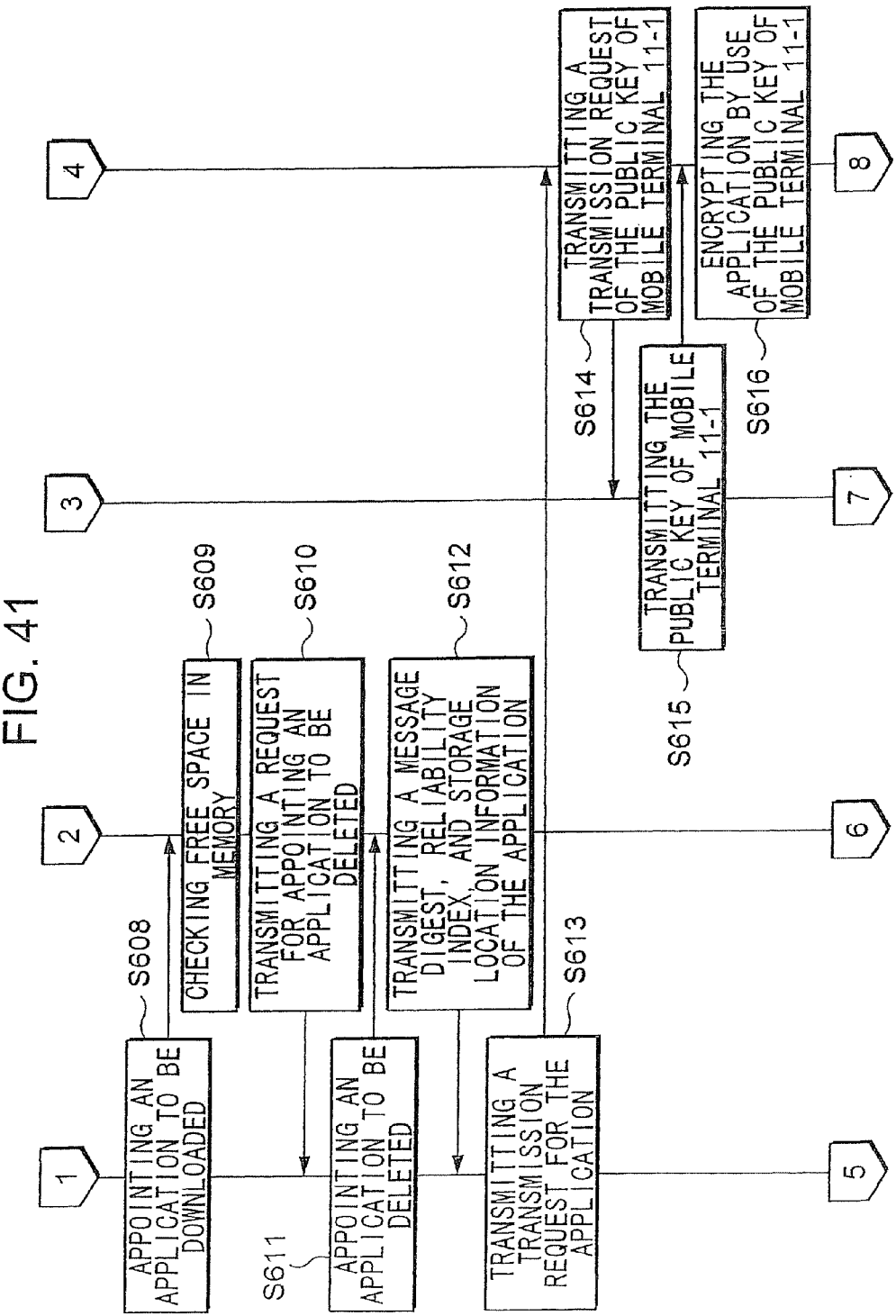

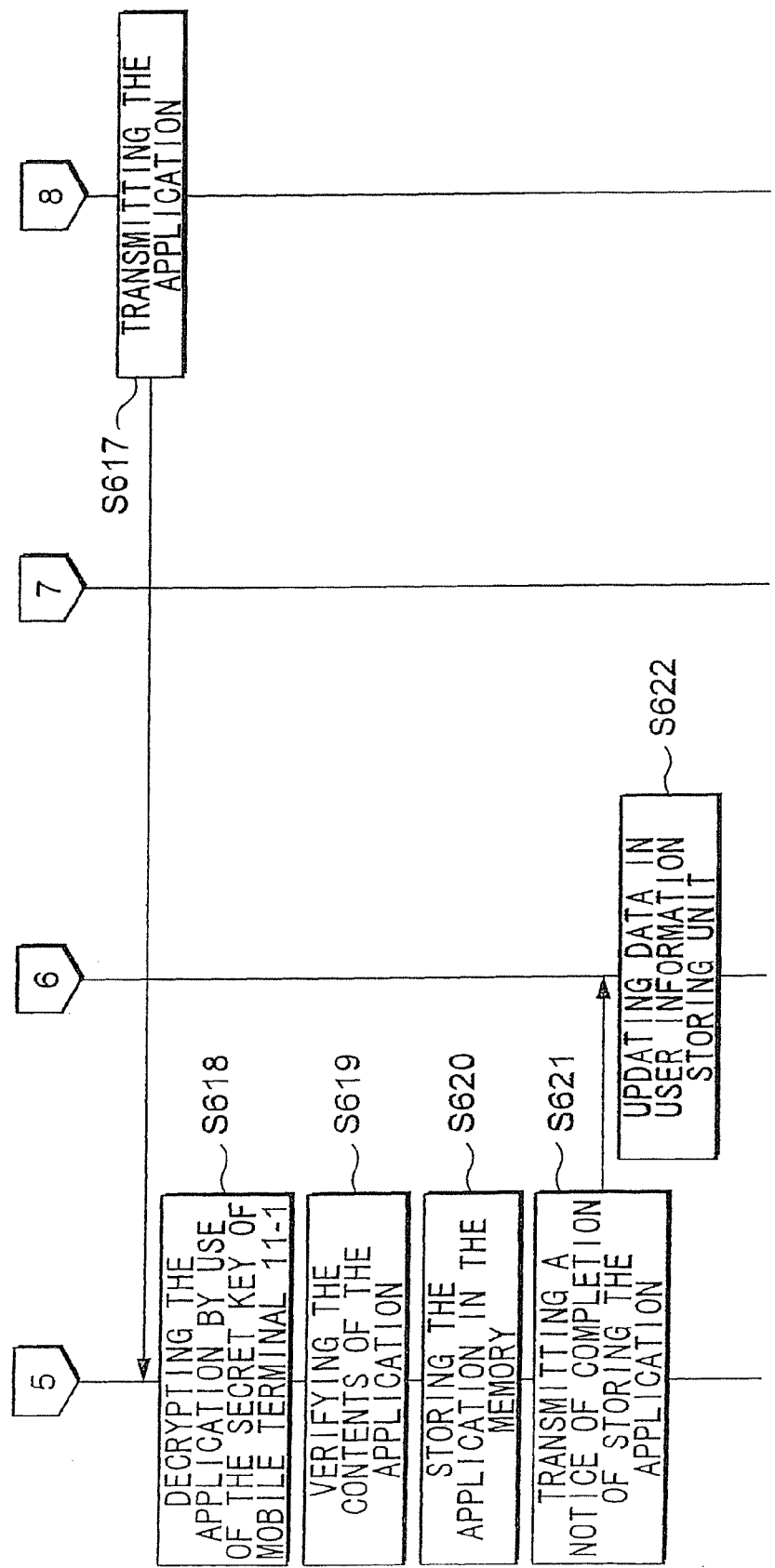

SYSTEM FOR MANAGING PROGRAM APPLICATIONS STORABLE IN A MOBILE TERMINAL

RELATED APPLICATIONS

This application is a continuation of U.S. patent application Ser. No. 10/333,678,filed Jan. 22, 2003,which is a U.S. National Stage of International Patent Application Ser. No. PCT/JP02/04643,filed May 14, 2002,which claims the benefit of the filing date under 35 U.S.C. §119(a)-(d) of Japanese Application Ser. No. JP 2001-143810, filed May 14, 2001, all of which are incorporated by reference.

TECHNICAL FIELD

The present invention relates to a system for managing programs that are storable in a storage unit, which is installed in, or attached to, a mobile terminal.

BACKGROUND ART

In recent years, mobile terminals equipped with nonvolatile memories of comparatively large storage capacity have been developed for storing application programs. The mobile terminals can execute application programs stored in the nonvolatile memory. These application programs may not be stored in the nonvolatile memory when the mobile terminals are purchased by their users. The users of the mobile terminals can delete unnecessary application programs from the nonvolatility memories, and write other application programs into the nonvolatility memories. Therefore, a user of a mobile terminal can use new application programs without replacing an old mobile terminal with a new mobile terminal.

In some mobile terminals that can write application programs into the memories, Java virtual machines are installed. Mobile terminals in which Java virtual machines are installed can download Java application programs (including Java applets) through mobile communication networks. In addition, the mobile terminals can write the downloaded Java application programs into their nonvolatility memories, and execute the programs. (Application programs including applets are referred to as "applications" hereinafter.)

The above-mentioned mobile terminals can be inconvenient to use in situations where their users want to access several applications in a series of operations. For example, a user of a mobile terminal needs to access application A for making an application for purchasing commodities by mail order, and application B for making the payment for the purchases. In the present example, the user first makes an application for the purchase of a certain commodity using application A. At this stage, the user has not yet made the payment for the purchased commodity. To make the payment, the user writes down on a piece of paper the necessary information for making the payment, namely the amount, the name of the bank to which the money is to be remitted, the bank account details for making the remittance, and so on. The user then terminates application A.

Next, the user accesses application B to remit the funds to make the payment. By using application B, the user can remit the desired amount of funds from a certain bank account of the user to any appointed bank account. The user refers to the information that was previously written on the piece of paper and inputs the payment amount, the name of the bank, the bank account details for the remittance, and so on, into the mobile terminal. The mobile terminal then executes application B. The user terminates application B, and starts application A again to confirm that the remittance was done successfully and that all the procedures for purchasing the merchandise have been completed. The user inputs a command so that the mobile terminal, which is executing application A, displays a screen showing the commodity purchase history. The user confirms that the remittance for the purchased commodity has been confirmed by the seller, and at the same time, the user gets some additional information such as the date of delivery of the commodity, etc.

As the above-mentioned example describes, users of mobile terminals need to change applications and input necessary data manually when users need to make several applications using a series of operations. As a result, the operations take time and the users may feel the operations bothersome. In addition, mistakes may occur while inputting information, which can cause problems in conducting business.

SUMMARY

To overcome the inconvenience of the prior art, which is mentioned above, several applications may be pre-stored in the non-volatile memories of mobile terminals. The mobile terminals are thus enabled to execute coordinated operations. However, if functions or data of an application are used for another application without any restriction, it will not be possible to maintain information security.

For example, a mobile terminal stores application C for managing schedules of users of mobile terminals and application D for transmitting and receiving emails. Application C manages information concerning the schedule of the user of a mobile terminal, which the user would like to keep private. If application D is permitted to use the functions or data of application C without any restriction, however, the schedule of the user may not remain private. For example, when the user uses application D to send emails to his/her friends, there is a risk that the information concerning the schedule which is managed by application C can be transmitted to his/her friends.

Transmission by default of information that should be kept private can take place, due to trifling operational mistakes or bugs in application D. Therefore security of information cannot be ensured for users of mobile terminals when using multiple applications. Undesirable distribution of information, as well as, destruction of information, unauthorized rewriting of information, and so on, are serious problems, especially in the case of mobile terminals that may handle valuable information, such as personal information and monetary information.

In the presently preferred embodiments, in order to ensure security in communication, the reliability of applications may first be determined. Information concerning the reliability of each application may be prepared in advance of deployment of the applications. In addition, the operations of each of the applications that are related to one another may be managed on the basis of information concerning their reliability. Namely, applications that are judged, after adequate evaluation, to be highly reliable, and known not to cause problems in handling important information can be permitted to use functions and data of applications judged to be of lower reliability. On the other hand, applications with low reliability can be prevented from using functions or data of applications of high reliability. As a result, accidental distribution (leaking), or destruction of data of high reliability applications due to handling of such data by applications with low reliability, can be prevented.

To be more precise, the present invention provides a method for managing programs. The method comprises: a program-obtaining step of a mobile terminal obtaining a first program. The first program can be executed by the mobile terminal. In addition, the method includes storing the first program in a memory of the mobile terminal. The method also includes a coordination information-obtaining step of the mobile terminal for obtaining coordination information. The coordination information is used for managing the start of a second program by the first program, communication of data with the second program and/or storing the coordination information in a memory of the mobile terminal. The method further includes an operation-managing step of the mobile terminal for determining conditions for the start of the second program and/or communication of data with the second program. Communication of data with the second program may be on the basis of the coordination information that corresponds to the first program, when the second program is requested to execute an operation while the first program is under execution.

The present invention also provides a program management system. The program management system comprises a communication network that contains a delivering server, a managing server, and a mobile terminal. The delivery server comprises a program-storing unit for storing a program, and a program-transmitting unit for transmitting the program to the mobile terminal. The managing server comprises a coordination information-storing unit for storing coordination information. The coordination information may involve the control of the coordinated operations of the program and another program. The managing server also comprises a coordination information-transmitting unit for transmitting the coordination information to the mobile terminal.

The mobile terminal comprises a program-receiving unit for receiving the program from the delivering server and a coordination information-receiving unit for receiving the coordination information from the managing server. In addition, the mobile terminal comprises a program-storing unit for storing the program, a coordination information-storing unit for storing the coordination information, and an operation-managing unit. The operation-management unit may be for determining conditions for the start of the other program and/or the communication of data with the other program. Communication of data with the other program may occur on the basis of the coordination information that corresponds to the program, when the other program is requested to execute an operation while the program is under execution.

The present invention also provides a server for a communication network. The server comprises: a coordination information-storing unit for storing coordination information. The coordination information is used to determine conditions for the start of a program and/or communication of data with the program when the program is requested to execute an operation while another program is under execution. The server also comprises a coordination information-transmitting unit for transmitting the coordination information to the mobile terminal.

The present invention also provides a mobile terminal comprising a program-storing unit for storing a first program. In addition, the mobile terminal comprises a coordination information-storing unit for storing coordination information concerning control of coordinated operations of the first program and a second program. The mobile terminal also includes an operation-managing unit for determining conditions of the start of the second program and/or the communication of data with the second program. Communication of data with the second program may be on the basis of the coordination information when the second program is requested to execute an operation while the first program is under execution.

The present invention also provides a program and a record medium containing the program. The program permits a computer of a managing server to manage programs in a communication network that contains a mobile terminal. The program also permits the computer to transmit coordination information. The coordination information is used in the mobile terminal for determining conditions for the start of a program and/or communication of data with the program. When the program is requested to execute an operation while another program, other than the program, is under execution by the mobile terminal.

The present invention also provides a program and a record medium containing the program. The program permits a computer of a mobile terminal to obtain coordination information concerning control of coordinated operations of programs. The program also permits determination of conditions to start a program and/or to communicate data with the program when the program is requested to execute an operation while another program, which is other than the program, is under execution.

According to the program management method, the program management system, the server, the mobile terminal, the program, and the record medium, previously discussed, the operations of a plurality of programs that are executed in a mobile terminal are coordinated. The operations of the programs are coordinated on the basis of coordination information according to the reliability of each program. As a result, deterioration of information security caused by undesirable distribution (leakage) of information, etc. is prevented when the operation of the programs is coordinated.

These and other features and advantages of the invention will become apparent upon consideration of the following detailed description of the presently preferred embodiments, viewed in conjunction with the appended drawings. The foregoing discussion has been provided only by way of introduction. Nothing in this section should be taken as a limitation on the following claims, which define the scope of the invention.

BRIEF DESCRIPTION OF THE DRAWINGS

FIG. 7 is a format chart showing an example of data stored by a user information-storing unit illustrated in FIGS. 5 and 6 according to the first embodiment and the second embodiment of the present invention.

FIG. 8 is a format chart showing an example of data stored in a registration application area of an application information-storing unit illustrated in FIGS. 5 and 6 according to the first embodiment of the present invention.

FIG. 9 is a format chart showing an example of data stored in a temporary custody application area of an application information-storing unit illustrated in FIGS. 5 and 6 according to the first embodiment and the second embodiment of the present invention.

FIG. 10 and FIG. 11 are flowcharts showing an application-storing operation by a management server illustrated in FIG. 1 according to the first embodiment and the second embodiment of the present invention.

FIG. 12 and FIG. 13 are images showing screens, which are displayed in a mobile terminal when an application, which is publicized by a management server, is purchased according to the first embodiment and the second embodiment of the present invention.

FIG. 21 and FIG. 22 are images showing screens, which are displayed in a mobile station when an application is downloaded according to the first embodiment and the second embodiment of the present invention.

FIG. 27, FIG. 28, FIG. 29, FIG. 30, and FIG. 31 are images showing screens, which are displayed in a mobile station when a plurality of applications do not execute with coordinated operations according to the first embodiment of the present invention.

FIG. 32, FIG. 33, and FIG. 34 are images showing screens, which are displayed in a mobile station when a plurality of applications execute coordinated operations according to the first embodiment of the present invention.

FIG. 35 is a format chart showing an example of authorization information between applications according to the second embodiment of the present invention.

FIG. 36 is a format chart showing an example of data stored in a registration application area of an application information-storing unit illustrated in FIGS. 5 and 6 according to the second embodiment of the present invention.

FIG. 37 is a format chart showing an example of data stored in a registration application area of an application information-storing unit illustrated in FIG. 5 according to the third embodiment of the present invention.

FIG. 38 is a diagram showing a configuration of an application information management system illustrated in FIGS. 1, 3 and 5 according to the third embodiment of the present invention.

FIG. 39 is a format chart showing an example of data stored by a user information-storing unit illustrated in FIGS. 5 and 38 according to the third embodiment of the present invention.

FIG. 40, FIG. 41, and FIG. 42 is a flowchart showing an application purchasing operation and an application downloading operation in the application delivery system illustrated in FIG. 1 according to the third embodiment of the present invention.

DETAILED DESCRIPTION OF THE PRESENTLY PREFERRED EMBODIMENTS

[1] First Embodiment

Figure 1:
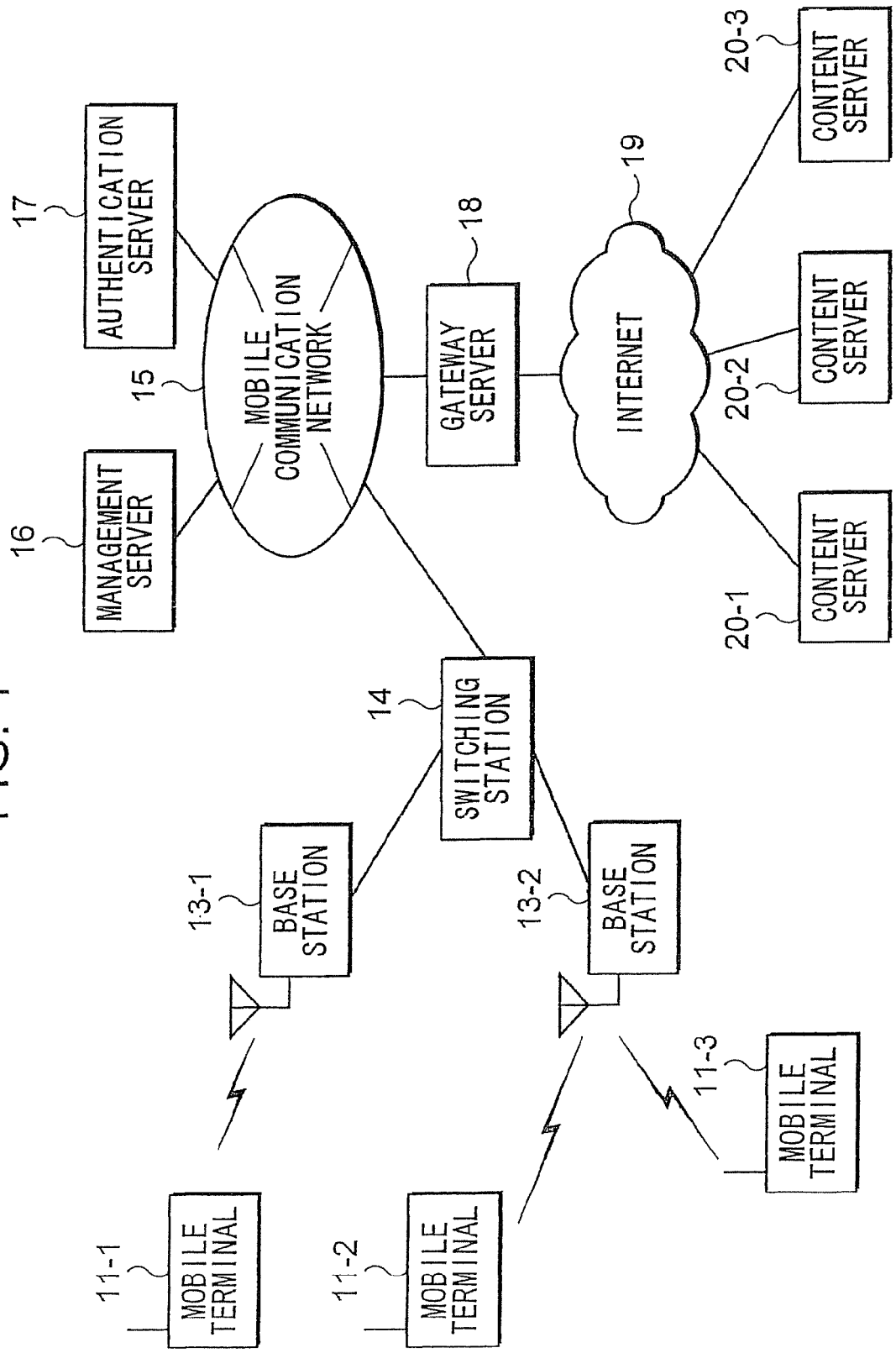
FIG. 1 is a block diagram showing an overall configuration of an application delivery system according to the first embodiment and the second embodiment of the present invention.

[1.1] Configuration
[1.1.1] Overall Configuration of Application Delivery System FIG. 1 is a block diagram, which shows the outline of the overall configuration of an example application delivery system in the embodiments of the present invention.

The application delivery system comprises a plurality of mobile terminals namely, mobile terminals 11-1, 11-2, . . . , a plurality of base stations namely, base stations 13-1, 13-2, . . . , a plurality of switching stations 14, mobile communication network 15, management server 16, authentication server 17, gateway server 18, Internet 19, and a plurality of content servers namely, content servers 20-1, 20-2, . . . . . Each mobile terminal is referred to as "mobile terminal 11", each base station is referred to as "base station 13", each content server is referred to as "content server 20", hereafter respectively, if there is no need to distinguish them from other apparatuses of the same kind.

Mobile terminal 11 is an information processing apparatus having a wireless communication function such as a mobile phone and a Personal Handyphone System (PHS®). Mobile terminal 11 is equipped with a built-in nonvolatile memory or an external nonvolatile memory that can store applications. Mobile terminal 11 may download applications from management server 16 through mobile communication network 15, switching station 14, and base station 13. In addition, mobile terminal 11 may write the downloaded applications into a memory, such as a nonvolatile memory. A user of mobile terminal 11 can execute, at any time according to the user's choice, the applications written into the nonvolatile memory of mobile terminal 11.

Base station 13 is connected by communication cables through switching station 14 to mobile communication network 15. When mobile terminal 11, which is located in a radio zone assigned to base station 13, makes a call to mobile communication network 15, or mobile communication network 15 makes a call to mobile terminal 11, base station 13 may establish a wireless connection with mobile terminal 11. In addition, base station 13 may relay communication between mobile terminal 11 and mobile communication network 15. Base station 13 may also keep track of the existence of each of mobile terminals 11 in the assigned radio zone. Tracking of mobile terminals 11 may involve frequent radio communication of control signals to each of mobile terminals 11. The base station 13 may transmit the information of the existence of mobile terminals 11 as positional information of mobile terminals 11 to mobile communication network 15.

Switching station 14 is connected to base station 13 and to mobile communication network 15 by communication cables. Switching station 14 may establish a communication channel between mobile terminal 11 and mobile communication network 15 using the wireless connection established with base station 13. Moreover, when mobile terminal 11, which has established a communication connection with mobile communication network 15, moves from one radio zone managed by one of switching stations 14 to another radio zone managed by another of switching stations 14, switching stations 14 may execute a switching operation of communication connections between switching stations to maintain the established communication connection.

Mobile communication network 15 is a communication network comprising switching stations 14 that may be mutually connected through gateway switching station (not shown) by communication cables. Mobile communication network 15 may establish communication channels between mobile terminals 11 through switching stations 14 and base stations 13. Mobile communication network 15 may also be connected to other communication networks (not shown), such as a fixed telephone network. Moreover, mobile communication network 15 may be connected to Internet 19 through gateway server 18.

Mobile communication network 15 may also be equipped with position registration memory units (not shown). The position registration memory units may store the positional information of mobile terminals 11 that is transmitted by each of base stations 13. When mobile communication network 15 makes a call to mobile terminal 11, mobile communication network 15 may transmit a connection request to base station 13. The base station 13 can establish a wireless connection with mobile terminal 11 by referring to the information stored by the position registration memory units.

Management server 16 is a server for delivering applications to mobile terminals 11 in response to requests from mobile terminals 11. Management server 16 may receive applications from content servers 20. Content servers 20 are providers of the applications. Management server 16 may store the received applications in a database, before the applications are delivered to mobile terminals 11.

An administration entity of management server 16 may examine applications provided by content server 20, if an administration entity of content server 20 requests the administration entity of management server 16 to do so. Based on the examination, the administration entity of management server 16 may determine a reliability index of each of the applications. The reliability index may be determined from the view point of security of the operation of the application in mobile terminal 11, and so on. The determined reliability indexes may be recorded in a database of management server 16. When management server 16 receives a request from mobile terminal 11 for transmission of an application that has a reliability index, management server 16 may transmit the reliability index to mobile terminal 11 along with the application.

If mobile terminal 11 uses an application, the application is first purchased, downloaded to mobile terminal 11, and activated. Activation involves placing the application into a state where it becomes usable (the operation to activate an application is referred to as 'activation operation' hereinafter). When management server 16 receives a request for purchasing an application from mobile terminal 11, management server 16 may prepare a transmission of the requested application. When the application is downloaded to mobile terminal 11, management server 16 may appoint an area for storing the application in the memory of mobile terminal 11. In addition, management server 16 may permit mobile terminal 11 to store the application in the area. Moreover, management server 16 may instruct mobile terminal 11 to execute an activation operation for the application.

When management server 16 completes the preparation of transmission of an application or an activation operation of an application, management server 16 may transmit billing information concerning these operations to a charge management server (not shown) that is connected to mobile communication network 15. After the charge management server 16 receives the billing information concerning completion of the preparation of transmission or an activation operation from management server 16, the charge management server may calculate the usage charges of the application for mobile terminal 11 on the basis of the information.

Authentication server 17 is a server that manages public keys of mobile terminals 11, management server 16, content servers 20, and authentication server 17 in a public key system. When authentication server 17 receives a request for a public key from any of mobile terminals 11, management server 16, or content servers 20, authentication server 17 may transmit the public key that is requested to the apparatus that requested the public key.

Content server 20 stores one or several applications that are developed according to the specifications of mobile terminal 11. Content server 20 may transmit the applications to management server 16 in response to requests for the applications made by management server 16. The administration entity of content server 20 can transmit the applications to the administration entity of management server 16 for carrying out examinations of the contents of the applications if necessary. Based on the results of the examinations, reliability indexes of the applications may be obtained from the administration entity of management server 16.

[1.1.2] Configuration of Mobile Terminal

Figure 2:
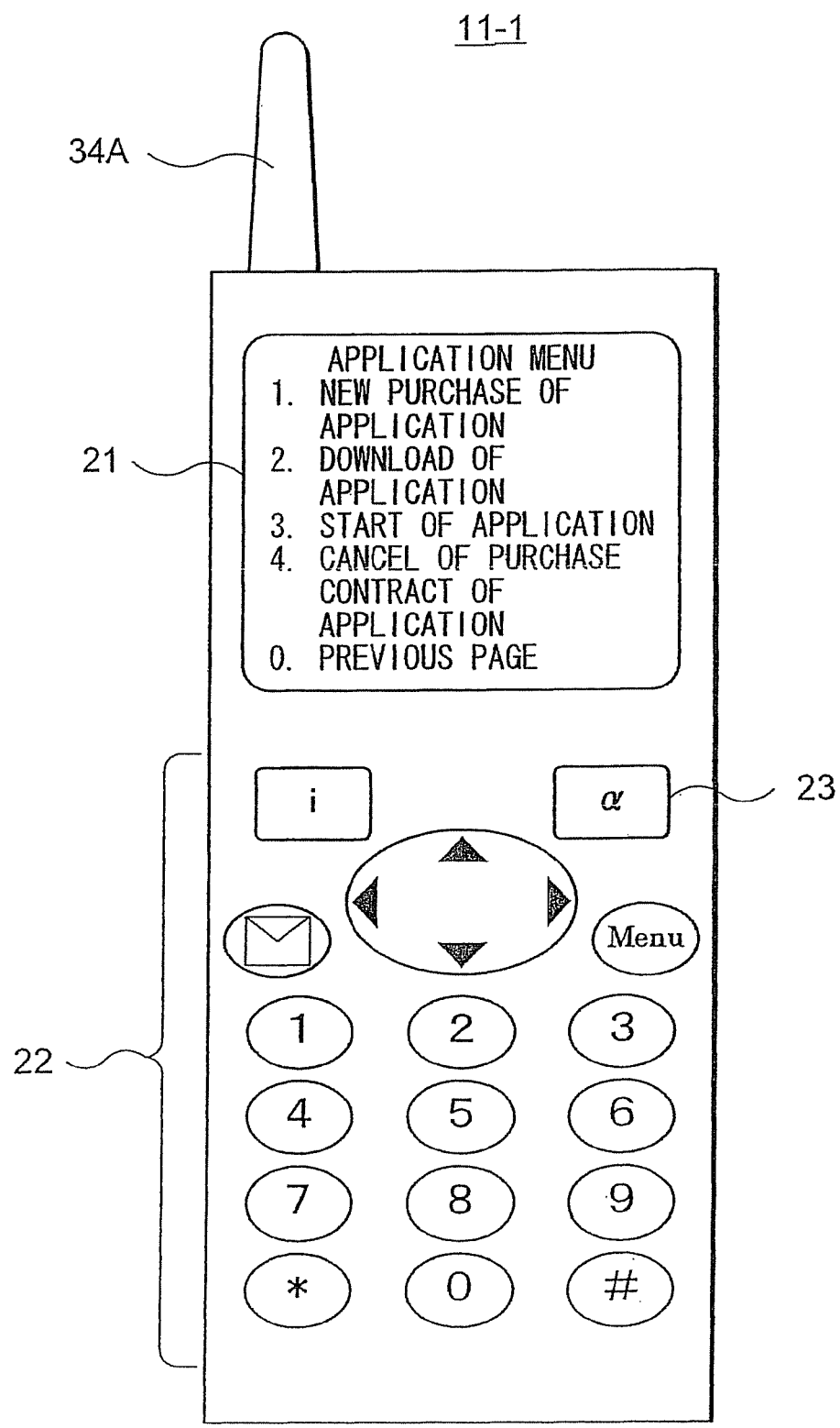
FIG. 2 is an external view of a mobile terminal illustrated in FIG. 1 according to the first embodiment and the second embodiment of the present invention.
Figure 3:
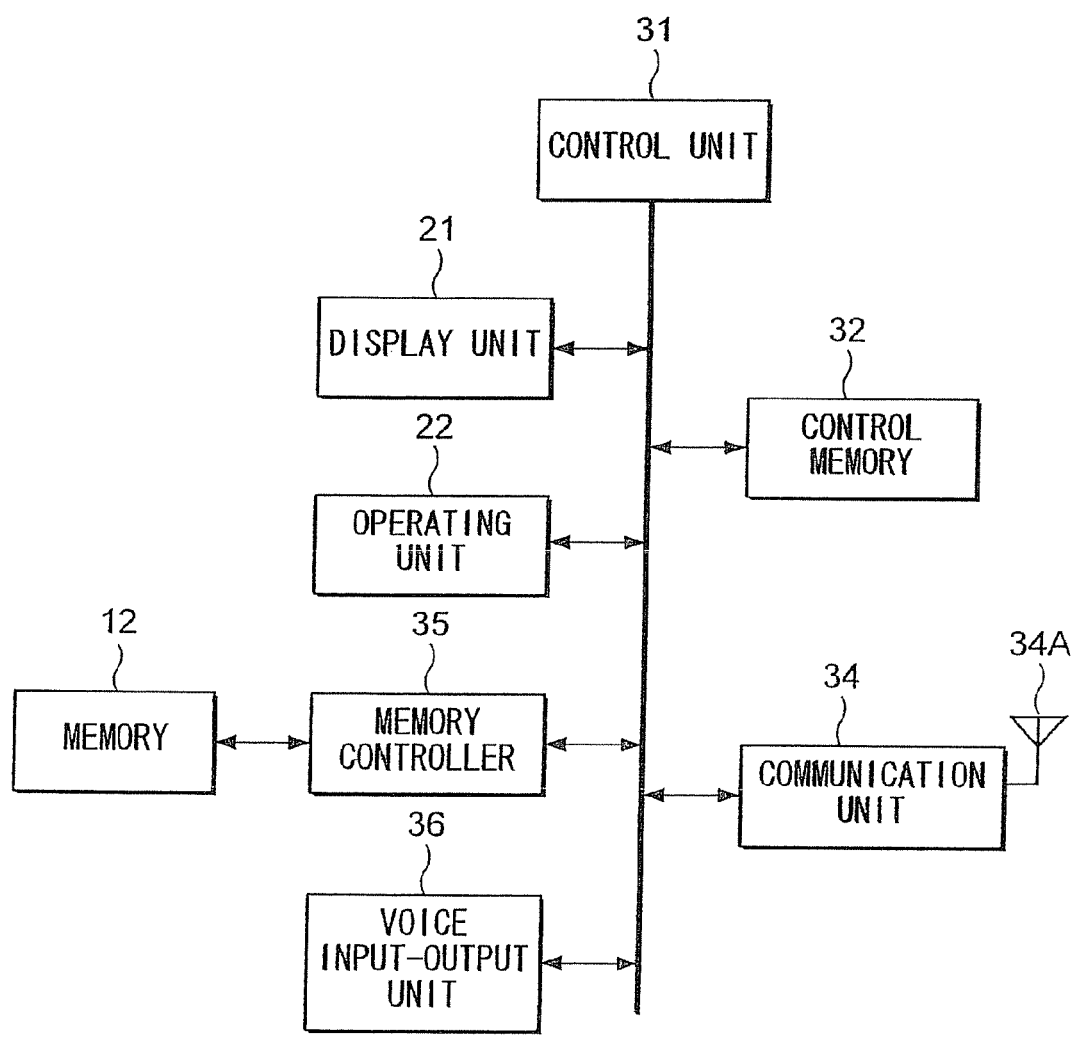
FIG. 3 is a block diagram showing a general outline of a configuration of a mobile terminal illustrated in FIG. 1 according to the first embodiment and the second embodiment of the present invention.

Following is a description of a configuration of mobile terminal 11 that uses mobile terminal 11-1 as an example of mobile terminals 11. FIG. 2 is an example external view of mobile terminal 11-1, and FIG. 3 is a block diagram showing the outline of an example configuration of mobile terminal 11-1. As shown in FIG. 3, mobile terminal 11-1 comprises display unit 21, operating unit 22, antenna 34A, control unit 31, control memory 32, communication unit 34, memory controller 35, memory 12, and voice input-output unit 36.

Display unit 21 is a component that may be used by the control unit 31 of mobile terminal 11-1 to display messages to a user of mobile terminal 11-1. Display unit 21 may display an operation menu screen for execution of applications as shown in FIG. 2. In addition, display unit 21 may display menu screens for other kinds of operations, browser screens for displaying information received from information sites, and/or various kinds of information such as strength of a radio wave and/or telephone numbers.

Operating unit 22 is a component that provides instructions to control unit 31. Operating unit 22 may be equipped with operation buttons, on which symbols such as numbers are printed, and an appli-button 23. Appli-button 23 is an operation button to which functions for simplifying operations of applications may be assigned.

Antenna 34A is a component that may physically output and input radio waves when mobile terminal 11-1 executes a wireless communication. Control unit 31 may be a microprocessor that controls all other components of mobile terminal 11-1 except memory 12. Control unit 31 may control each of the components according to the control programs. The control programs may be stored in control memory 32. Moreover, control unit 31 may read applications out from memory 12 through memory controller 35, and may execute the applications. Control unit 31 can also use functions or data of an application stored in memory 12 in response to requests made by a control program or another application that is being executed. In such a case, control unit 31 may transmit a request for permission to use the functions or the data, as well as identification information of the control program or the application that made the request to memory controller 35. Memory controller 35 may use the identification information to determine if the request should be accepted. Control unit 31 can execute several control programs and applications at the same time, but control unit 31 does not allow any data to be passed between the control programs and the applications directly. Instead, all data is passed through memory controller 35.

Control memory 32 may be a volatility memory or a non-volatile memory in which control programs of control unit 31 and data managed by the control programs are stored. Control memory 32 may also be used as a work area for control unit 31 to execute the control programs. The control programs may include several programs that may realize basic functions of mobile terminal 11-1 such as memorizing telephone numbers that are installed when mobile terminal 11-1 is sold.

Communication unit 34 is a component that transmits to and receives signals from base station 13. The signals may be transmitted and received in a radio wave through antenna 34A. When mobile terminal 11-1 transmits information to base station 13, communication unit 34 modulates base band signals using signals containing digital data. The signals may be transmitted under the control of control unit 31. The control unit 31 may direct transmission of the signals as radio wave signals to base station 13 by impressing voltages corresponding to the modulated signals on antenna 34A. On the other hand, when communication unit 34 receives radio wave signals from base station 13 through antenna 34A, communication unit 34 may demodulate the received radio wave signals to retrieve applications or data contained in the radio wave signals. If the retrieved data is an application, communication unit 34 may transmit the received application to memory controller 35. If the retrieved data is digital voice data, communication unit 34 may transmit the voice data to voice input and output unit 36. Otherwise, communication unit 34 may transmit the retrieved data to control unit 31.

Voice input and output unit 36 may input and output voice data when the user of mobile terminal 11-1 has conversations with users of other mobile terminals 11, or users of fixed telephones, and so on. Voice input and output unit 36 comprises a microphone (not shown), an A/D converter (not shown), a D/A converter (not shown), and a speaker (not shown). When the user of mobile terminal 11-1 talks, voice input and output unit 36 may receive voice information of the user of mobile terminal 11-1 through the microphone as analogue signals. The received analogue signals may be converted to digital voice data by the A/D converter. The digital voice data may be transmitted to communication unit 34. On the other hand, when a conversation partner of the user of mobile terminal 11-1 talks, voice input and output unit 36 may convert digital voice data that may be provided by communication unit 34 into analogue signals with the D/A converter. In addition, the voice input and output unit 36 may makes sounds with the speaker using the analogue signals.

Memory controller 35 may be a microprocessor that controls transmission and reception of data between memory 12 and control unit 31, and between memory 12 and communication unit 34. When communication unit 34 transmits an application, memory controller 35 may write the application into memory 12. A request for permission to write the application into memory 12 that may be made by management server 16 and data indicating a memory area in memory 12 where the application should be written may be attached to the application transmitted by communication unit 34.

Memory controller 35 may write the application to the memory area that is indicated by the attached data. If an application that memory controller 35 receives from communication unit 34 is given a reliability index that is higher than a certain level, memory controller 35 may receive the reliability index along with the application. In such a case, memory controller 35 may write the reliability index in the same memory area where the application is written.

Memory controller 35 may receive a request for permission to use functions or data of an application written in memory 12 from control unit 31. Namely, the request may be a request for permission to read, a request for permission to write, and/or a request for permission to delete functions or data of an application. Memory controller 35 may determine if the request should be accepted or not, and execute a proper operation to memory 12 on the basis of the determination. The request for permission to use functions or data of an application written in memory 12 may contain identification information of the program that requests the permission.

When memory controller 35 receives a request for permission, memory controller 35 may check the reliability index of the program that made the request. If the program making the request is a control program for managing control unit 31, memory controller 35 may accept the request without any condition, and execute an operation in memory 12 to satisfy the request. The request may be accepted without condition since control programs may be given the highest level of reliability index. On the other hand, if the program that requests the permission is an application read from memory 12, memory controller 35 may determine the memory area where the application is stored in memory 12 according to the identification information. The memory controller may then read out the reliability index given to the application. If the reliability index of the application is not available, memory controller 35 may treat the application as an application with the lowest level of reliability index. The memory controller 35 may also read out the reliability index from the application or the corresponding data of the application that is requested to be used. The reliability index may be read out of the memory area where the application or data is written.

Memory controller 35 may compare the reliability indexes that are obtained as previously explained. When the reliability index of the application that makes the request is of the same level, or a higher level, than the reliability index of the application whose functions or data are requested memory controller 35 may accept the request. Upon acceptance, memory controller 35 may execute the necessary operation(s) in memory 12 according to the request. Operations according to the permission granted based on reliability indexes as mentioned previously are explained using concrete examples later.

Moreover, memory controller 35 may generate a secret key and a public key pair for mobile terminal 11-1. Memory controller 35 may encrypt and decrypt data using the secret key and the public key, respectively. The secret key and public key pair may be generated according to a keyword that is input by the user of mobile terminal 11 under the control of control unit 31. Memory controller 35 may transmit the public key to authentication server 17 through communication unit 34. At the same time, memory controller 35 may take measures to protecting the secret key against undesirable distribution from mobile terminal 11, and then store the secret key. Memory controller 35 may then receive data from an external source through communication unit 34 that is encrypted using the public key of mobile terminal 11-1. Memory controller 35 may decrypt the encrypted data using the stored secret key. When memory controller 35 transmits data from memory 12 to an external body through communication unit 34, memory controller 35 may encrypt the data using the secret key of mobile terminal 11-1 if necessary.

Figure 4:
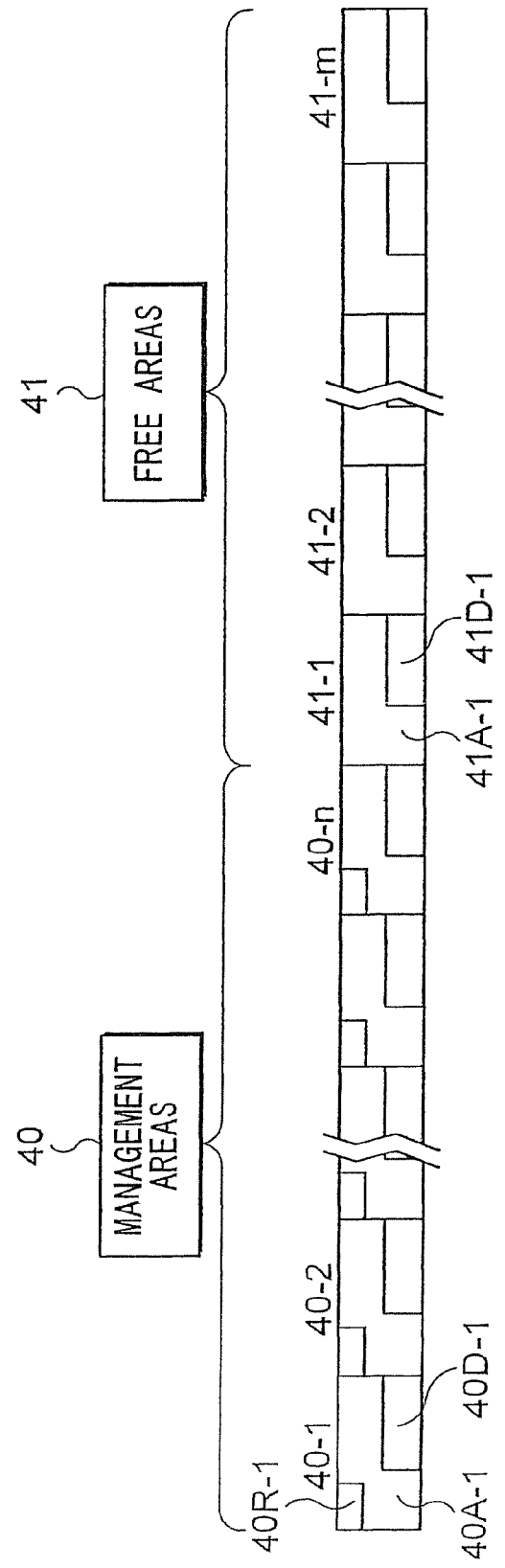
FIG. 4 is a diagram showing data components of memory of the mobile terminal illustrated in FIG. 3 according to the first embodiment and the second embodiment of the present invention.

Memory 12 may be a nonvolatile memory for storing applications that are received from an external source through communication unit 34. Memory 12 may also store data that is managed by the applications. FIG. 4 is a diagram showing an example of data components of memory 12.

Memory 12 may be divided into a plurality of memory areas that are classified into management areas 40 or free areas 41. Management areas 40 may be areas for applications that are given reliability indexes by management server 16 that are of a higher level than a determined level. Free areas 41 are areas for applications that are not given reliability indexes by management server 16 of a level higher than the determined level.

Management areas 40 are composed of management area 40-1, . . . , management area 40-n ("n" is an arbitrary positive integer). Free areas 41 are composed of free area 41-1, . . . , free area 41-m ("m" is an arbitrary positive integer). In the following description, management area 40-1 and free area 41-1 will serve as examples of management areas 40 and free areas 41, respectively.

Management area 40-1 may be divided into application area 40A-1, data area 40D-1, and reliability information area 40R-1. An application may be stored in application area 40A-1. In data area 40D-1, data that is managed by the application stored in application area 40A-1 may be stored. In reliability information area 40R-1, the reliability index that is given to the application stored in application area 40A-1 may be stored.

Free area 41-1 may be divided into application area 41A-1 and data area 41D-1. An application may be stored in application area 41A-1. In data area 41D-1, data that is managed by the application stored in application area 41A-1 may be stored.

The storing operation and deleting operation of the application in application area 40A-1 and application area 41A-1, and the storing operation and deleting operation of reliability index in reliability information area 40R-1, may be executed by memory controller 35 according to instructions provided by management server 16. On the other hand, the reading operation of the application in application area 40A-1 and application area 41A-1, the reading operation of reliability index in reliability information area 40R-1, the writing operation of data in data area 40D-1 and data area 41D-1, the reading operation of data in data area 40D-1 and data area 41D-1, and the deleting operation of data in data area 40D-1 and data area 41D-1 may be executed by memory controller 35 in response to requests made by control unit 31.

[1.1.3] Configuration of Management Server

Figure 5:
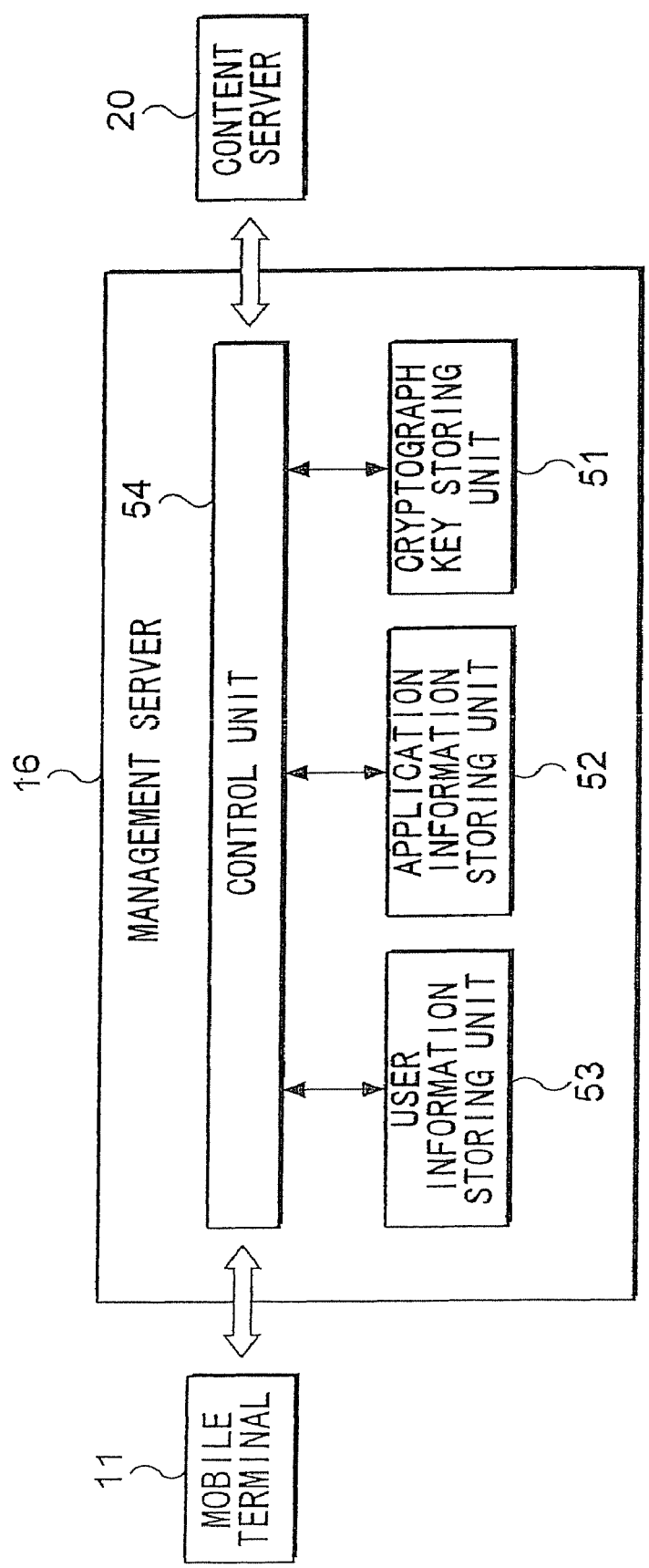
FIG. 5 is a block diagram showing a general outline of a configuration of a management server illustrated in FIG. 1 according to the first embodiment and the second embodiment of the present invention.

FIG. 5 is a block diagram showing a general outline of an example configuration of management server 16. Management server 16 comprises cryptograph key storing unit 51, application information storing unit 52, user information storing unit 53, and control unit 54.

Cryptograph key storing unit 51 may be a unit for storing a secret key of management server 16 generated by control unit 54. In addition, cryptograph key storing unit 51 may store public keys of each of mobile terminals 11 and each of content servers 20. The public keys may be obtained from authentication server 17, in the form of databases.

Application information storing unit 52 may be a unit for storing applications. In addition, information on locations where applications are stored that are transmitted by each of content servers 20 may be stored by application information storing unit 52. The information may be in the form of a database. Application information storing unit 52 may also store any other information related to the applications such as names of the applications.

User information storing unit 53 may be a unit for storing information in a database indicating which applications are written in memories 12 of each of mobile terminals 11. In addition, user information storing unit 53 may store information indicating which applications have been purchased by users of each of mobile terminals 11 and are therefore ready for downloading to memories 12 in response to the users' requests.

Control unit 54 may be a microprocessor that controls each of the components of management server 16. For example, control unit 54 may control operations related to obtaining public keys from authentication server 17, obtaining applications from content servers 20, decrypting applications that are encrypted, encrypting applications that are to be transmitted to mobile terminals 11, and delivering the applications to mobile terminals 11. Moreover, control unit 54 may update the data in the databases of cryptograph key storing unit 51, application information storing unit 52, and user information storing unit 53. Updates to the data may be a result of the control operations of control unit 54. Data formats of each database of management server 16 and details of operations for transmitting applications will be explained later.

[1.1.4] Configuration of Application Information Management System

Figure 6:
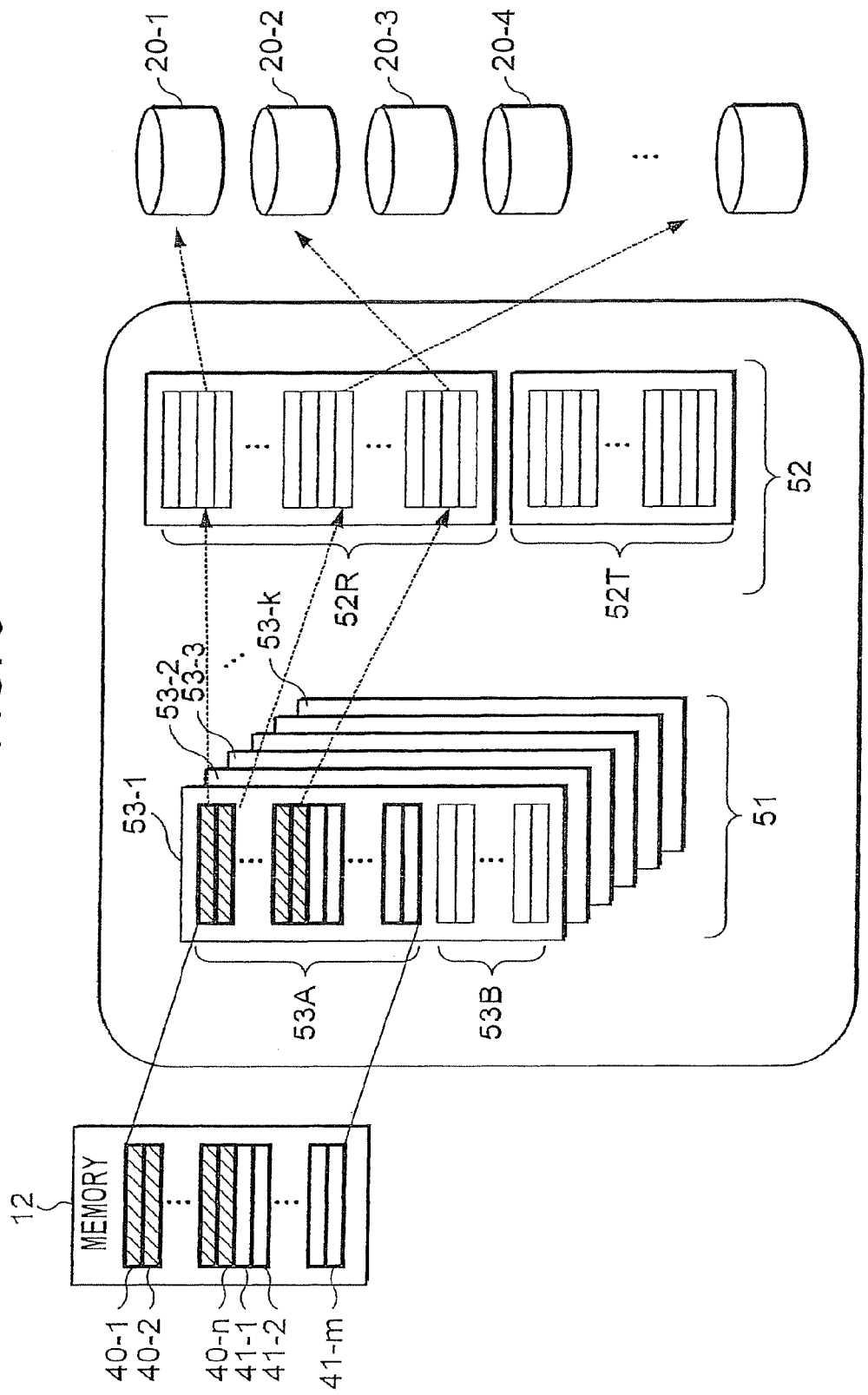
FIG. 6 is a block diagram showing a configuration of an application information management system illustrated in FIGS. 1, 3 and 5 according to the first embodiment and the second embodiment of the present invention.
Figure 14:
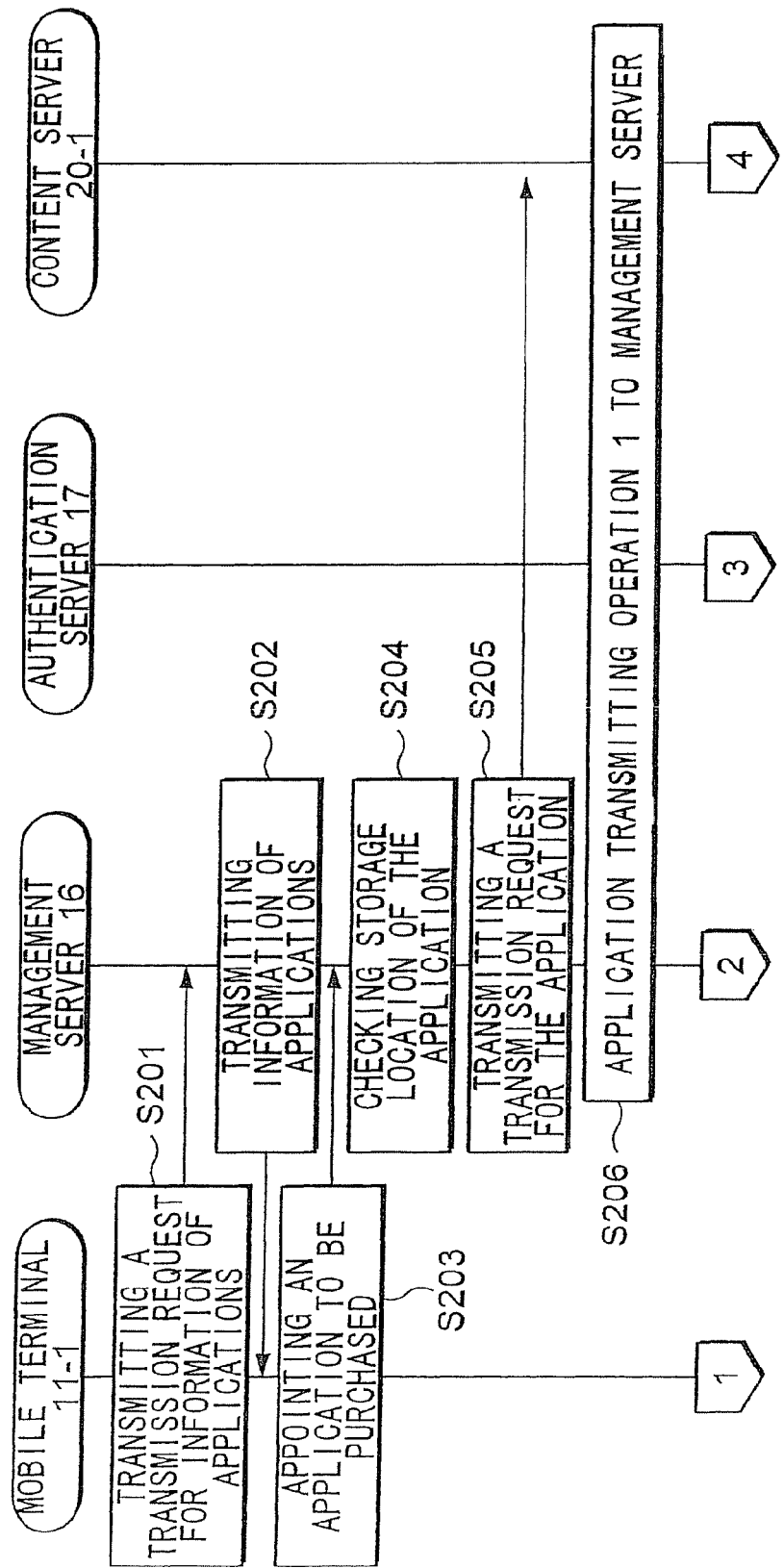
FIG. 14 and FIG. 15 are flowcharts showing a purchasing operation of an application, which is publicized by a management server in the application delivery system illustrated in FIG. 1 according to the first embodiment and the second embodiment of the present invention.
Figure 15:
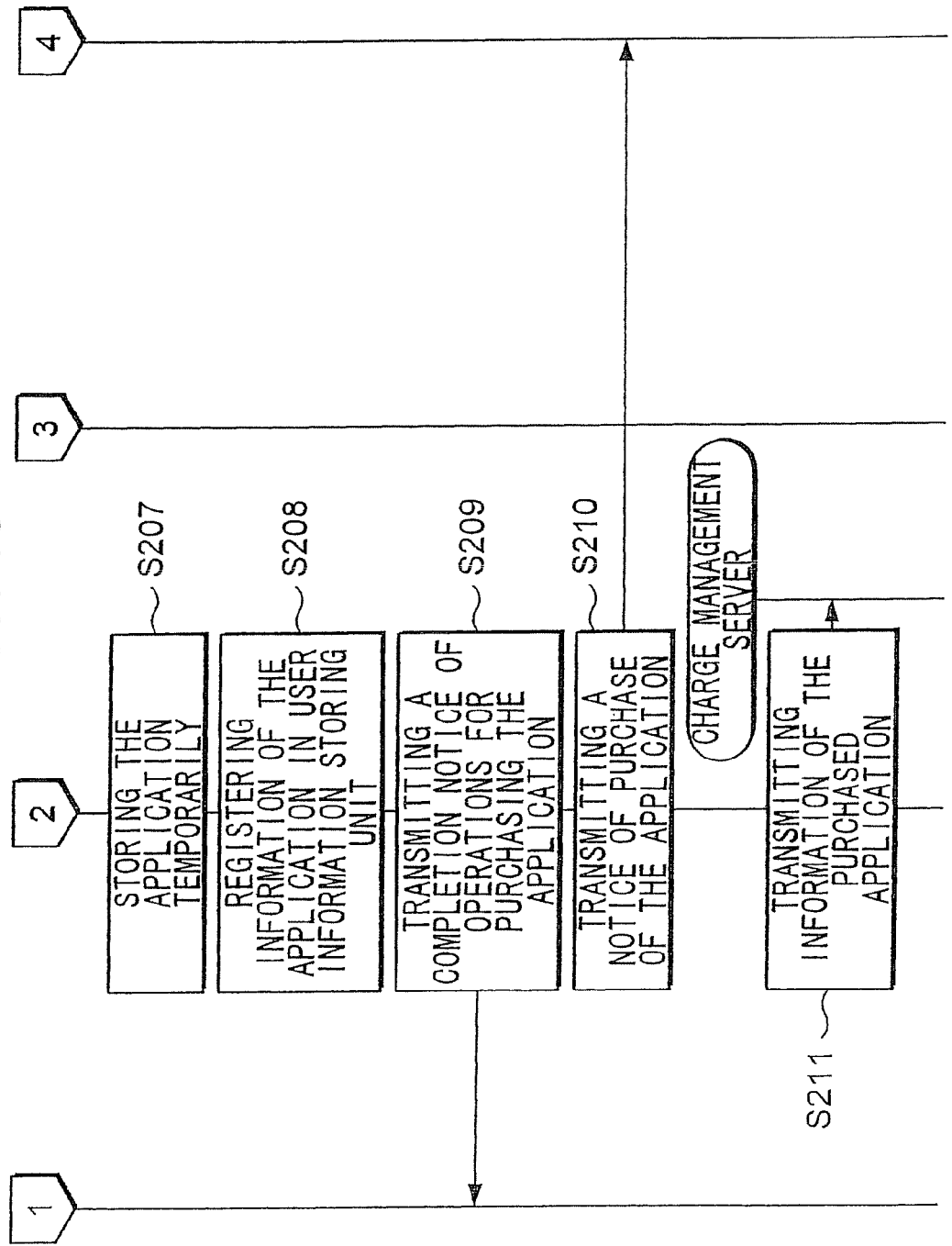

FIG. 6 is a diagram showing an example application information management system realized by mobile terminals 11, management server 16, and content servers 20. User information storing units 53 may be composed of user information storing unit 53-1, user information storing unit 53-2, . . . , and user information storing unit 53-k, which are data storage units corresponding to mobile terminal 11-1, mobile terminal 11-2, . . . , and mobile terminal 11-k ("k" is an integer showing the number of mobile terminals 11), respectively. User information storing units 53-i (i=1, . . . , k) may be divided into downloaded application area 53A-i and download-ready application area 53B-i. Downloaded application area 53A-i of user information storing unit 53-i may be an area for storing information of applications that are now stored in management area 40 or free area 41 of memory 12 of mobile terminal 11-i. On the other hand, download-ready application area 53B-i of user information storing unit 53-i may be an area for storing information of applications that are not stored in memory 12 of mobile terminal 11-i, but have already been purchased by the user of mobile terminal 11-i and are ready to be delivered to mobile terminal 11 in response to a request from mobile terminal 11 at any time. In downloaded application area 53A and download-ready application area 53B, information of applications such as names of applications, version numbers of applications, identification numbers for identifying each application, sizes of applications, distinctions between completion and incompletion of activation operations, storage numbers of applications, etc. may be stored.

FIG. 7 is a format chart showing an example of data stored by user information storing unit 53-I that corresponds to mobile terminal 11-1. In order to simplify the explanation, FIG. 7 shows only the items of memory area, identification number of application, activation, and storage number. As shown in FIG. 7, in application area 40A-1 of management area 40-1 in mobile terminal 11-1, an application whose identification number is "AP-2568" may be stored. The activation operation for the application has been completed. Storage numbers may be used for specifying the locations in a temporary custody application area of application information storing unit 52. The temporary custody application area may be an area where applications that are ready for transmission, are temporarily stored. The applications that have already been transmitted to mobile terminal 11-1 do not need storage numbers, and no storage numbers are given to such applications in downloaded application area 53A.

According to the example of data shown in FIG. 7, in application area 41A-1 of free area 41-1 in mobile terminal 11-1, the application whose identification number is "F-0325" is stored, and the activation operation for the application has been completed. Further, according to the example of data shown in FIG. 7, there are four applications identified that are not currently stored in memory 12, but the user of mobile terminal 11-1 has already purchased them and he/she can download the applications at any time. The application identified with identification number is "AP-4125" is one such application. Application "AP-4125" is indicated as stored in an area of application information storing unit 52 that is identified by storage number "T-7851." On the other hand, the application identified with identification number is "AP-3021" is not stored in application information storing unit 52 at present since the indication "deleted" is recorded in the item "storage number." It is also indicated that the application whose identification number is "AP-4513" is stored in registration application area 52R of management server 16. Storage in registration application area 52R does not require a storage number and therefore no data is given for the application in the item "storage number." Applications that are currently stored in download-ready application area 53B are not stored in memory 12 of mobile terminal 11-1. Since the activation operation for these applications has not been executed, no data is given for the item "activation."

As shown in FIG. 6, application information storing unit 52 comprises registration application area 52R and temporary custody application area 52T. In registration application area 52R, information on many kinds of applications that are developed for mobile terminals 11, such as names of applications, version numbers of applications, identification numbers of applications, sizes of applications, usage charges of applications, overview of functions of applications, etc. may be stored. The applications themselves, or information indicating locations where applications are stored may also be stored in the registration application area 52R. In addition, for applications that have been assigned reliability indexes at a level higher than a determined level, information such as reliability indexes, distinctions between applications being publicized and unpublicized, distinctions between collection of usage charges being undertaken and not undertaken by the administration entity of management server 16, etc. may also be stored in registration application area 52R. For applications that are not assigned reliability indexes that are higher than a determined level, such as, "0" may be assigned for the item "reliability index" in registration application area 52R.

FIG. 8 is a format chart showing an example of data stored in registration application area 52R. In order to simplify the explanation, FIG. 8 shows only the items "identification number of application", "reliability index", "publication", "collection of usage charges", and "storage location information". The storage location information may include any kind of information that specifies locations where files containing applications may be stored. In the following description, Uniform Resource Locators (URLs), which are widely used in the Internet, will be used as the storage location information. In other examples, any other data indicative of a location may be used as storage location information.

According to the example information stored in registration application area 52R, it is indicated that the application whose identification number is "AP-2568" is assigned "3" as a reliability index. In addition, the application is publicized in management server 16, the collection of the usage charges of the application is undertaken by the administration entity of management server 16, and the application itself is stored in registration application area 52R. On the other hand, the application identified by identification number "AP-3712" is assigned "5" as a reliability index and the application is publicized, however the collection of usage charges is not undertaken by the administration entity of management server 16, and the application is not stored in application information storing unit 52. Instead, the application is stored in the location specified by "ftp://ftp.abc_software.com/application" with a file name of "ap_0306.exe". Furthermore, the application whose identification number is "F-3251" is not given a reliability index, and no data is given for the items "publication", and "collection of usage charges." The publicizing of applications and undertaking the collection of a charge, as well as the differences between storing an application, and storing location information, will be explained later.

In temporary custody application area 52T, applications with storage location information registered in registration application area 52R may be stored temporarily prior to delivery to mobile terminals 11. The applications may be stored temporarily during the period after management server 16 receives the applications from content servers 20 that are providers of the applications. The applications may be transmitted by the content servers 20 when mobile terminals 11 request delivery of the applications. FIG. 9 is a format chart showing an example of data stored in temporary custody application area 52T. The applications may be stored along with storage numbers that specify the applications in temporary custody application area 52T.

[1.2] Transmission Operations for Transmitting an Application

[1.2.1] Operation Before Purchase of an Application

[1.2.1.1] Publication of Cryptograph Key

Authentication server 17 may be managed by an administration entity that is independent from all of the administration entities of mobile communication network 15. The administration entity of management server 16 and the administration entity of content server 20 may manage public keys within a public key system. Authentication server 17 may generate a pair of keys namely, a secret key for authentication server 17 (referred to as "Secret Key for Authentication Server" or "SK-AS" hereinafter), and a public key (referred to as "Public Key for Authentication Server" or "PK-AS" hereinafter). Authentication server 17 may then store the secret key "SK-AS" such that the secret key is protected from undesirable distribution to an external body. In addition, the authentication server 17 may transmit the public key "PK-AS" to any apparatus that requests it.

Each mobile terminal 11 may generate a pair of keys for itself, namely a secret key (referred to as "Secret Key for Mobile Terminal" or "SK-MT") and a public key (referred to as "Public Key for Mobile Terminal" or "PK-MT"). The pair of keys may be generated following a user's operation of mobile terminal 11. Memory controller 35 of each mobile terminal 11 may manage the secret key, namely "SK-MT"

such that the secret key may be protected from undesirable distribution to an external body. On the other hand, each mobile terminal 11 may transmit the public key, namely "PK-MT", to authentication server 17 through mobile communication network 15.

When authentication server 17 receives "PK-MT" from mobile terminal 11, authentication server 17 may store the received public key, "PK-MT", in its database along with the identification number of mobile terminal 11. Authentication server 17 may transmit the public key, namely "PK-MT", to any apparatus, which requests it, as in the case of "PK-AS" mentioned previously. To allow a key of one of mobile terminals 11 to be distinguished from a key of another of mobile terminals 11, the subscription number of each mobile terminal 11 may be placed after the respective abbreviation of the key. For example, the secret key of mobile terminal 11-1 will be referred to as "SK-MT-1".

Management server 16 and each of content servers 20 may generate respective pairs that include a secret key and a public key, similar to each of mobile terminals 11. Then, management server 16 and each of content servers 20 may store their secret keys so as to protect the secret keys from undesirable distribution to an external body. At the same time, management server 16 and each of content servers 20 may transmit their public keys to authentication server 17. When authentication server 17 receives the public key from management server 16, authentication server 17 may store the received public key in its database along with the identification number of management server 16. Authentication server 17 may carry out the same operation for content servers 20 when it receives public keys of content servers 20. Authentication server 17 may transmit the public keys of management server 16 and content servers 20 to any apparatus, which requests the keys, as in the cases of authentication server 17 and mobile terminals 11.

The secret keys and the public keys of management server 16 and content server 20 are hereinafter referred to as follows: The secret key of management server 16 is referred to as: "Secret Key for Management Server" or "SK-MS." The public key of management server 16 is referred to as: "Public Key for Management Server" of "PK-MS." The secret key of content server 20 is referred to as: "Secret Key for Contents Server" or "SK-CS." The public key of content server 20 is referred to as: "Public Key for Contents Server" or "PK-CS."

If there is a need to distinguish a key of one of content servers 20 from a key of another content server 20, the subscription number of each content server 20 is placed after the respective abbreviation of the key, as in the case of mobile terminals 11. For example, the secret key of content server 20-1 will be referred to as "SK-CS-1". The algorithms for encryption using secret keys and the algorithms for decryption using public keys in authentication server 17, in each of mobile terminals 11, in management server 16, and in each of content servers 20, are the same. Therefore, these apparatuses can exchange encrypted data among themselves and decrypt the data received by exchanging their public keys.

[1.2.1.2] Examination of Application

The administration entity of content server 20 can apply for a substantial examination of its application. Application may be made to the administration entity of management server 16. The substantial examinations may be performed so that the application may be given a reliability index whose level is higher than a determined level. A reliability index above a determined level may be required if the application needs to execute any operation in coordination with another application, or if the application needs to handle information that has a high value.

The administration entity of management server 16 may receive an application for a substantial examination of an application from the administration entity of content server 20. The administration entity of management server 16 examines a plurality of factors, such as, the purpose for which the application will be used, the description of operations of the application, the system for managing the application that is operated by the administration entity of content server 20, and so on. According to the results of the substantial examination, the administration entity of management server 16 may assign an appropriate level of reliability index to the examined application. Reliability indexes can be represented in any of many different ways indicative of a hierarchy. In the following example, the index system has 6 levels. Index levels "1", "2", "3", "4", and "5" in this example may be allocated to applications, which pass the previously discussed substantial examination. The larger the index, the higher may be the reliability of the application. Index "0" in this example may be assigned to applications that are not examined or could not pass the examination.

For example, regarding an application that is given a reliability index of "5", the administration entity of management server 16 may examine the management of the application by the administration entity of content server 20. The system providing application management may be analyzed to determine the stability of operation of the application, etc. In addition, the administration entity of management server 16 may determine if the results of the examination meet the requirements.

An application given a reliability index of "5," for example, may be allowed to use functions of control programs of mobile terminal 11. In addition, data stored in control memory 32, functions of applications stored in memory 12, and data stored in memory 12 may be used by the system for application management. This data may contain data of high value such as personal information of the user of mobile terminal 11, credit card numbers, and so on.

On the contrary, an application, given a reliability index of "1", for example, may be an application whose operations are not aimed at using data of high value such as personal information or monetary information. For example, there may be no need for an application to be assigned a reliability index of a high level, even if the operations of the application are stable. Alternatively, the application may be evaluated as an application with low information security that may cause undesirable distribution of data of high value, for example due to a lack of a secure data management system of the administration entity of content server 20.

The reliability index may also determine whether coordinated operation between applications is available. For example, with previously described reliability levels 0 through 5, an application with a reliability index of "1" can execute coordinated operations with another application having a reliability index of "1" or "0". An application with a reliability index of "1" can also pass its data and provide its functions to an application with a reliability index of "2", "3", "4", or "5". However, an application with a reliability index of "1" cannot receive data or use functions of an application with a reliability index of "2", "3", "4", or "5". An application with a reliability index of "1" cannot use any of the functions of the control programs of mobile terminal 11 or the data stored in control memory 32. If the administration entity of management server 16 decides to assign a reliability index equal to or greater than a determined level such as "1" or higher to an application, the reliability index may be registered in the item "reliability index" of registration application area 52R of management server 16 along with the identification number of the application.

[1.2.1.3] Request for Publicizing Applications by Management Server

Referring again to FIGS. 1 and 6, the administration entity of content server 20 can request that an application that is given a determined reliability index level such as "1" or higher be publicized. The application may be publicized to mobile terminals 11 by management server 16. An application that is requested to be publicized may include the response "Yes" in the item "publication" in registration application area 52R of management server 16. If management server 16 receives from mobile terminal 11, a request to transmit information related to applications available for purchase, management server 16 may transmit, to mobile terminal 11, information related to applications whose value of the item "publication" in registration application area 52R is "Yes." On the basis of the transmitted information, a user of mobile terminal 11 can get to know which applications are publicized, and purchase the publicized applications more easily than others.

On the contrary, if a user of mobile terminal 11 wants to purchase an application that is not publicized by management server 16, the user may purchase the application directly from content server 20. The user may apply to the administration entity of content server 20 to purchase the application. The user may apply through the Internet by accessing a home page of content server 20 that is a provider of the application. For example, if the administration entity of content server 20 wants to allow only mobile terminals 11 that meet certain requirements set by the administration entity of content server 20 to use its applications, it is more convenient for the administration entity of content server 20 not to publicize its applications through management server 16. However, applications that are not publicized by management server 16 may also be delivered to mobile terminals 11 through management server 16 in the same manner as applications publicized by management server 16. In addition, information about such applications may be similarly managed by management server 16.

[1.2.1.4] Request for Undertaking Usage Charge Collection by Management Server

The administration entity of content server 20 can request that the management of the usage charge collection of its application be undertaken by management server 16. Management of usage charge collection may be for those applications assigned a reliability index above a determined level, such as "1" or higher than "1." For an application whose management of the usage charge collection is requested to be undertaken by management server 16, the response "Yes" may be registered in the item "collection of usage charges" in registration application area 52R of management server 16.

For example, management server 16 may receive a request from mobile terminal 11, for purchasing an application. The value of the item "collection of usage charges" in registration application area 52R for the application may be "Yes." Management server 16 may transmit billing information such as an identification number of the application, an identification number of mobile terminal 11, and the time and date of purchase of the application to the charge management server (not shown) that is connected to mobile communication network 15. The billing information may be transmitted at the time when information related to the application is stored in download-ready application area 53B of management server 16.

Similarly, management server 16 may transmit billing information such as an identification number of the application, an identification number of mobile terminal 11, and the time and date of purchase of the application to the charge management server that is connected to mobile communication network 15. The billing information may be transmitted at the time when management server 16 executes an activation operation for the application whose value of the item "collection of usage charges" in registration application area 52R is "Yes."

The charge management server may calculate the usage charges of each application for each mobile terminal 11 on the basis of the information transmitted by management server 16 as previously explained. The administration entity of content server 20 and the administration entity of management server 16 may agree beforehand to certain conditions with regard to usage charges for each application. For example, whether the usage charges are calculated on the basis of purchase of the application or activation of the application may be agreed conditions. The agreed upon conditions may be registered in the charge management server as part of the information for charging. The usage charges of each application that are calculated by the charge management server may be collected from each user of mobile terminal 11. The usage charges may be collected by the administration entity of mobile communication network 15, along with the communication charge for mobile terminal 11 that also may be calculated by the charge management server.

The administration entity of mobile communication network 15 may deduct a certain amount from the collected charge as commission for undertaking charge collection. The remaining amount of the charge may be remitted to the administration entity of content server 20 that is the provider of the application. Moreover, the administration entity of mobile communication network 15 may remit a certain part of the commission for undertaking charge collection to the administration entity of management server 16 as a service charge for obtaining information on levying usage charges.

[1.2.1.5] Request for Storing an Application by Management Server

The administration entity of content server 20 can request that its application that is given a reliability index above a determined value, such as "1" or higher than "1", be stored in registration application area 52R of management server 16. If an application is requested to be stored in registration application area 52R, the application itself may be stored in the item "storage location information" of registration application area 52R (FIG. 8), instead of storing information indicating the location where the application is stored.

The administration entity of content server 20 can determine whether the application itself should be stored in registration application area 52R, or whether information on the location where the application is stored should be registered in registration application area 52R. Determination by the administration entity of the content server 20 may be based on considering the transfer rate of communication between management server 16 and content server 20, the nature of the application, and so on. An application that is stored in registration application area 52R may be delivered to mobile terminal 11 soon after the application is requested to be delivered by mobile terminal 11. The application may be delivered shortly after the request since management server 16 can deliver the application without having to first receive the application from content server 20 at the time of the request.

It is therefore beneficial for the administration entity of content server 20 to request for its applications to be stored in registration application area 52R. This is especially true if the transfer rate of communication between management server 16 and content server 20 is relatively low. If an application is not stored in registration application area 52R, the application may be transmitted from content server 20 to management server 16 each time management server 16 receives a request to deliver the application from mobile terminal 11. Accordingly, content server 20 may be able to deliver the application with some customizations for mobile terminal 11. For example, content server 20 sets different access keys to the same application for each of mobile terminals 11 to prevent unauthorized users from using the application.

Following is an example, with reference to flowcharts in FIG. 10 and FIG. 11, of a series of operations executed when content server 20-1 requests management server 16 to store an application. First, content server 20-1 transmits a storage request for the application to management server 16 (step S101). The storage request may contain the identification number of the application.

When management server 16 receives the storage request for the application, management server 16 reads the data stored in registration application area 52R using the identification number, that was contained in the storage request. The management server 16 may confirm that the application is given a reliability index of a determined level such as "1" or more than "1." After confirmation of the reliability index, management server 16 may transmit a notice of acceptance of the storage request to content server 20-1 (step S102).

When content server 20-1 receives the notice of acceptance of the storage request, content server 20-1 may transmit to authentication server 17 a transmission request of "PK-MS." The transmission request of "PK-MS" comprises the public key of management server 16 (step S103). In response to the transmission request of the public key, authentication server 17 may transmit "PK-MS" to content server 20-1 (step S104).

After receiving "PK-MS", content server 20-1 may encrypt the application by use of "PK-MS" (step S105). Because of this encrypting operation, unauthorized persons, who wiretap the application while it is being transmitted from content server 20-1 to management server 16, will not be able to use the application. Moreover, content server 20-1 may encrypt the encrypted application again by use of "SK-CS-1" (the secret key of content server 20-1) (step S106). Because of the encrypting operation, management server 16 can confirm that the application is definitely transmitted by content server 20-1. That is to say, the encryption plays the role of a certificate, which enables management server 16 to confirm the transmitting side of the application. Content server 20-1 may transmit the double-encrypted application to management server 16 (step S107).

After receiving the double-encrypted application, management server 16 may read the data stored in cryptograph key storing unit 51 of management server 16 to check if "PK-CS-1" (the public key of content server 20-1) is available in the data. If "PK-CS-1" is not registered in cryptograph key storing unit 51, management server 16 transmits, to authentication server 17, a transmission request for "PK-CS-1" (step S108). In response to the transmission request for the public key, authentication server 17 may transmit "PK-CS-1" to management server 16 (step S109, FIG. 11). If "PK-CS-1" is registered in cryptograph key storing unit 51, management server 16 may skip step S108 and step S109 and move to step S110, since there is no need to obtain "PK-CS-1" from an external source.

Management server 16 may then decrypt the double-encrypted application by use of "PK-CS-1" (step S110). If the decryption of the application fails, it means that the application that management server 16 received may have been falsified during transmission. Alternatively, the application may have been corrupted during transmission, or the application may have been transmitted by a server other than content server 20-1. When decryption fails for any reason, management server 16 does not proceed to the following operations, but instead transmits to content server 20-1 a retransmission request for the proper application.

On the contrary, if the decryption of the application by use of "PK-CS-1" is successful, the application is confirmed to have been transmitted from content server 20-1 without any problem. Management server 16 may then decrypt the application again by use of "SK-MS" (the secret key of management server 16) (step S111). On the basis of these operations, management server 16 can obtain the application without encryption, and the administration entity of management server 16 can check, if necessary, whether any falsification was performed by the administration entity of content server 20-1 or by others.

The series of operations from step S103 to step S111 that are explained above will be referred to as "application transmitting operation 1 to management server" in the following explanation. This series of operations are also illustrated by a dotted line box in FIGS. 10 and 11. After step S111, management server 16 may store the application in registration application area 52R (step S112). Management server 16 may also transmit to content server 20-1 a completion notice of operations for storing the application (step S113).

[1.2.2] Purchase of Application

Before an application is delivered to mobile terminal 11, the application may need to be purchased by the user of mobile terminal 11. Generally speaking, there are two processes by which the user of mobile terminal 11 may purchase an application. In a first process, an application which is publicized by management server 16 may be purchased through management server 16. In a second process, an application may be purchased directly from the administration entity of content server 20. The application may be purchased directly by entering a purchasing contract using a home page in content server 20, etc.

In the second process, where a purchasing contract is made directly between the user of mobile terminal 11 and the administration entity of content server 20, the reliability index may be taken into consideration. There may be two variations of operations in the second process depending on whether the application is given a reliability index at or above a determined level such as "1" or more than "1", or if the application is given a reliability index below a determined level, such as "0". Following are examples of a series of operations for purchasing an application.

[1.2.2.1] An Example of the Purchase of an Application that is Publicized by Management Server Following is an example, with reference to FIG. 12, FIG. 13, FIG. 14, and FIG. 15, of a series of operations that are executed when a user of mobile terminal 11-1 purchases an application publicized by management server 16. The application may be provided by content server 20-1, through management server 16.

First, the user of mobile terminal 11-1 may push appli-button 23 (FIG. 2) of mobile terminal 11-1 to make mobile terminal 11-1 display an application menu such as the example shown in screen D11. Next, the user may push button "1" of operating unit 22 (FIG. 2) to select the illustrated item "1" identified as "New purchase of application." When button "1" is pushed, mobile terminal 11-1 may transmit to management server 16 a transmission request for information related to available applications (step S201, FIG. 14).

After receiving the transmission request for information of available applications, management server 16 may read the data stored in registration application area 52R (FIG. 6). In addition, management server 16 may extract information related to applications whose value of the item "publication" is "Yes." Management server 16 may also extract information related to those applications that are not registered in user information storing unit 53-1. Next, management server 16 may transmit the extracted information to mobile terminal 11-1 as the information on available applications (step S202). The extracted information may contain identification numbers of applications, names of applications, functions of applications, usage charges of applications, information whether collection of usage charges is managed by management server 16 or not, and/or information related to locations of home pages in content servers 20, such as URLs.

After receiving the extracted information on available applications, mobile terminal 11-1 may display an available applications screen, such as screen D12 of FIG. 12. In response to the available applications screen, the user of mobile terminal 11-1 may push a button that corresponds to an application the user desires to purchase. For example, if the user pushes button "1" when screen D12 is displayed, the item "Schedule management Ver.2" is selected, and mobile terminal 11-1 displays an application description screen, such as example screen D13 on display unit 21 (FIG. 2). The application description screen may show application information concerning functions of the selected application and usage charges. Based on the application information, the user of mobile terminal 11-1 may determine whether to purchase the application. If the user of mobile terminal 11-1 decides to purchase the application and, for example, pushes button "9" when screen D13 is displayed, mobile terminal 11-1 transmits the identification number of the selected application to management server 16 (step S203). Then, mobile terminal 11-1 displays a processing screen, such as screen D14 (FIG. 12) on display unit 21.

After receiving the identification number of the application, management server 16 may read the data stored in registration application area 52R, and obtain the storage location information of the application (step S204). In step S204, if the selected application itself is not stored in registration application area 52R, management server 16 may obtain a location, such as a URL, of the application in content server 20-1. The location may be obtained from the data stored in registration application area 52R, as storage location information. In this case, management server 16 may transmit to content server 20-1 a transmission request for the application (step S205).

When content server 20-1 receives the transmission request for the application, a series of operations that are similar to the previously discussed process for "application transmitting operation 1 to management server", may begin. Management server 16, authentication server 17, and content server 20-1 may therefore execute operations similar to step S103 to step S111 shown in FIG. 10 and FIG. 11. As a result of carrying out the illustrated series of operations, management server 16 may obtain the application (step S206).

Management server 16 may allot a storage number to the obtained application, and store the application along with the storage number in temporary custody application area 52T (FIG. 6) (step S207). The storage number may be used by management server 16 to specify the location in temporary custody application area 52T where the application is stored. If applications are stored for different uses, different storage numbers may be allotted to each of the applications even if the contents of the applications are the same.

On the contrary, if an application that is selected by mobile terminal 11-1 is stored in registration application area 52R of management server 16, management server 16 may skip the operations from step S205 to step S207 and move to step S208 since the application has previously been obtained from the application server 20.

Next, management server 16 may register information on the application, such as the identification number of the application and the reliability index. The registered information may be included in download-ready application area 53B of user information storing unit 53-1 (FIG. 6) (step S208). After the registration operation in step S208 has been carried out, the user of mobile terminal 11-1 may be able to download the application that has already been registered in download-ready application area 53B, to mobile terminal 11-1 at any time the user desires.

When the registration operation is completed, the response 'No' may be registered as the value of the item 'activation' for the application, since the application has not been downloaded to mobile terminal 11-1. Accordingly, the activation operation for the application has not yet been executed. If the registered application is stored in temporary custody application area 52T, the storage number for the application may also be registered in download-ready application area 53B (FIG. 6). When the registration operation is completed, management server 16 may transmit to mobile terminal 11-1 a completion notice of operations for purchasing the application (step S209).

After receiving the completion notice, mobile terminal 11-1 may display a purchase confirmation screen such as screen D15 or screen D16 (FIG. 13). Screen D15 is an example screen that may be displayed when the newly purchased application is an application whose usage charges are managed by management server 16. The purchase confirmation screen may inform the user of mobile terminal 11-1 that the usage charges of the application will be collected along with the communication charge. On the other hand, example screen D16 shows a screen that may be displayed when the application is an application without usage charge management by management server 16. The purchase confirmation screen may inform the user of mobile terminal 11-1 that it is the responsibility of the user to carry out the necessary procedure for settling the usage charges of the application. When example screen D16 is displayed, the user of mobile terminal 11-1 can push button "0" to display a home page. The home page maybe managed by the administration entity of content server 20-1. The user may then follow the procedure for settling usage charges of the purchased application in the home page.

If the user of mobile terminal 11-1 pushes button "9" of example screen D15 or D16 mobile terminal 11-1 may display a standby screen such as screen D17 on display unit 21. The button "9" may be pushed to complete the series of operations for purchasing a new application as previously explained. The standby screen may be similar to other screens displayed when mobile terminal 11-1 is in a standby mode, however a symbol illustrated as the letter "a" is also displayed on the example standby screen D17. The letter "a" may inform the user of mobile terminal 11-1 that an application is ready to be downloaded. However, there are other ways to inform the user of mobile terminal 11-1 that an application is ready to be downloaded, and is not limited to displaying a symbol. To achieve the same purpose, other examples, such as displaying other kinds of symbols or images, making sounds, and vibrating mobile terminal 11-1, can also be adopted to indicate an application is available for download.

After management server 16 transmits the completion notice of operations for purchasing the application in step S209, management server 16 may transmit a notice of purchase of the application by mobile terminal 11-1 (step S210) to content server 20-1. Moreover, if the purchased application is an application whose usage charges are managed by management server 16, management server 16 may transmit billing information to the charge management server (step S211). The billing information may include information on the purchased application such as the identification number of the application, the identification number of mobile terminal 11-1, the time and date of purchase of the application, etc.

Figure 16:
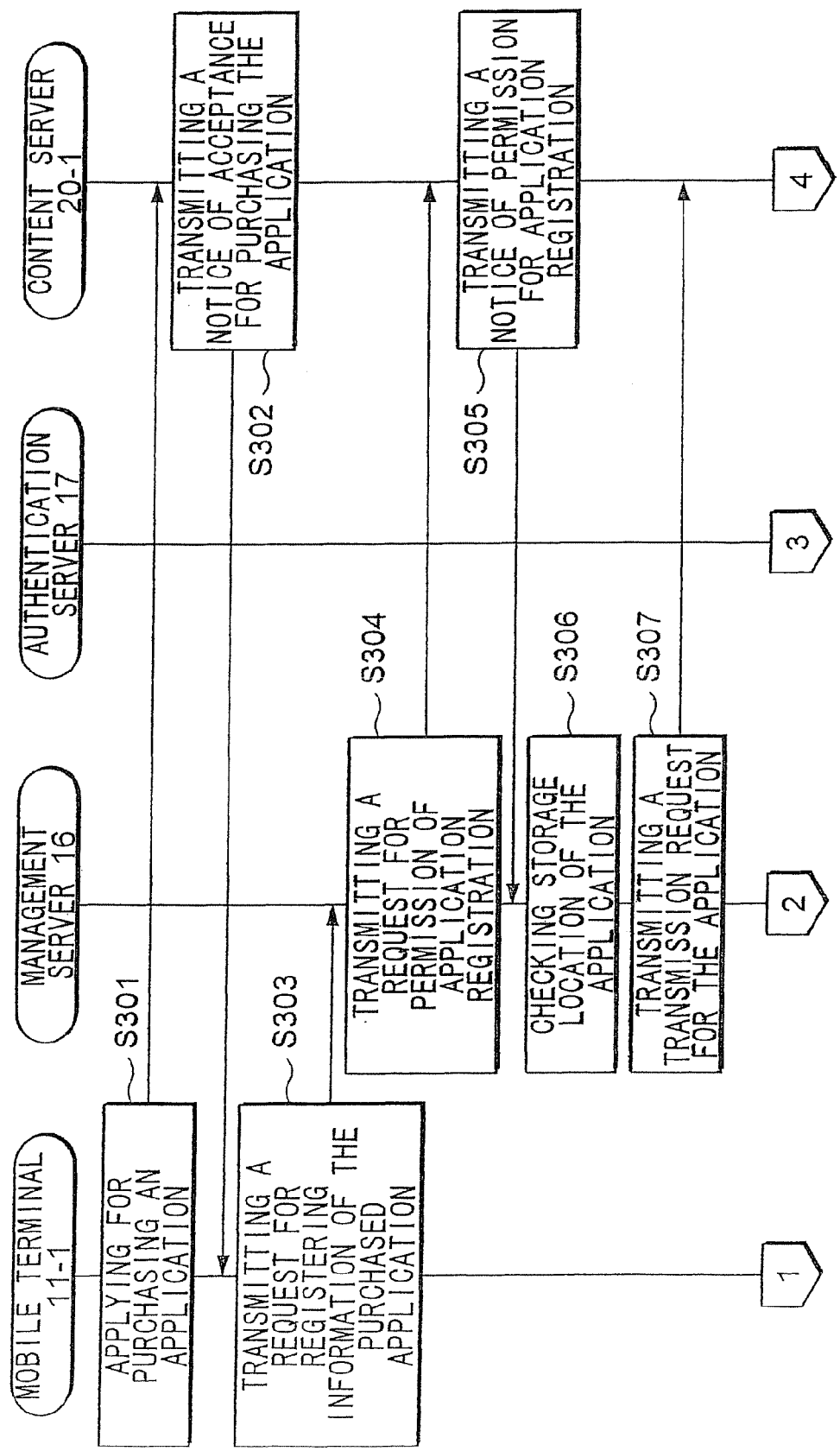
FIG. 16 and FIG. 17 are flowcharts showing a purchasing operation of an application, which is judged to have a certain reliability but not publicized by a management server in the application delivery system illustrated in FIG. 1 according to the first embodiment and the second embodiment of the present invention.
Figure 17:
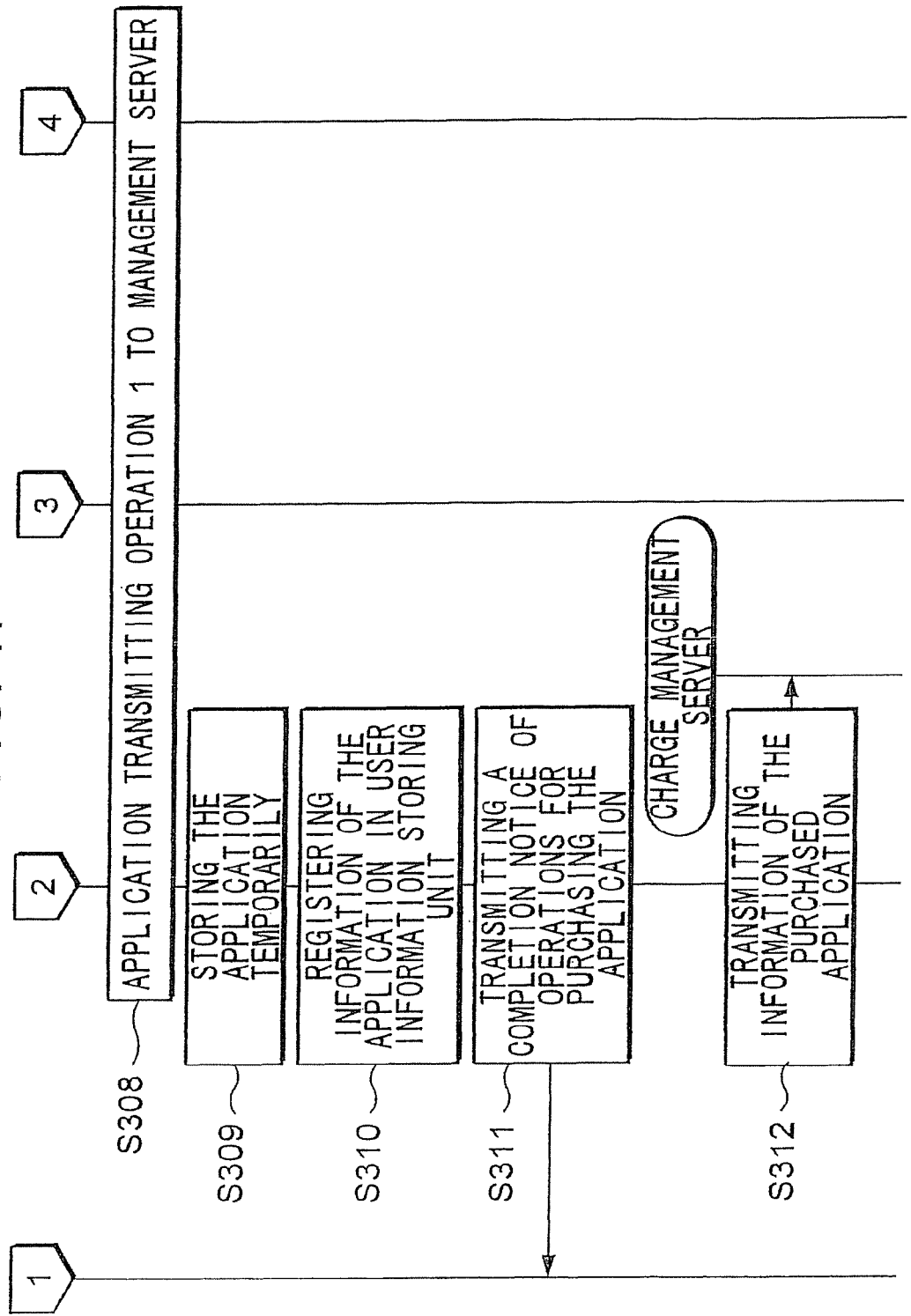

[1.2.2.2] Purchase of Application, Which is Given a Reliability Index of Greater Than or Equal to a Determined Level Such as, "1" or More Than "1", and Which is Not Publicized Following is an example, with reference to FIG. 16 and FIG. 17, of a series of operations that are executed when the user of mobile terminal 11-1 purchases an application that is not publicized by management server 16. In this example, the application is provided by content server 20-1, and the application is given a reliability index of "1" or more than "1".

The user of mobile terminal 11-1 may purchase an application that is not publicized by management server 16. In this case, the user of mobile terminal 11-1, for example, displays a home page of content server 20-1 in mobile terminal 11-1, and applies for purchasing the application in the home page (step S301). The user of mobile terminal 11-1 may also take the responsibility of carrying out the procedure for settling the usage charges of the application in the same home page, if necessary.

Content server 20-1 may check whether the contents of the purchase request submitted to content server 20-1 by mobile terminal 11-1 in step S301, meet the requirements. If the contents of the purchase request meet the requirements, content server 20-1 may transmit a notice of acceptance for purchasing the application to mobile terminal 11-1 (step S302). The notice of acceptance for purchasing the application contains the identification number of the application. When content server 20-1 transmits the notice of acceptance, content server 20-1 may record the identification number of mobile terminal 11-1, whose request for purchasing the application is accepted.

After receiving the notice of acceptance for purchasing the application, mobile terminal 11-1 may transmit a request to management server 16 to register the information pertaining to the purchased application (step S303). The request for registering the information may contain the identification number of the application that has been newly purchased.

After receiving the information on the purchased application from mobile terminal 11-1, management server 16 may read the data stored in registration application area 52R (FIG. 6), and obtain an address, such as a URL, from content server 20-1. The address may be provided as location information indicating the provider of the application according to the identification number of the application. Management server 16 may then transmit a request to content server 20-1 for permission to carry out application registration. The request for permission may be transmitted in order to confirm that it is acceptable to content server 20-1 for the application to be registered as an application purchased by mobile terminal 11-1, using the address (step S304). The request for permission of application registration may contain the identification number of mobile terminal 11-1.

The request for permission to register the application from management server 16 may be received by the content server 20-1. The content server 20-1 may check whether the identification number of the mobile terminal purchasing the application matches the identification number of the mobile terminal that was recorded when the purchase request was accepted by the content server 20-1 in step S302. If these identification numbers match, content server 20-1 may transmit a notice of permission for application registration to management server 16 (step S305).

The management server 16 may receive the notice of permission for application registration from content server 20-1. The management server 16 may then read the data stored in registration application area 52R, and obtain the storage location information of the application that mobile terminal 11-1 requests to be registered (step S306). If the application that is requested to be registered in step S306 is not stored in registration application area 52R, management server 16 may transmit to content server 20-1 a request to transmit the application (step S307). The request may include the storage location information of the application that is recorded in registration application area 52R.

When content server 20-1 receives the request for transmitting the application, a series of operations may be started that are similar to those previously discussed in the section identified as "application transmitting operation 1 to management server." Namely, management server 16, authentication server 17, and content server 20-1 may execute operations similar to step S103 through step S111 shown in FIG. 10 and FIG. 11. As a result of carrying out the series of operations, management server 16 may obtain the application (step S308). Management server 16 may assign a storage number to the obtained application, and store the application along with the storage number in temporary custody application area 52T (FIG. 6) (step S309). On the contrary, if the application that mobile terminal 11-1 requests to be registered is stored in registration application area 52R, management server 16 may skip operations similar to step S307 through step S309 and move to step S310.

Next, management server 16 may register the information of the application that mobile terminal 11-1 requested be registered. The registration information may include the identification number of the application, the reliability index of the application, etc. The registration information may be stored in download-ready application area 53B of user information storing unit 53-1 (step S310). Regarding the item "activation" in download-ready application area 53B (FIG. 7), the response "No" may be registered as the value of the item, since the activation operation has not yet been executed for the application. If the application is stored in temporary custody application area 52T, the storage number of the application may also be registered in download-ready application area 53B (FIG. 6).

After the registration operation in step S310, the user of mobile terminal 11-1 may download the application that has already been registered in download-ready application area 53B to mobile terminal 11-1 at any time the user desires. When the registration operation is complete, management server 16 may transmit to mobile terminal 11-1 a completion notice of operations for purchasing the application (step S311). When mobile terminal 11-1 receives the completion notice of operations for purchasing the application, mobile terminal 11-1 may display a symbol such as the letter "a" on display unit 21 (FIG. 2). The symbol may inform the user of mobile terminal 11-1 that the newly purchased application is ready to be downloaded from management server 16.

If the purchased application is an application whose usage charges are managed by management server 16, management server 16 may transmit to the charge management server billing information for the purchased application, such as the identification number of the application, the identification number of mobile terminal 11-1, the time and date of purchase of the application, etc. (step S312).

[1.2.2.3] Purchase of Application, Which is Given a Reliability Index Less Than a Determined Level Such as a Reliability Index of "0".

Figure 18:
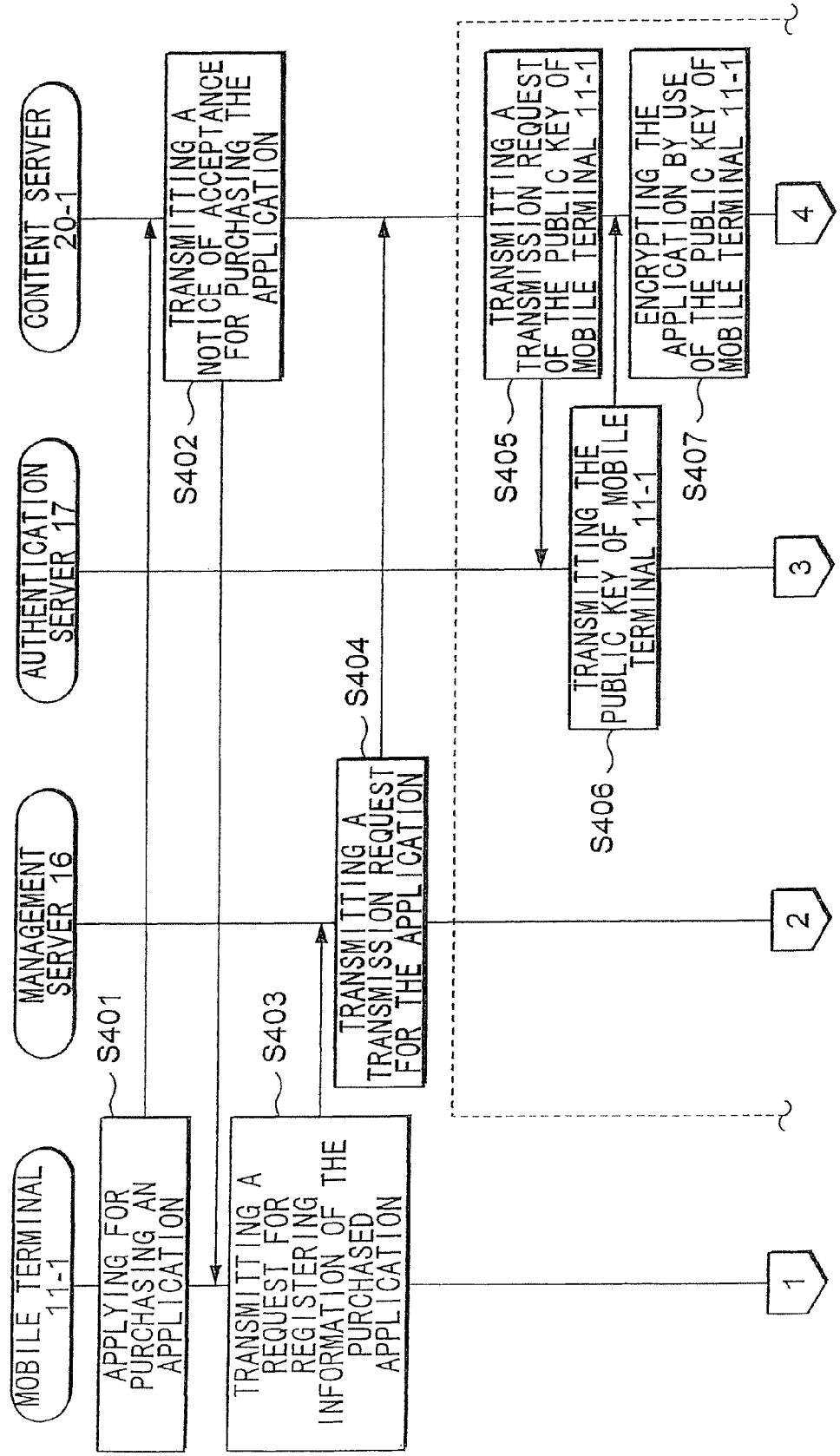
FIG. 18, FIG. 19, and FIG. 20 are flowcharts showing a purchasing operation of an application, which is not given any reliability in the application delivery system illustrated in FIG. 1 according to the first embodiment and the second embodiment of the present invention.
Figure 19:
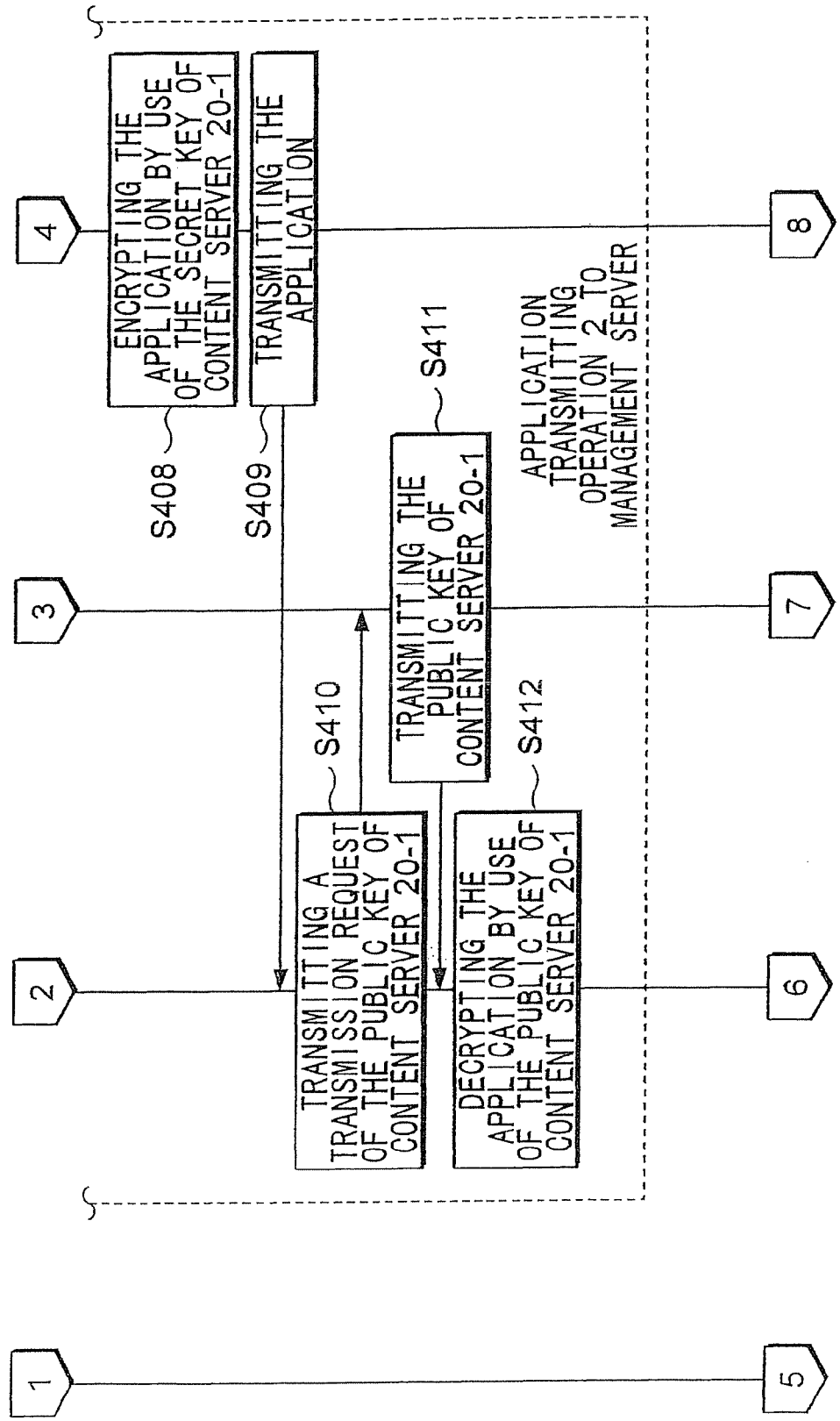
Figure 20:
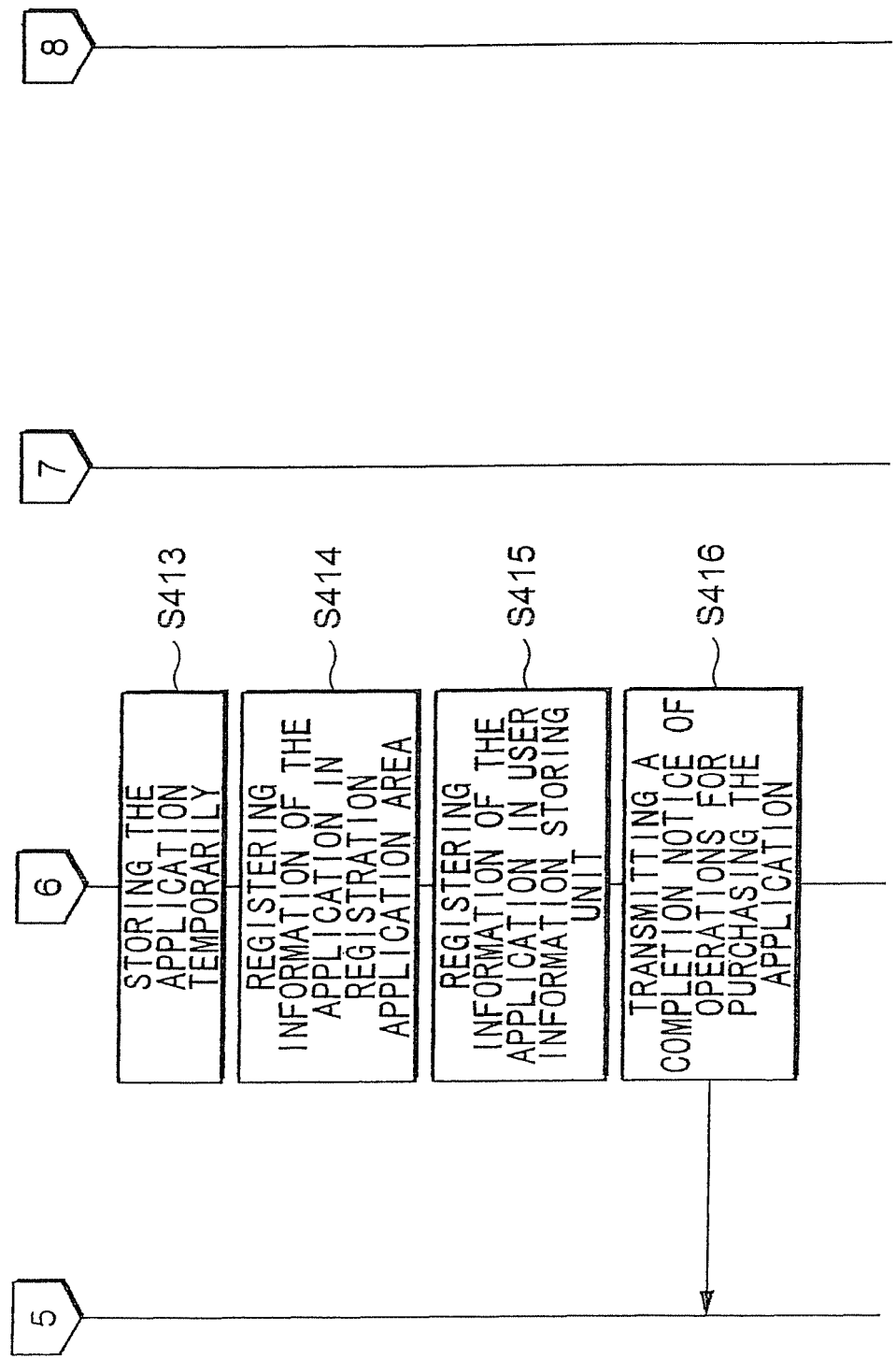

Following is an example, with reference to FIG. 18, FIG. 19, and FIG. 20, of a series of operations, which are executed when the user of mobile terminal 11-1 purchases an application whose provider is content server 20-1, and, which is given a reliability index of "0". The operations in this example are similar to those of the series of operations which start from step S301 and are explained with reference to FIG. 16 and FIG. 17. However, in the following operations, management server 16 need not obtain the application in plain text and check the contents of the application. The check may not be performed since the application is not given a reliability index greater than or equal to a determined level such as "1" or more than "1".

Therefore, when the application is transmitted from content server 20-1 to management server 16, the application may not be encrypted with the public key of management server 16, but instead be encrypted with the public key of mobile terminal 11-1. Because of this encryption, the application cannot be understood by unauthorized users of mobile terminal 11-1, even if the application is wiretapped during transmission of the application. As a result, unauthorized usage of the application can be prevented, and at the same time, concealment of contents of the application can be ensured.

In this series of operations, the user of mobile terminal 11-1, for example, firstly displays a home page of content server 20-1 in mobile terminal 11-1. The user may apply for purchase of an application in the home page (step S401). The user of mobile terminal 11-1 may also take the responsibility for carrying out the necessary procedure for settling usage charges of the application in the same home page. Content server 20-1 may check whether the contents of the purchase request that is submitted to content server 20-1 by mobile terminal 11-1 in step S401, meets the determined requirements. If the contents of the purchase request meet the requirements, content server 20-1 may transmit a notice of acceptance for purchasing the application to mobile terminal 11-1 (step S402). The notice of acceptance for purchasing the application may contain the identification number of the application. When content server 20-1 transmits the notice of acceptance, content server 20-1 may record the identification number of mobile terminal 11-1, whose request for purchasing the application is accepted.

After receiving the notice of acceptance for purchasing the application, mobile terminal 11-1 may transmit a request to management server 16 to register the information related to the purchased application (step S403). The request to register the information may include the identification number of the application, and an address, such as a URL in content server 20-1, indicative of a storage location information of the application. After receiving the request to register the information from mobile terminal 11-1, management server 16 may transmit to content server 20-1 a request for transmitting the application (step S404). The request for transmitting the application may contain the identification number of mobile terminal 11-1.

After receiving the request for transmitting the application from management server 16, content server 20-1 may check whether the identification number of the mobile terminal that requested transmission of the application matches the identification number of the mobile terminal from which content server 20-1 accepted the request for purchasing the application in step S402. If these identification numbers match, content server 20-1 may transmit a request for transmitting "PK-MT-1" (the public key of mobile terminal 11-1) to authentication server 17 (step S405). In response to the request for transmitting "PK-MT-1", authentication server 17 may transmit "PK-MT-1" to content server 20-1 (step S406).

After receiving "PK-MT-1", content server 20-1 may encrypt the application that is to be transmitted using "PK-MT-1" (step S407). Moreover, content server 20-1 may encrypt the encrypted application again using "SK-CS-1" (namely the secret key of content server 20-1) (step S408). Because of the encrypting operation, management server 16 can confirm that the application was definitely transmitted by content server 20-1. Content server 20-1 may transmit the double-encrypted application to management server 16 (step S409).

After receiving the double-encrypted application, management server 16 may read the data stored in cryptograph key storing unit 51 of management server 16 to check if "PK-CS-1" (the public key of content server 20-1) is available in the data. If "PK-CS-1" is not registered in cryptograph key storing unit 51, management server 16 may transmit a transmission request of "PK-CS-1" to authentication server 17 (step S410). In response to the transmission request of the public key, authentication server 17 may transmit "PK-CS-1" to management server 16 (step S411). If "PK-CS-1" is registered in cryptograph key storing unit 51, management server 16 may skip step S410 and step S411 and move to step S412 since there is no need to obtain "PK-CS-1" from an external source.

Management server 16 may then decrypt the double-encrypted application by use of "PK-CS-1" (step S412). If the decryption of the application fails, the application that management server 16 received may have been falsified during transmission, damaged, or may have been transmitted by a server other than content server 20-1. Therefore, when the decryption fails, management server 16 may not proceed to the following operations but may instead transmit a retransmission request for the expected application to content server 20-1. On the contrary, if the decryption of the application by use of "PK-CS-1" is successful, it is confirmed that the application was transmitted from content server 20-1 without any problem. The series of operations from step S405 to step S412 that were previously explained are identified by a dotted box in FIGS. 18 and 19. The series of operations will be referred to as "application transmitting operation 2 to management server" in the following explanation.

Next, management server 16 may allocate a storage number to the application. The application may then be stored along with the storage number in temporary custody application area 52T (FIG. 6) (step S413). The application stored in temporary custody application area 52T, may still be encrypted with "PK-MT-1" (the public key of mobile terminal 11-1) and cannot be decrypted by the administration entity of management server 16.

Management server 16 may then register in registration application area 52R (FIG. 6) the identification number of the application and an address, such as a URL of content server 20-1, as the storage location information of the application (step S414). The storage location information that is registered in the registration operation may be referred to when management server 16 needs to obtain the same application from content server 20-1 in response to a request for transmitting the application. In this example, the data corresponding to the application that is registered in registration application area 52R may include the value of the item "reliability index" set as "0", and the value of the item "publication" left blank ("-").

Next, management server 16 may register the information of the application that mobile terminal 11-1 requests to be registered in ready for download application area 53B of user information storing unit 53-1 (FIG. 6) (step S415). The registered information may include the identification number of the application, the storage number of the application, etc. In this example, the item "activation" may have the value "No" registered, and the item "reliability index" may have a value "0" registered. After the registration operation in step S415, the user of mobile terminal 11-1 is able to download the application to mobile terminal 11-1 at any time the user desires. When the registration operation is completed, management server 16 may transmit a completion notice of operations for purchasing the application to mobile terminal 11-1 (step S416).

When mobile terminal 11-1 receives the completion notice of operations for purchasing the application, mobile terminal 11-1 may display a symbol such as the letter "a" on display unit 21 (FIG. 2). The symbol may inform the user of mobile terminal 11-1 that the newly purchased application is ready to be downloaded from management server 16.

[1.2.3] Download of Application to Mobile Terminal

After the user of mobile terminal 11 purchases an application, the user may download the purchased application to mobile terminal 11-1. Following is an example, with reference to FIG. 21, FIG. 22, FIG. 23, FIG. 24, and FIG. 25, of a series of operations that are executed when mobile terminal 11-1 downloads an application.

Figure 21:
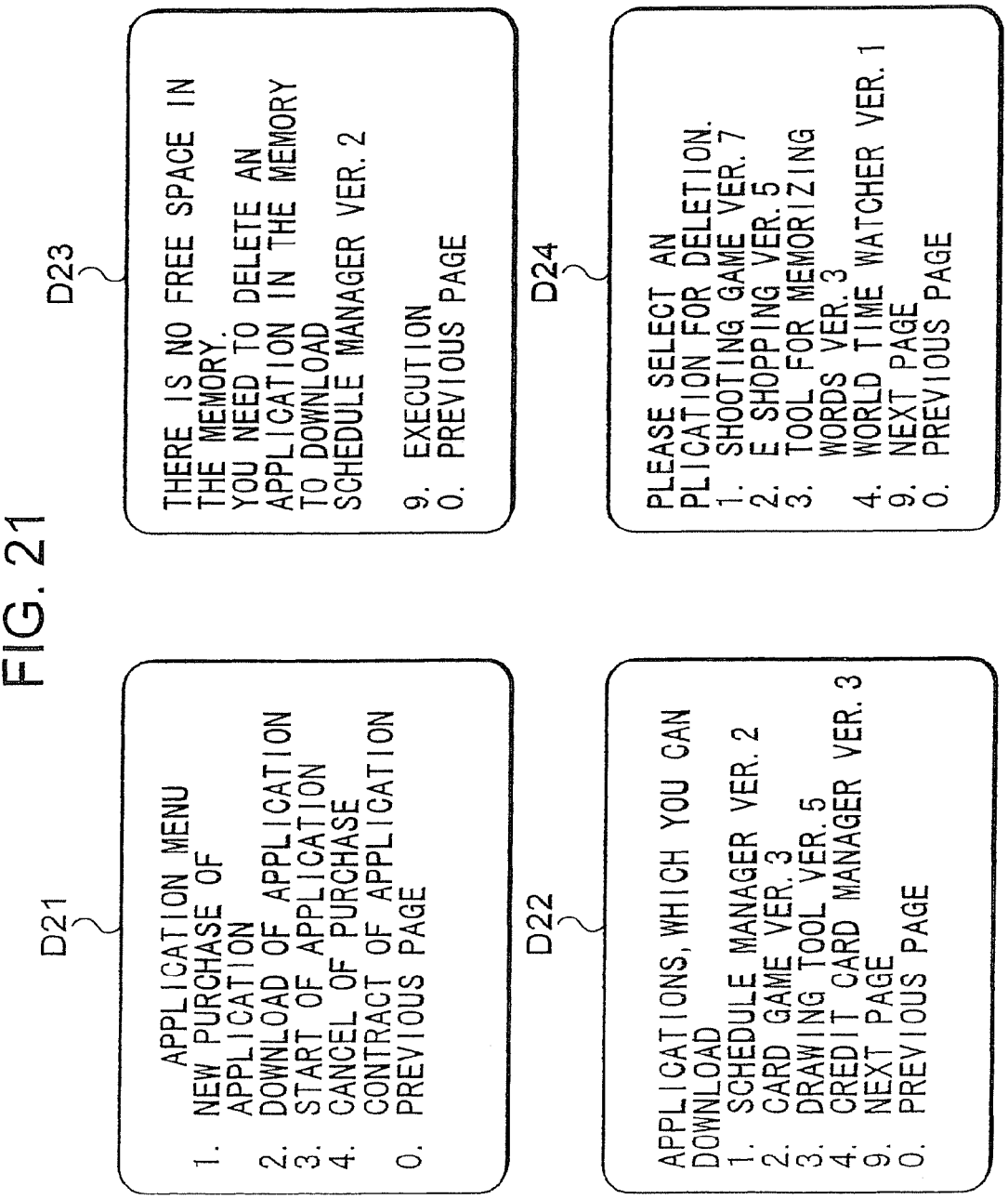
Figure 23:
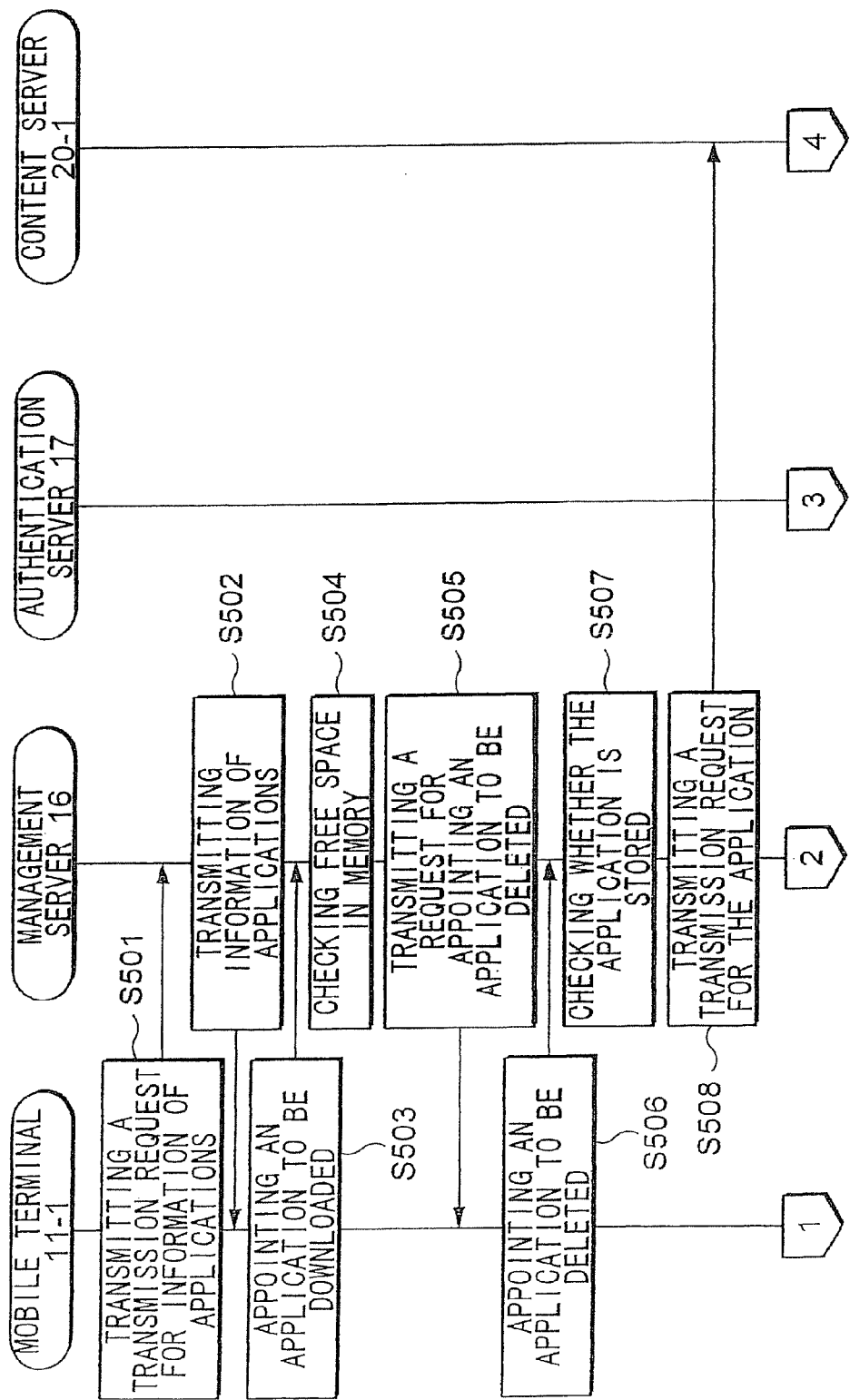
FIG. 23, FIG. 24, and FIG. 25 are flowcharts showing an application downloading operation in the application delivery system illustrated in FIG. 1 according to the first embodiment and the second embodiment of the present invention.

First, the user of mobile terminal 11-1 may push appli-button 23 (FIG. 2) of mobile terminal 11-1 to display an application menu shown as screen D21 (FIG. 21). When screen D21 is displayed, the user of mobile terminal 11-1 may push button "2" of operating unit 22 (FIG. 2) to select the item "2.Download of application". When button "2" is depressed, mobile terminal 11-1 may transmits a request to management server 16 to transmit information on applications that can be downloaded to mobile terminal 11-1 (step S501) (FIG. 23).

After receiving the request to transmit information on applications, management server 16 may transmit to mobile terminal 11-1 names of applications and identification numbers of applications that are registered in download-ready application area 53B of user information storing unit 53-1 (FIG. 6) (step S502). After receiving the information on the applications, mobile terminal 11-1 may display an application download server such as screen D22 (FIG. 21). Using the application download screen, the user of mobile terminal 11-1 can select an application that the user wants to download. An application may be selected by pushing a button whose number corresponds to the number of the application on the screen. For example, if the user pushes button "1" when screen D22 is displayed, the application titled "Schedule manager Ver.2" is selected. When an application is selected by the user of mobile terminal 11-1, mobile terminal 11-1 may transmit the identification number of the selected application to management server 16 (step S503).

After receiving the identification number of the selected application, management server 16 may read the data stored in download-ready application area 53B (FIG. 6), and determine whether the appointed application is given a reliability index at or above a determine level, such as "1" or more than "1." Next, management server 16 may read the data stored in downloaded application area 53A (FIG. 6) and check whether memory 12 (FIG. 3) of mobile terminal 11-1 has enough free space to store the selected application (step S504). In step S504, if the selected application is given a reliability index at or above the determined level, it is checked whether memory 12 has enough free space in management area 40. On the other hand, in step S504, if the appointed application is not given a reliability index at or above the determined level, it is checked whether memory 12 has enough free space in free area 41.

In step S504, if memory 12 of mobile terminal 11-1 does not have enough free space for storing the selected application, management server 16 may transmits a request to mobile terminal 11-1 to select an existing application to be deleted from memory 12 (step S505). The request for selecting an existing application may contain information indicating the reliability index of the application that is requested to be downloaded. When mobile terminal 11-1 receives the request for selecting an existing application for deletion, mobile terminal 11-1 may display a memory space screen such as screen D23 (FIG. 21) with display unit 21 (FIG. 2). In response to the screen, if the user of mobile terminal 11-1 pushes, for example, button "9" to instruct the execution of the following operations, mobile terminal 11-1 displays a deletion select screen such as screen D24 with display unit 21. If the application that is selected for downloading is an application with a reliability index at or above a determined level, such as "1" or more than "1", names of applications that are stored in management area 40, are listed in the deletion select screen. On the other hand, if the application that is selected for downloading is an application with a reliability index below a determined level, names of applications that are stored in free area 41 are listed on the deletion select screen In response to the deletion select screen, the user of mobile terminal 11-1 can select an application for deletion from memory 12 by depressing a button whose number corresponds to the number of the application on the deletion select screen. Mobile terminal 11-1 may transmit the identification number of the application selected for deletion to management server 16 (step S506). After the operation in step S506, mobile terminal 11-1 may display a down loading screen, such as screen D25 (FIG. 22) on display unit 21.

On the other hand, if memory 12 of mobile terminal 11-1 has enough free space at S504 to store the application selected for download, the operations in step S505 and step S506 may be skipped, and management server 16 may proceed with the operation in step S507. In this situation, mobile terminal 11-1 may display the down load screen on display unit 21. Next, management server 16 may read the data stored in download-ready application area 53B. In addition, management server 16 may check whether the application selected for download is stored in application information storing unit 52 (step S507).

Following is an example, with reference to FIGS. 6 and 7 of operations that are executed when an application selected for download is stored in application information storing unit 52. In addition, the example also includes operations that are executed when the application selected for download is not stored in application information storing unit 52.

If for example the identification number of the application selected for download by the mobile terminal 11-1 is "AP-4125 ", the corresponding storage number is "T-7851" according to the data example shown in FIG. 7. Accordingly, the application is stored in temporary custody application area 52T (FIG. 6) and is ready for download. If for example the identification number of the application selected for download is "AP-4513", then no data is given in the item "storage number" according to the data example shown in FIG. 7. Accordingly, the corresponding application is an application that may be stored in registration application area 52R or in a location indicated in registration application area 52R (FIG. 6).

On the contrary, if the identification number of the application that is selected for download by mobile terminal 11-1 is "AP-3021", the value of the item "storage number" corresponding to the application shows "deleted" according to the data example shown in FIG. 7. This means that application "AP-3021" is not stored either in temporary custody application area 52T or in registration application area 52R (FIG. 6). As explained later in step S523, if the requested application is an application that was not requested to be stored in registration application area 52R, the application is deleted from temporary custody application area 52T when the application is downloaded. Therefore, there can be some applications that are not found in application information storing unit 52 even though they are registered in download-ready application area 53B.

If the application selected for download is not stored in application information storing unit 52 at step S507 (such as example application "AP-3021"), management server 16 may read the data stored in registration application area 52R and obtain an address, such as a URL of content server 20-1, that corresponds to the identification number of the application. The address may provide the storage location information for the application. Then management server 16 may transmit a request to the content server 20-1 to transmit the application (step S508).

Figure 24:
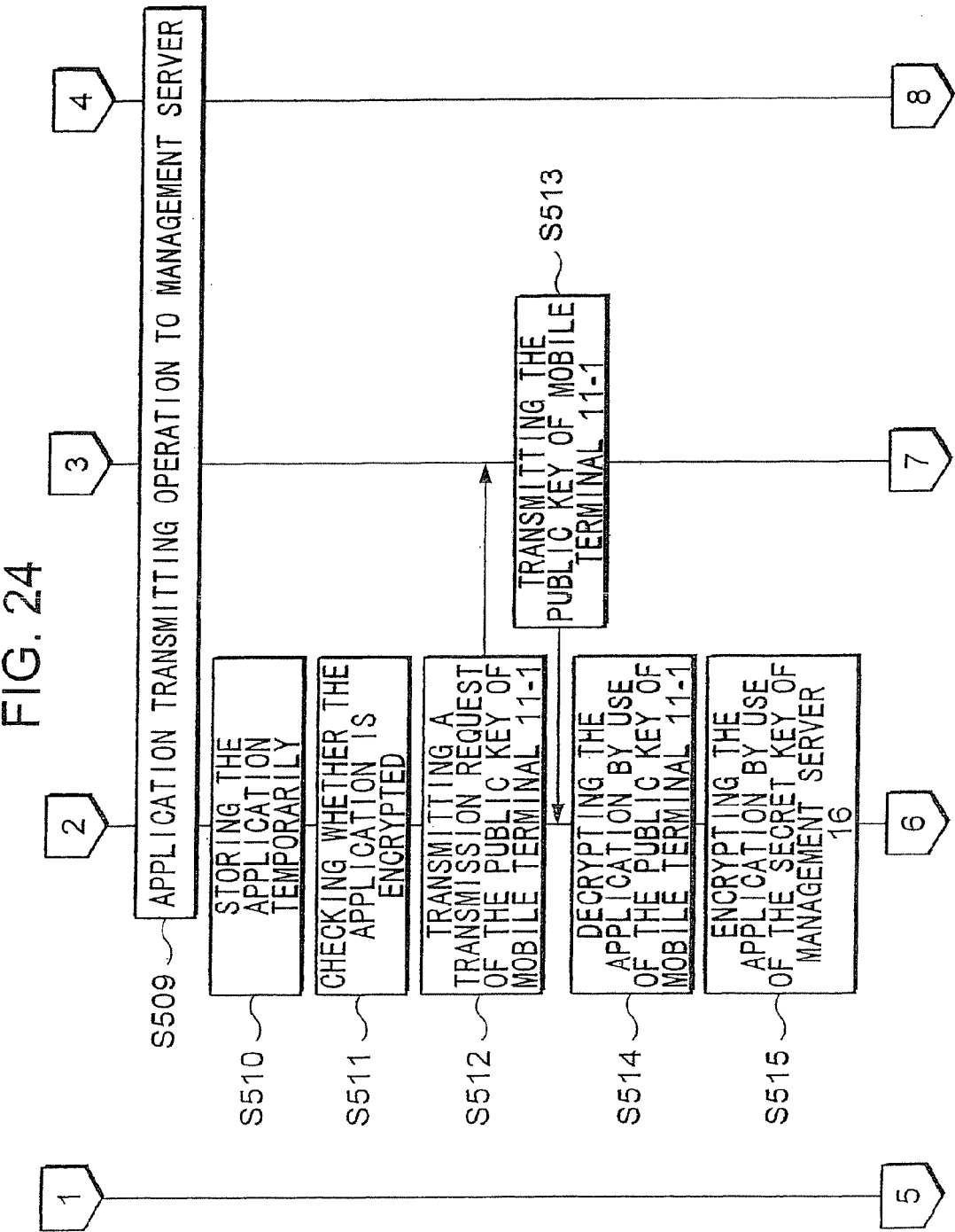

If the application, which is appointed to be downloaded, is given a reliability index at or above a determined level such as "1" or more than "1", content server 20, authentication server 17, and management server 16 may execute a series of operations. The operations may be similar to those of previously discussed "application transmitting operation 1 to management server" steps S103 through S111 that were discussed with reference to FIGS. 10 and 11. The series of operations may follow step S508 as illustrated in FIG. 24. On the other hand, if the application selected for download is not given a reliability index above a determined level, content server 20, authentication server 17, and management server 16 may execute a series of operations that are similar to those of previously discussed "application transmitting operation 2 to management server" steps S405 to S412 discussed with reference to FIGS. 18 and 19. This series of operations may also follow step S508. As a result of either of the series of operations, management server 16 may obtain the application (step S509).

Next, management server 16 may store the application that is obtained in step S509 in temporary custody application area 52T (step S510). If on the other hand, the application selected for download is found to be previously stored in application information storing unit 52, (such as in the case of applications "AP-4125 " or "AP-4513") management server 16 may skip the operations from step S508 to step S510, and move to the operation in step S511.

Next, management server 16 may determine whether the application selected for download and stored in application information storing unit 52, is encrypted (step S511). If the application selected for down load is assigned a reliability index at or above a certain level such as "1" or more than "1", the application stored in application information storing unit 52 may not be encrypted. If the application selected for download is assigned a reliability index less than a certain level such as "0", the application stored in application information storing unit 52 may be encrypted by use of the public key of mobile terminal 11 -1.

In step S511, if the application selected for download that is stored in application information storing unit 52, is not encrypted, management server 16 may transmit to authentication server 17, a request for transmitting "PK-MT-1" (the public key of mobile terminal 11-1) (step S512). In response to the request for transmitting the public key, authentication server 17 may transmit "PK-MT-1" to management server 16 (step S513).

After receiving "PK-MT-1", management server 16 may attach to the application information that indicates the location where the application should be stored in memory 12 of mobile terminal 11-1. Moreover, if the application is given a reliability index at or above a determined level such as "1" or more than "1", management server 16 may also attach the reliability index to the application. Then, management server 16 may encrypt the application using "PK-MT-1" (step S514). Because of this encryption, the application is secured against use by unauthorized users even if the application is wiretapped during transmission from management server 16 to mobile terminal 11-1. On the other hand, in step S511, if the application selected for download that is stored in application information storing unit 52 is encrypted, management server 16 may skip step S512 and step S514, and moves to step S515.

Next, management server 16 may encrypt the encrypted application again by use of "SK-MS" (the secret key of management server 16) (step S515). Due to encryption with "SK-MS", mobile terminal 11-1 can confirm that the application is transmitted by management server 16. That is to say, encryption with "SK-MS" plays the role of a certificate that enables mobile terminal 11-1 to confirm the transmitting device is management server 16. Management server 16 transmits the double-encrypted application to mobile terminal 11-1 (step S516).

After receiving the double-encrypted application, mobile terminal 11-1 may transmit a transmission request to authentication server 17 to transmit "PK-MS" (the public key of management server 16) (step S517). In response to the transmission request for the public key, authentication server 17 may transmit "PK-MS" to mobile terminal 11-1 (step S518). After receiving "PK-MS", mobile terminal 11-1 may decrypt the double-encrypted application using "PK-MS" (step S519). If decryption of the application fails, it means that the application received by mobile terminal 11-1 may have been falsified during transmission, damaged, and/or transmitted by a server other than management server 16. Upon a decryption failure, mobile terminal 11-1 may transmit, to management server 16, a retransmission request for the application selected for download. On the contrary, successful decryption of the application using "PK-MS" may confirm successful transmission of the application from management server 16. After successful decryption using "PK-MS," mobile terminal 11-1 may then decrypt the application again using "SK-MT-1" (the secret key of mobile terminal 11-1) (step S520).

Mobile terminal 11-1 may therefore obtain the un-encrypted application and information indicating the location in memory 12 of mobile terminal 11-1 where the application should be stored. Mobile terminal 11-1 may store the received application in application area 40A or application area 41A (FIG. 4) of memory 12 based on the information indicating the location for storing the application (step S521). In step S521, if a reliability index is included with the received application, mobile terminal 11-1 may record the reliability index in reliability information area 40R of the same management area 40 where the application is stored. If the application that the user of mobile terminal 11-1 selected to be deleted in step S506 is stored in the area indicated by the information, the stored application identified for deletion is overwritten by the newly downloaded application. Mobile terminal 11-1 may then transmit a notice of completion of storing the application to management server 16 (step S522). After the operation in step S522, mobile terminal 11-1 may display a standby screen server as screen D26 (FIG. 22) that is a standby screen used by display unit 21 (FIG. 2).

After receiving the notice of completion of storing the application, management server 16 may update the data in user information storing unit 53 and application information storing unit 52 (step S523). Specifically, if an application was deleted from memory 12 of mobile terminal 11, management server 16 may move the corresponding information related to the deleted application that is registered in downloaded application area 53A to download-ready application area 53B. Management server 16 may move the information related to the application that is newly stored in memory 12 from download-ready application area 53B to the corresponding location in downloaded application area 53A. Moreover, if the newly stored application is an application that is temporarily stored in temporary custody application area 52T, management server 16 may delete the application from temporary custody application area 52T.

[1.2.4] Activation of Application

Referring again to FIG. 3, after mobile terminal 11 downloads an application, an activation operation may be executed to allow the user of mobile terminal 11 to use the application.

The activation operation may be a series of operations by management server 16 to permit memory controller 35 of mobile terminal 11 to use a downloaded application. If an application that is downloaded to memory 12 of mobile terminal 11 has no restriction concerning terms of usage of the application, the activation operation for the application may be executed following download of the application. However, if the application has a certain condition for starting usage, the activation operation for the application may not be executed immediately after the download of the application. Instead, the application may be executed after the starting time of usage begins.

For example, an application for purchasing a commuter ticket on a certain form of public transport becomes valid on 1 April. The application is purchased by a user on 15 March and downloaded on 20 March by mobile terminal 11-1. The application cannot be used by the user between 20 March and 31 March even if the application itself is stored in memory 12 of mobile terminal 11-1. At the time when the date changes from 31 March to 1 April, the activation operation for the application may be executed, and the user of mobile terminal 11-1 will then be able to use the application.

Since a download operation and an activation operation are separate operations, a user of mobile terminal 11 can download an application at his/her convenience without restriction with regard to the period of validity for usage of the application. From another view point, if for example many users of mobile terminals 11 desired to download applications whose validity period for usage started on the same date and the users need to download the applications on the date usage started, network congestion on communication channels between management server 16, content server 20, and mobile terminal 11, may occur due to the large number of users trying to download the application in a short period of time. However, the magnitude of data traffic caused by an activation operation is usually much smaller than the magnitude of data traffic caused by the download operation of an application. Accordingly, the possibility of a network congestion occurring on the starting date of the validity period, can be reduced if users of mobile terminal 11 may download the application at any convenient time before the activation operation for the application is executed.

Following are examples of some cases where an activation operation may be executed. An activation operation may be executed when an application not restricted by a validity period for usage is downloaded to mobile terminal 11-1. An activation operation may also be executed when the validity period for usage of an application that has already been downloaded to mobile terminal 11-1 commences. Moreover, an activation operation may be executed when content server 20 of the application instructs management server 16 to execute the activation operation.

Referring now to FIGS. 1, 3, 4 and 6, an example flow of operations that are executed when an activation operation is executed for an application will now be explained. The application of this example is stored in management area 40-1 of mobile terminal 11-1. First, management server 16 may transmit an activation command to mobile terminal 11-1. The activation command may contain the identification number of management area 40-1 in memory 12 that will be used to specify the application to be activated. After communication unit 34 of mobile terminal 11-1 receives the activation command, communication unit 34 may transfer the command to memory controller 35. Until memory controller 35 receives the activation command, memory controller 35 may reject all requests made by control unit 31 of mobile terminal 11-1 for permission to use functions of an application in application area 40A-1, or to use data in data area 40D-1. Therefore, until the activation command is received, the user of mobile terminal 11-1 cannot use the application that is stored in management area 40-1.

After memory controller 35 receives the activation command, memory controller 35 may receive a request for permission to use the functions of an application in application area 40A-1 or the data in data area 40D-1 from control unit 31. Memory controller 35 may read the reliability index recorded in reliability information area 40R-1 of management area 40-1. Next, memory controller 35 may compare the reliability index of the requesting program that is transmitted from control unit 31 along with the request for permission to use with the reliability index read from reliability information area 40R-1. When the level of the reliability index of the requesting program is the same or higher than the level of the reliability index read from reliability information area 40R-1, memory controller 35 may accept the request, and execute operations according to the request as previously discussed.

After transmission of the activation command to mobile terminal 11-1, management server 16 may update the value of the item "activation" in downloaded application area 53A of user information storing unit 53-1 to "Yes." Then, management server 16 may read the data stored in registration application area 52R. If the value of the item "collection of usage charges" that corresponds to the application to be activated is "Yes," management server 16 may transmit to the charge management server, the billing information for the application. The billing information may include the identification number of the application, the identification number of mobile terminal 11-1, the time and date of the activation operation, and so on.

Figure 26:
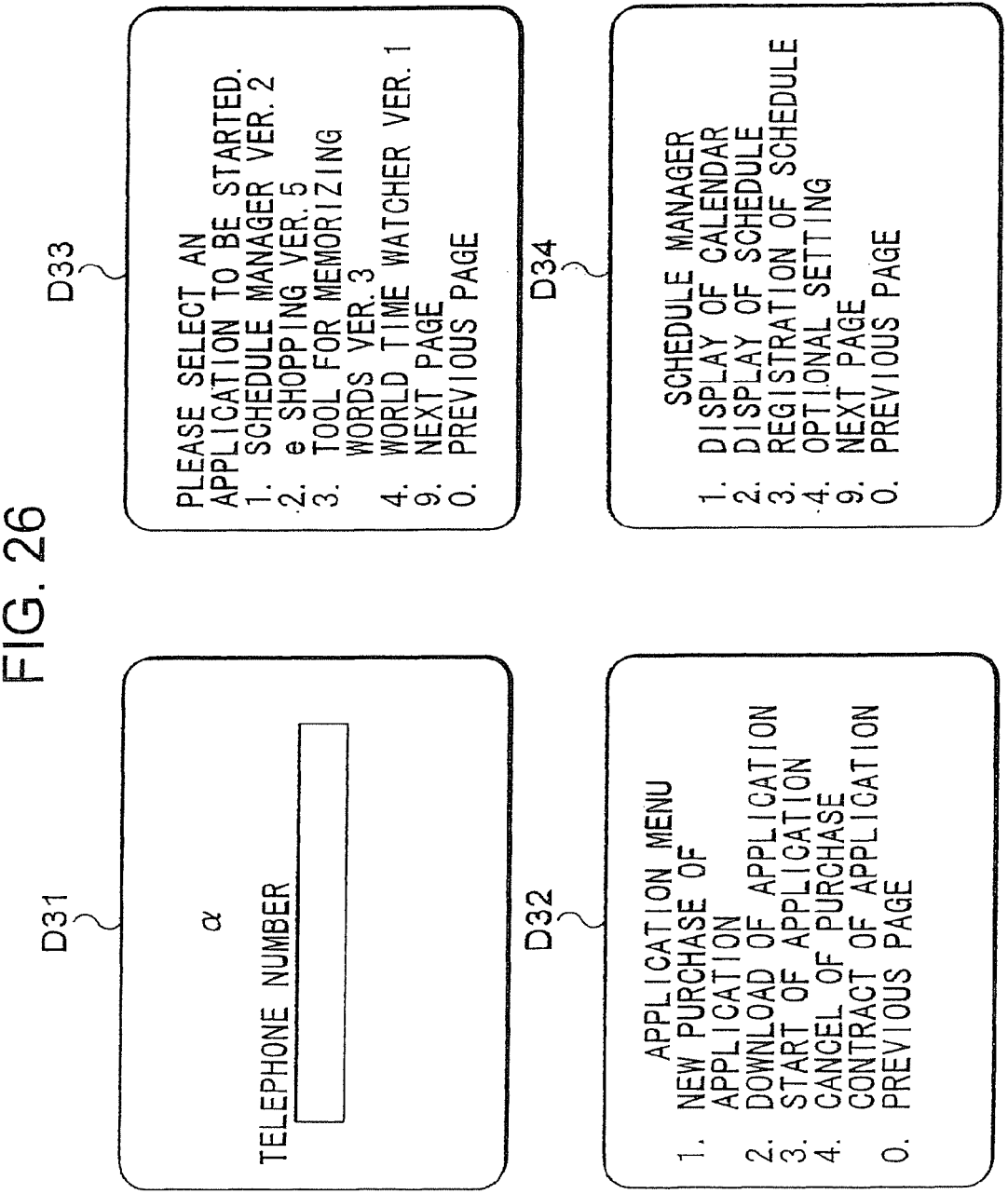
FIG. 26 is images showing screens, which are displayed in a mobile station when an application starting operation occurs according to the first embodiment and the second embodiment of the present invention.

When mobile terminal 11-1 receives the activation command, mobile terminal 11-1 may display a symbol, such as the letter "a" shown in a standby screen such as screen D31 of FIG. 26 with display unit 21 (FIG. 2) to inform the user of mobile terminal 11-1 that there is an application that has become usable. The letter "a" can be replaced with another letter such as "β" to differentiate from the completion notice in another application purchasing operation. This notice can also be communicated by displaying images, making sounds, vibrating the mobile terminal, and so on.

After the activation operation, if the user of mobile terminal 11-1 wants to start the application which has been activated, the user of mobile terminal 11-1 may push appli-button 23 (FIG. 2). In response, mobile terminal 11-1 may display an application menu such as screen D32 (FIG. 26). The user of mobile terminal 11-1 may push, for example, button "3" to appoint the item "3.Start of application." Mobile terminal 11-1 may then display a selection screen for selecting an application from usable applications such as screen D33 (FIG. 26). When the screen for selecting an application is displayed, the user of mobile terminal 11-1 may push button "1," for example, to select the item "1.Schedule manager Ver.2." The selected application may become operable and is displayed in an application screen such as screen D34 (FIG. 26).

[1.2.5] Deactivation of Application

After an activation operation is executed for an application in mobile terminal 11-1, there may be instances when use of the application needs to be discontinued. For example, if mobile terminal 11-1 is lost or stolen, the use of any application stored in mobile terminal 11-1 should be discontinued temporarily on the basis of a request from the user of mobile terminal 11-1. If there is a default in the payment of the usage charges for an application, or if the usage conditions for an application are violated by the user of mobile terminal 11-1, the use of the specific application stored in mobile terminal 11-1 should be discontinued temporarily in accordance with a request from the administration entity of content server 20-1 or management server 16.

In the previously mentioned examples, a deactivation operation may be executed. An example flow of operations that are executed when a deactivation operation is executed for an application which is stored in management area 40-1 of mobile terminal 11-1, will now be described. First, management server 16 may transmit a deactivation command to mobile terminal 11-1. The deactivation command may contain the identification number of management area 40-1 in memory 12 that will be used to specify the application to be deactivated. After communication unit 34 of mobile terminal 11-1 receives the deactivation command, communication unit 34 may transfer the command to memory controller 35. After memory controller 35 receives the deactivation command, memory controller 35 may reject all requests for permission to use the functions of an application in application area 40A-1 or the data in data area 40D-1 that are made by control unit 31 of mobile terminal 11-1. As a result, the user of mobile terminal 11-1 will not be able to use the application that is stored in management area 40-1.

After transmitting the deactivation command to mobile terminal 11-1, management server 16 may update the value of the item "activation", in downloaded application area 53A of user information storing unit 53-1 to "No." Then, management server 16 may read the data stored in registration application area 52R. If the value of the item "collection of usage charges" that corresponds to the application to be deactivated is "Yes", management server 16 may transmit the billing information on the application to the charge management server. The billing information may include the identification number of the application, the identification number of mobile terminal 11-1, the time and date of the deactivation operation, and so on.

After receiving a deactivation command, mobile terminal 11-1 may not display the name of the corresponding application on the screen for selecting an application from usable applications. If the deactivated application needs to be used by the user of mobile terminal 11-1 again, the previously explained activation operation may be executed for the application. For example, when a lost mobile terminal 11-1 is found or when the default of payment of usage charges for the application is resolved, an activation operation may be executed. The applications that are downloaded and stored in memory 12 of mobile terminal 11-1 and the data that is managed by the applications may become usable again when the application(s) are again activated.

[1.2.6] Deletion of an Application

There are some instances where the use of an application in mobile terminal 11-1 needs to be stopped permanently. For example, if the user of mobile terminal 11-1 decides to cancel a purchase contract of an application, use of the application may be stopped permanently. In the same way, when the validity period of usage of an application expires, or when the user of mobile terminal 11-1 commits a serious violation of the usage conditions of an application, use of the application may be stopped.

In these instances, the application may be deleted from memory 12 of mobile terminal 11-1. Information related to the deleted application that is registered in download-ready application area 53B of user information storing unit 53-1 may also be deleted.

Referring again to FIGS. 1, 3, 4 and 6, an example flow of operations that are executed when a deleting operation is performed for an application stored in management area 40-1 of mobile terminal 11-1 will now be described. First, management server 16 may read the data stored in downloaded application area 53A of user information storing unit 53-1. The data is read to determine whether the application to be deleted is stored in memory 12 of mobile terminal 11-1. If the application is stored in memory 12 of mobile terminal 11-1, management server 16 may transmit a deletion command to mobile terminal 11-1. The deletion command may include the identification number of management area 40-1 where the application that is to be deleted is located.

After receiving the deletion command, communication unit 34 of mobile terminal 11-1 may transfer the command to memory controller 35. When memory controller 35 receives the deletion command, memory controller 35 may delete the application, related data and related reliability information that is located in management area 40-1 as specified by the identification number. After the deleting operation, memory controller 35 of mobile terminal 11-1 may transmit a deletion complete notice to management server 16. When management server 16 receives the deletion complete notice, management server 16 may delete corresponding information related to the application from downloaded application area 53A of user information storing unit 53-1.

If, on the other hand, the application to be deleted is not stored in memory 12 of mobile terminal 11-1, management server 16 may delete information related to the application from download-ready application area 53B of user information storing unit 53-1. Management server 16 may then read the data stored in registration application area 52R. If the value of the item "collection of usage charges" of the application is "Yes", management server 16 may transmit to the charge management server billing information for the application such as identification number of the application, identification number of mobile terminal 11-1, the time and date of the deleting operation, and so on.

After the deleting operation, the name of the corresponding application is no longer displayed by the mobile terminal 11-1 on the previously discussed screens for selecting an application for starting and/or downloading.

[1.3] Coordinated Operations Between Applications Using Reliability Indexes

In the following description, coordinated operation of a plurality of applications using reliability indexes will be explained with examples. Referring again to FIGS. 1 and 4, as already mentioned, a plurality of applications are stored in memory 12 of mobile terminal 11-1. Each application stored in management area 40 may be given a reliability index such as an integer between "1" and "5." The reliability index may be recorded in reliability information area 40R. The range of reliability indexes may indicate the level of reliability of the application. An application with higher reliability may be enabled to use functions and data of an application whose reliability is equal or lower. On the contrary, an application whose reliability is lower may not be enabled to use functions or data of an application whose reliability is higher.

Control programs that are managed by control unit 31 of mobile terminal 11 and stored in control memory 32 may be assigned a highest level of reliability such as, a reliability index of "5". Regarding applications stored in free area 41, no reliability index may be recorded. When the reliability of an application stored in free area 41 and the reliability of another application are compared to each other, a lowest reliability, such as "0" may be adopted as a reliability index for an application stored in free area 41.

[1.3.1] A Case Where Coordinated Operations of Applications are Not Permitted

FIGS. 27, 28, 29, 30 and 31 illustrate example display screens in an example scenario where an application with a smaller reliability index cannot use functions or data of an application with larger reliability index. In this example, in application area 40A-1 of management area 40-1 (FIG. 4) of mobile terminal 11-1, an application for the purchase of a commuter ticket on a certain form of public transport (referred to as 'pass application' hereinafter) is stored. For purposes of this example, an activation operation has already been executed for the pass application, and the pass application can be readily used when purchased.

By using the pass application, the user of mobile terminal 11-1 can open the home page of a public transport system, such as "ABC Railroad Company." Using the home page, the user can purchase a commuter ticket, as well as get other related information such as timetables, etc. If the user of mobile terminal 11-1 purchases a commuter ticket using the pass application, the ticket may be in the form of radio signals. The radio signals may be transmitted by the mobile terminal to a ticket gate machine of "ABC Railroad Company." The radio signals representing the ticket may be transmitted in response to corresponding radio wave signals transmitted by the ticket gate machine as the user of the mobile terminal approaches the ticket gate. If the two radio signals match, the ticket gate machine may open the ticket gate automatically. In other words, mobile terminal 11-1 may take on the role of a commuter ticket. In this example, the reliability index of the pass application may be assigned a reliability level such as "3."

In application area 40A-2 of management area 40-2 (FIG. 4), an example application capable of performing automated payment settlement (referred to as "settlement application" hereinafter) may be stored. In this example, an activation operation has already been executed for the settlement application, and therefore the settlement application is available for use. By use of the settlement application, the user of mobile terminal 11-1 can open a home page of "xx Bank." In the home page of "xx Bank", the user can provide instructions to transfer money from his/her account to another account. The reliability index of the settlement application may be assigned a reliability index such as "5."

The user of mobile terminal 11-1 may push appli-button 23 (FIG. 2) to instruct mobile terminal 11-1 display an application menu, such as example screen D41 (FIG. 27) on display unit 21. When example screen D41 is displayed, the user may push button "3" to instruct mobile terminal 11-1 to display a start application screen for selecting an application for starting, such as example screen D42. When example screen D42 is displayed, the user may push button "1" to select an application such as the example pass application. In response to the selection, mobile terminal 11-1 may start the pass application. The pass application may, for example, open the home page of "ABC Railroad Company" as illustrated in example screen D43 of FIG. 27.

Figure 27:
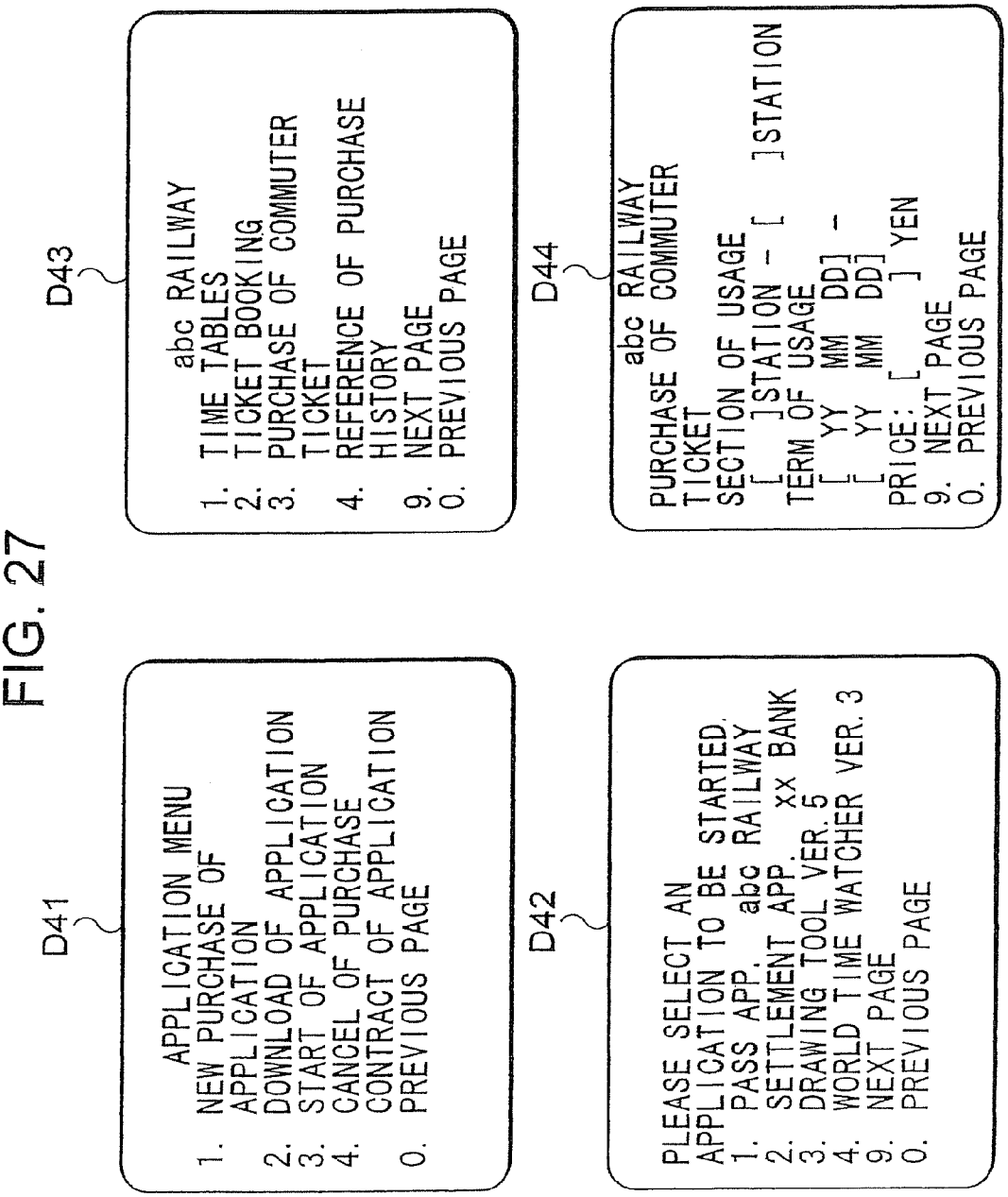

When example screen D43 is displayed, the user may push button "3" to select the item "3.Purchase of commuter ticket." Mobile terminal 11-1 may then display example screen D44 of FIG. 27. In example screen D44, the user may input data concerning section of usage and term of usage of a desired commuter ticket. The data may be input using operating unit 22 (FIG. 3) of the mobile terminal 11-1. The user may then push button "9" to transmit to the home page of "ABC Railroad Company" an instruction to purchase the commuter ticket.

The example pass application may then be executed by control unit 31 (FIG. 3) to search applications in memory 12 (FIG. 3) of mobile terminal 11-1 to identify an application that can settle payments. More specifically, control unit 31 may transmit requests to memory controller 35 (FIG. 3) to read applications stored in management areas 40 and free areas 41 (FIG. 4). The requests may include the identification number of management area 40-1 where the example pass application is stored. Accordingly, transmission of a request to read the application in management area 40-1 may be excluded.

When memory controller 35 receives the requests for reading applications in management areas 40 and free areas 41, memory controller 35 may read the reliability index for the pass application from reliability information area 40R of management area 40-1. The memory controller 35 may perform the read operation using the identification information of management area 40-1, that was received from control unit 31 along with the requests. In this example, the reliability index assigned to the pass application may be "3." This reliability index will be referred to as "reliability index of requesting application" hereinafter.

Memory controller 35 may then read the reliability indexes of other applications stored in management areas 40 and free areas 41. The reliability indexes may be read from reliability information areas 40R of management area 40-2, management area 40-3, . . . , and/or management area 40-n, based on the requests. Regarding free area 40-1, free area 40-2, . . . , and/or free area 40-m, a lowest reliability index, such as "0" may be adopted as reliability indexes for the applications in these areas since a reliability index may not have been assigned to these applications. The reliability indexes obtained by memory controller 35 are hereinafter referred to as "reliability indexes of requested applications."

Next, memory controller 35 may compare the reliability index of the requesting application and each of the reliability indexes of the requested applications. If the level of the reliability index of the requesting application is the same or higher than the reliability index of the requested application, memory controller 35 may read and transmit the requested application to control unit 31 according to the request. In this example, if the reliability index of the requested application is "3" or less than "3", memory controller 35 may read and transmit the requested application to control unit 31. Otherwise, memory controller 35 may transmit a notice of rejection to control unit 31.

Figure 28:
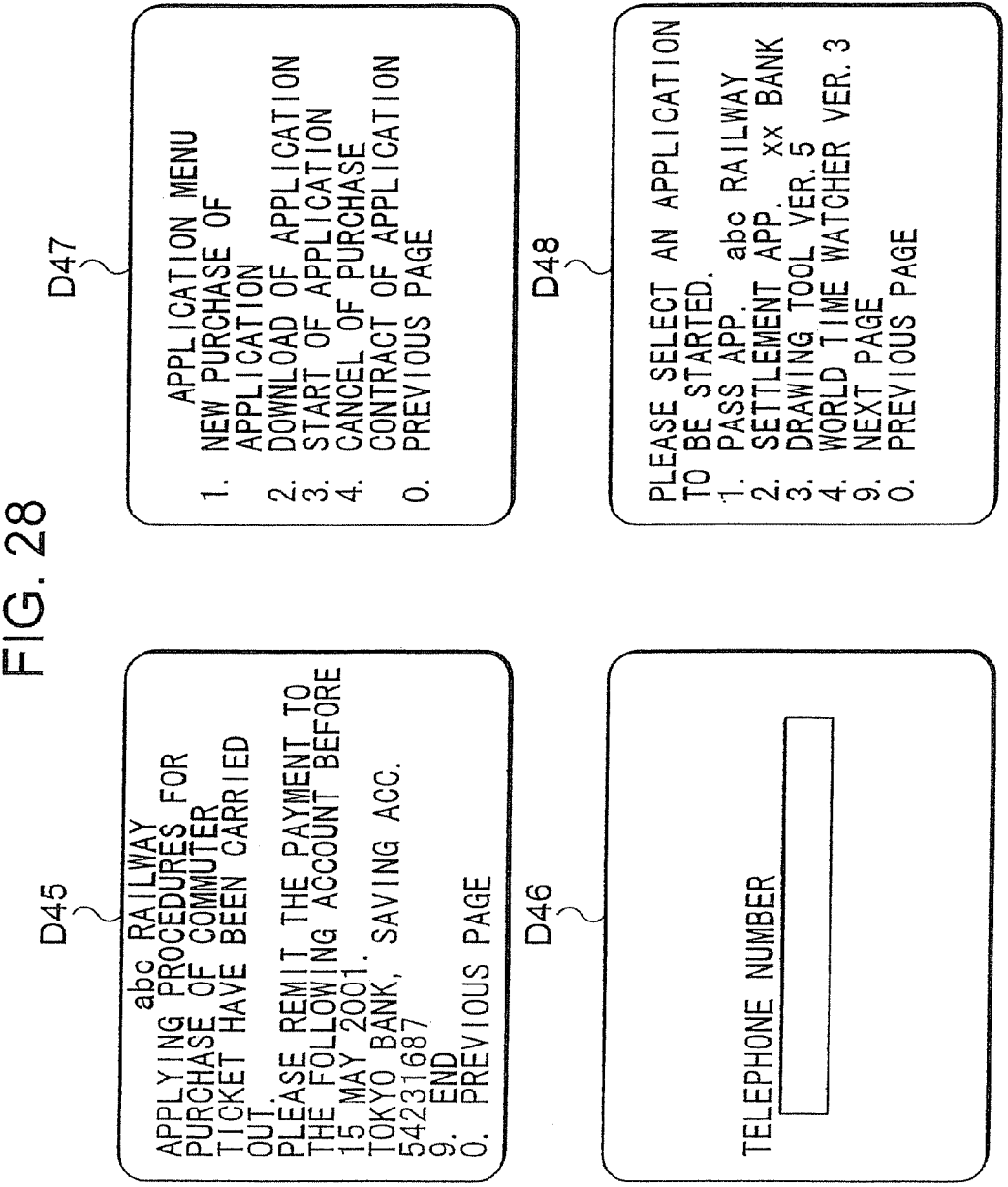

In this example, the settlement application that can settle payments is stored in management area 40-2, but the reliability index of the requested application for management area 40-2 is "5." Memory controller 35 may therefore reject the request of the pass application (requesting application) to read the settlement application (requested application). As a result, the pass application may not recognize the existence of the settlement application. Therefore, the pass application may fail to find an application that can settle payments in memory 12. As a result, mobile terminal 11-1 may display a manual payment request screen such as example screen D45 (FIG. 28). In example screen D45, the user is requested to manually complete remittance of the payment himself/herself. The user may write down the information shown in screen D45 on a piece of paper, etc., and push button "9" to quit the pass application. When execution of the pass application terminates, the standby screen shown as screen D46 (FIG. 28) may be displayed by display unit 21.

When standby screen D46 is displayed, the user may push appli-button 23 (FIG. 2) to instruct mobile terminal 11-1 to display an application menu such as example screen D47 (FIG. 28). When screen D47 is displayed, the user may push button "3" to instruct mobile terminal 11-1 to display a screen for selecting an application for starting, such as example screen D48 (FIG. 28). When screen D48 is displayed, the user may push button "2" and select the example settlement application. Mobile terminal 11-1 may then start the settlement application and open a home page of "xx Bank" such as example screen D49 (FIG. 29).

Figure 29:
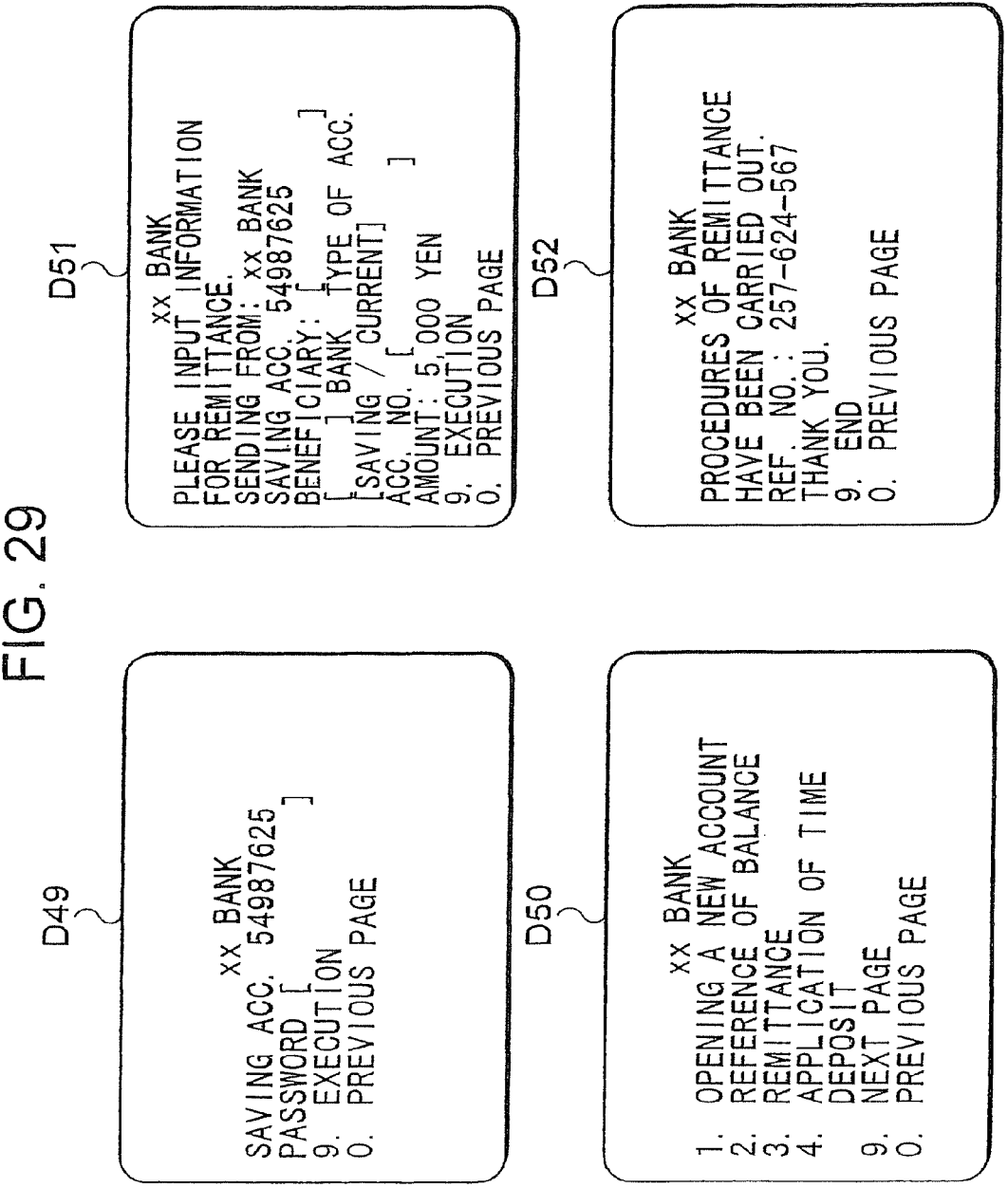

In example screen D49, the user may input a password and push button "9" to instruct mobile terminal 11-1 to display an operation selection screen such as, screen D50 (FIG. 29). When screen D50 is displayed, the user may push button "3" to select the item "3.Remittance", and a remittance screen, such as example screen D51 is displayed. In example screen D51, the user may input the information for remitting the payment to "ABC Railroad Company" that the user previously wrote down. The user may then push button "9" to execute instructions in the settlement application to transmit a remittance order to the home page of "xx Bank". "xx Bank" may receive the remittance order from mobile terminal 11-1 through the home page, and remit the payment to the appointed account of "ABC Railroad Company" in accordance with the remittance order. In display unit 21 of mobile terminal 11-1, a confirmation screen such as example screen D52 (FIG. 29) may then be displayed. On the other hand, "ABC Railroad Company" may confirm the remittance from "xx Bank", and complete the operation for purchase of the commuter ticket by mobile terminal 11-1. Completion of the operation may be indicated by updating information in a purchase history of mobile terminal 11-1.

Figure 30:
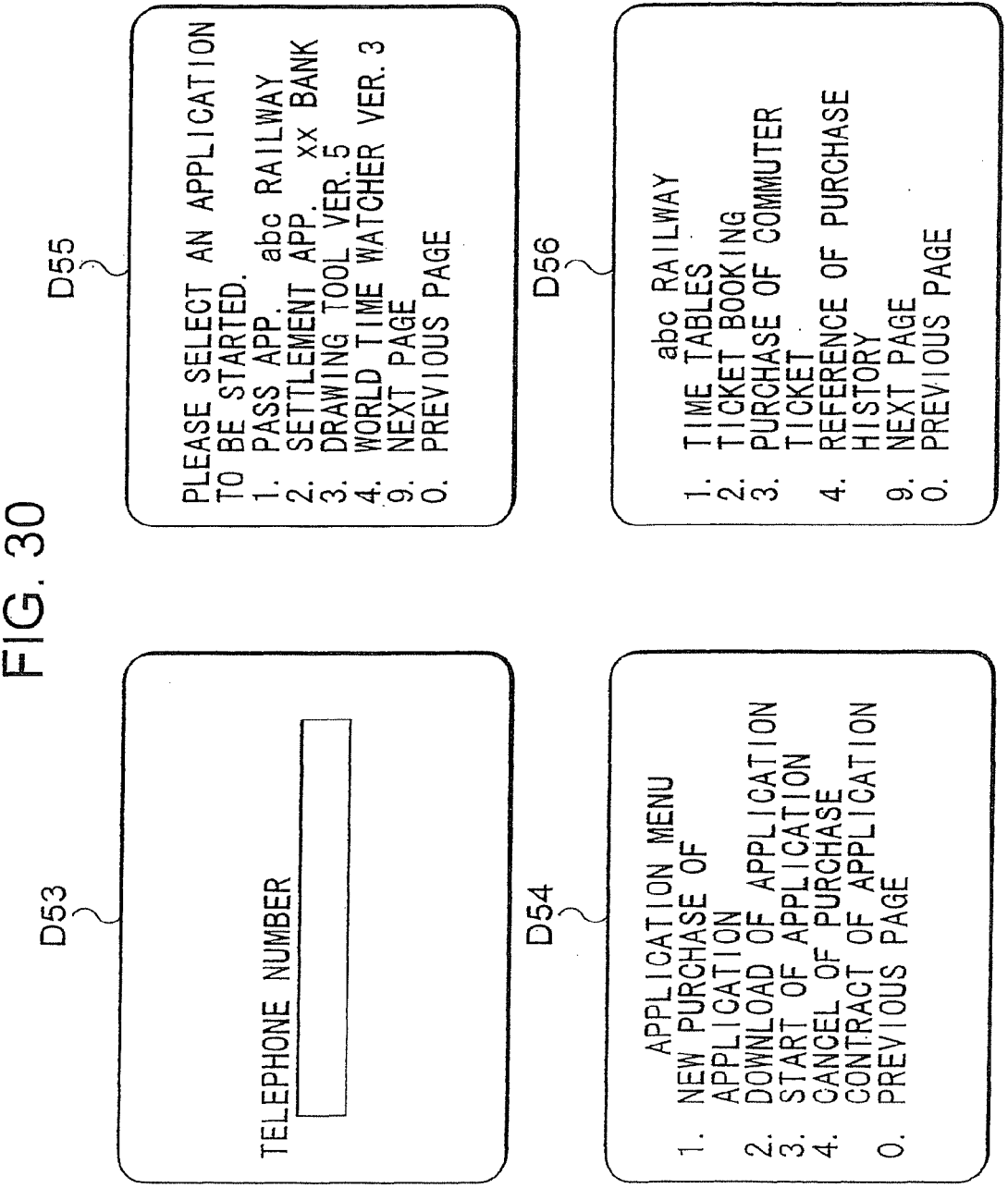

When confirmation screen D52 is displayed, button "9" may be pushed to instruct mobile terminal 11-1 to display the standby screen shown as screen D53 (FIG. 30). When example screen D53 is displayed, the user may again push appli-button 23 (FIG. 2) to instruct mobile terminal 11-1 to display the application menu illustrated as example screen D54 (FIG. 30). When example screen D54 is displayed, the user may push button "3" to instruct mobile terminal 11-1 to display an application start screen for selecting an application for starting, such as screen D55 (FIG. 30). When screen D55 is displayed, the user may push button "1" to start the example pass application and display example pass application screen D56 (FIG. 30).

When example screen D56 is displayed, if the user pushes button "4" to select the item "4.Reference of purchase history", mobile terminal 11-1 may display a purchase history screen such as example screen D57 (FIG. 31). When example screen D57 is displayed, if the user pushes button "1", mobile terminal 11-1 may display a purchase details screen, such as screen D58 (FIG. 31) showing detailed information on the status of the purchase of the commuter ticket. In example screen D58, the user can confirm that the remittance for the purchase of the computer ticket has been acknowledged by "ABC Railroad Company." Thus, the example operation for purchasing the commuter ticket has been completed successfully. The user may then push button "9", and mobile terminal 11-1 displays the standby screen shown as screen D59 (FIG. 31) on display unit 21 (FIG. 2).

[1.3.2] A Case Where Coordinated Operations of Applications are Permitted

Figure 32:
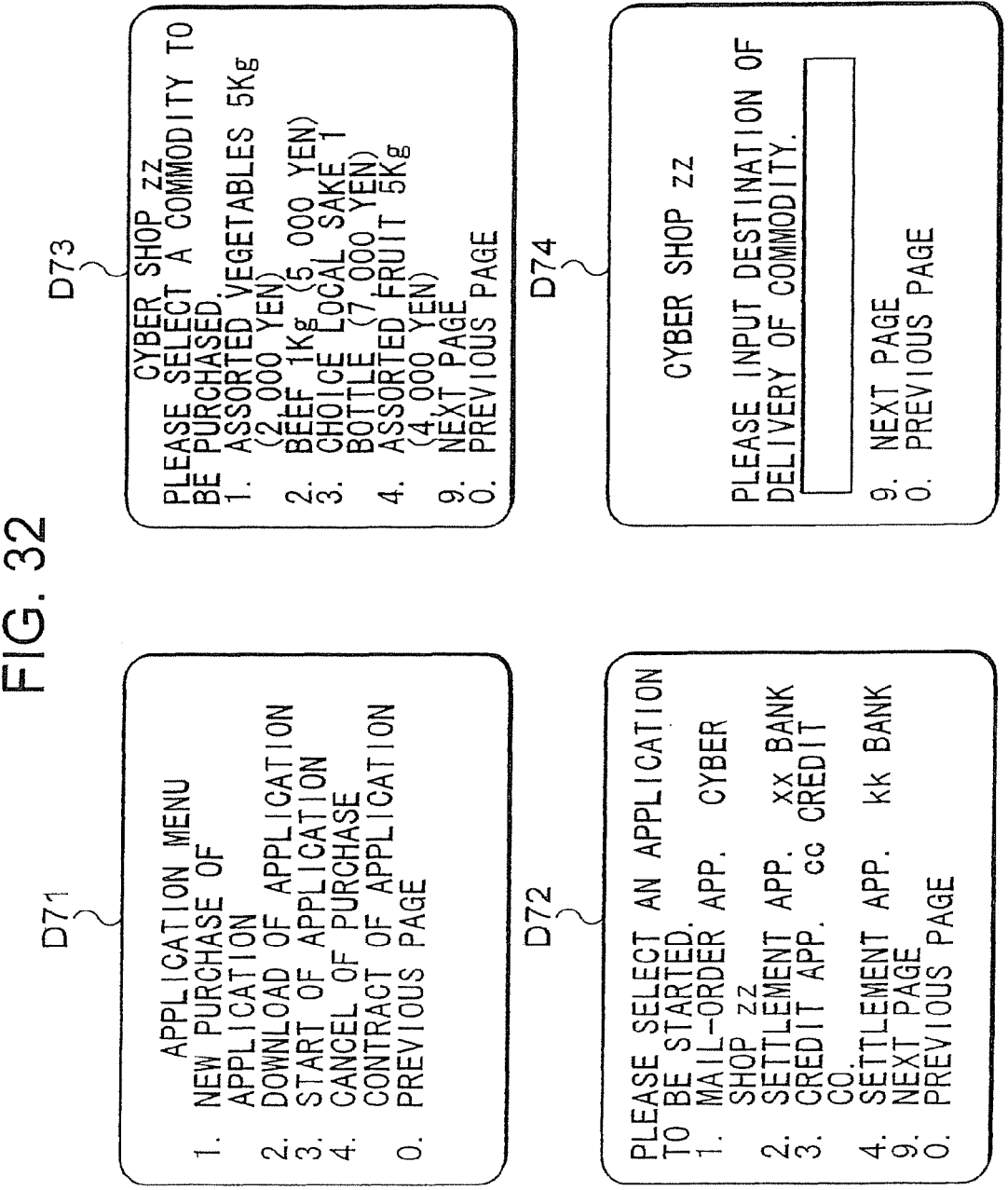
Figure 34:
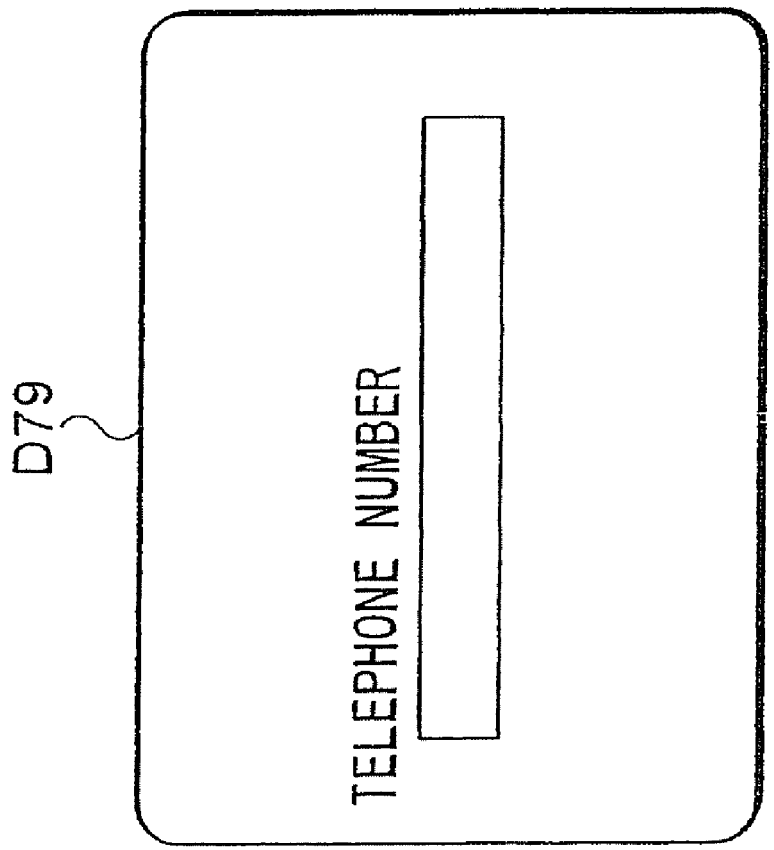

The following example describes a case where a first application assigned a reliability index level can use functions or data of a second application with a reliability index level that is the same or lower than the first application. FIG. 32, FIG. 33, and FIG. 34 are a plurality of example screens illustrating the example discussed with reference to FIG. 4.

In application area 40A of management area 40-1 of mobile terminal 11-1, an example application for mail-order shopping (referred to as "mail-order application" hereinafter) may be stored. In this example, an activation operation has already been executed for the mail-order application, and the mail-order application can now be readily used. By use of the mail-order application, the user of mobile terminal 11-1 can open a home page of "Cyber Shop zz." In the home page of the "Cyber Shop zz.," the user can purchase various kinds of commodities. For purposes of this example, the reliability index of the mail-order application is a relatively high reliability level, such as "4."

In application area 40A of management area 40-2, as in the previous example, the example settlement application may be stored. In this example, an activation operation has already been executed for the settlement application, and the settlement application is now ready to be used. The settlement application will be referred to as "settlement application 1" hereinafter. The reliability index of settlement application 1 in this example is a reliability level that is the same as the mail-order application, such as "4."

In application area 40A of management area 40-3, an example application that performs the function of settling payments by credit (referred to as "credit application" hereinafter) may be stored. For purposes of this example, an activation operation has already been executed for the credit application, and the credit application is now ready to be used. By use of the credit application, the user of mobile terminal 11-1 can open the home page of "cc Credit Company." In the home page of "cc Credit Company," the user can order settlement of payments by credit. For purposes of this example, the reliability index level assigned to the credit application is "4."

In application area 40A of management area 40-4, an example application that has similar function to that of settlement application 1, may be stored. The application can open the home page of "kk Bank" instead of "xx Bank." In the home page of "kk Bank," the user can order several operations such as remittance of payments. In this example, an activation operation has already been executed for the application, and the application is now ready to be used. The settlement application will be referred to as "settlement application 2" hereinafter. For purposes of this example, the reliability index level assigned to settlement application 2 is "5."

The user of mobile terminal 11-1 may first push application button 23 (FIG. 2) to make display unit 21 (FIG. 2) display an application menu illustrated as example screen D71 (FIG. 32). When example screen D71 is displayed, the user may push button "3" to instruct mobile terminal 11-1 to display an application start screen for selecting an application to start, such as example screen D72 (FIG. 32). When example screen D72 is displayed, the user may push button "1" to select the mail-order application. Mobile terminal 11-1 may start the mail-order application, and the mail-order application may open the home page of "Cyber Shop zz" that is illustrated as example screen D73 (FIG. 32).

When example screen D73 is displayed, if the user pushes button "2" to select the example of purchase of beef, the mail-order application may display an input screen, such as example screen D74 (FIG. 32) for inputting information for the delivery destination of the ordered commodity. In example screen D74, the user may input information related to the delivery destination of the purchased commodity, and then push button "9." The mail-order application may then search applications in memory 12 (FIG. 3) of mobile terminal 11-1 that can settle payments. In the following example the user has input "1-1-1 Shinjyuku-ku, Tokyo" as a delivery destination. The flow of operations to search applications that can settle payments is similar to the flow of operations explained previously with regard to the pass application. Accordingly, for purposes of brevity, the discussion will focus on differences with the previously described operations.

As previously discussed, the reliability index of the mail-order application that requests reading other applications in memory 12, is "4." In addition, the reliability index of settlement application 1 is "4." Since the level of reliability indexes are equal, memory controller 35 may accept a request from the mail-order application to read settlement application 1. Memory controller 35 may then transmit information on the functions of settlement application 1 to control unit 31. Control unit 31 may execute the mail-order application. Since the reliability index of the credit application is also "4," memory controller 35 may transmit information on functions of the credit application to control unit 31.

On the other hand, the reliability index of settlement application 2 is "5", which is a higher level than the reliability index of the mail-order application. Therefore, memory controller 35 may reject the request of control unit 31 to read settlement application 2, and the information on functions of settlement application 2 may not be transmitted to the mail-order application. As a result, the mail-order application recognizes that settlement application 1 and the credit application can be used as applications for settling payments, and displays a settlement screen, such as screen D75 (FIG. 33).

In example screen D75, if the user decides to use settlement application 1 for making the payment, and pushes button "1," the mail-order application may transmit a request to memory controller 35 to permit settlement application 1 to be read. At the same time, the mail-order application may give an execution order for when the transaction should be executed by settlement application 1. The execution order may also include necessary information for executing the transaction.

More specifically, control unit 31 that executes the mail-order application may request memory controller 35 to write an execution order. The execution order may include instructions that a remittance operation be carried out. The execution order may also include the necessary information from data area 40D-2 of management area 40-2 for the remittance operation. As previously discussed, in this example data area 40D-2 is allotted to settlement application 1. Thus, the information for the example remittance may include the following information: the amount is 5,000 yen, the receiver is "Cyber Shop xx," the receiving account is a savings account in "nn Bank" whose account number is "41256378," the purpose is payment for 1 kg of beef, and the delivery destination of the commodity is "1-1-1 Shinjyuku-ku, Tokyo."

Memory controller 35 may compare the reliability index of the requesting application, and the reliability index of the requested application. Since the reliability index levels are acceptable, memory controller 35 may accept the requests. As a result, control unit 31 may execute settlement application 1.

Settlement application 1 may then request the user of mobile terminal 11-1 to input a password for authentication of personal identification by displaying an authentication screen, such as D76 (FIG. 33). In example screen D76, if the user of mobile terminal 11-1 inputs a correct password, settlement application 1 may display a confirmation screen such as screen D77 (FIG. 33). The necessary information for the remittance may be read by settlement application 1 from data area 40D-2 of management area 40-2, and inserted into example screen D77. Therefore, the user does not need to input the information.

When example screen D77 is displayed, the user may confirm the remittance information, and push button "9" to proceed with remittance. Settlement application 1 may then transmit a remittance order to the home page of "xx Bank." Remittance information may also be transmitted by settlement application 1 to the home page of "xx Bank." The remittance information may include information pertaining to the purchased commodity, the delivery destination of the purchased commodity, etc.

When "xx Bank" receives the remittance order and the remittance information from mobile terminal 11-1, "xx Bank" may remit the designated payment to "Cyber Shop zz" along with the remittance information. "Cyber Shop zz" may confirm payment from "xx Bank." As a result, "Cyber Shop zz" may proceed with a delivery operation for the purchased commodity. In addition, "Cyber Shop zz" may transmit a confirmation of payment for the purchase to mobile terminal 11-1, along with other pertinent information such as the date of delivery and the ordering number.

Settlement application 1 may then be executed by control unit 31 of mobile terminal 11-1 to receive confirmation of payment from "Cyber Shop zz." In response, settlement application 1 may transmit to memory controller 35 a request to execute the mail-order application that called settlement application 1. In addition, settlement application 1 may transmit a request to write information, such as the date of delivery and the ordering number in data area 40D-1. As previously discussed, data area 40D-1 is the data area of the mail-order application.

Memory controller 35 may compare the reliability index of the requesting application (settlement application 1) and the reliability index of the requested application (mail-order application), and accept the requests. As a result, control unit 31 may start the mail-order application that was closed in the middle of a series of operations. The mail-order application may display a confirmation screen such as screen D78 (FIG. 33) after reading the date of delivery and the ordering number from data area 40D-1. When example screen D78 is displayed, the user may confirm the information sent from "Cyber Shop zz," and push button "9" to end the operation. In response, mobile terminal 11-1 may end the operation and display the standby screen such as screen D79 (FIG. 34).

As explained previously, an application that is given a high reliability value may be permitted to obtain high value information such as monetary information and personal information from other applications directly. In addition, such an application may be permitted to call functions of other applications that manage high value information. Moreover, if a reliability index of an application is at the highest level, such as "5," the application may be permitted to call control applications that are stored in control memory 32, and to use data that is managed by the control programs. As a result, the operations that users perform, can be simplified. Regarding information security, as previously explained, only the applications that pass examinations conducted by the administration entity of management server 16 (FIG. 1) are given a high reliability index level. The administration entity of management server 16 may also check, if necessary, whether applications with a high reliability value are falsified or not. Therefore, users can be guaranteed security when using applications with high value information.

[2] Second Embodiment

As explained hereafter, the difference between the first and the second embodiments is that, in the second embodiment reliability related information is used for coordinating operations instead of reliability index levels. The features of the second embodiment are similar in many respects to those of the first embodiment, therefore only those aspects that are different between the two embodiments will be described. In the following explanation, names and symbols that were used for various components in the first embodiment will be used for corresponding components in the second embodiment.

[2.1] Configuration and Functions of Authorization Data

In the second embodiment, the administration entity of management server 16 may be requested to examine an application of content server 20. The administration entity of management server 16 may determine the rights to read the application, the rights to read data, the rights to edit data, and the rights to delete data. The rights determination may be performed with regard to the newly examined application and each of the applications that were previously examined.

For example, an application whose identification number is "AP-3568" is newly examined. For purposes of this discussion, the application will be referred to as "application AP-3568," in the same manner that other applications are also referred to by their identification numbers. FIG. 35 gives an example of data indicating rights granted for application "AP-3568," and will be hereinafter referred to as "authorization data."

The data in the first column of FIG. 35 may indicate applications allowed to be read by application "AP-3568." For example, if control unit 31 needs to use any function of application "AP-3712" when application "AP-3568" is under execution, control unit 31 may transmit a request for permission to read application "AP-3712" to memory controller 35. As illustrated in FIG. 35, application "AP-3712" is indicated in the first column of authorization data for application "AP-3568." On the basis of this data, memory controller 35 may accept the request for permission to read application "AP-3712" when memory controller 35 receives such a request. After accepting the request, memory controller 35 may read application "AP-3712" from application area 40A of management area 40, and transmit it to control unit 31.

The data in the second column of FIG. 35 indicates applications with data that application "AP-3568" is allowed to read. For example, if control unit 31 needs to use any data of application "AP-8125" when application "AP-3568" is under execution, control unit 31 may transmit to memory controller 35 a request for permission to read data of application "AP-8125." As depicted in FIG. 35, application "AP-8125" is indicated in the second column of the authorization data for application "AP-3568."

On the basis of this data, memory controller 35 may accept the request for permission to read the data of application "AP-3712" when memory controller 35 receives such a request. After accepting the request for permission to read the data, memory controller 35 may read the requested data from data area 40D of management area 40 where application "AP-8125" is stored, and transmit the data to control unit 31.

The data in the third column of FIG. 35 indicates applications with data that application "AP-3568" is allowed to edit. Data in the fourth column of FIG. 35 indicates applications with data that application "AP-3568" is allowed to delete. On the contrary, data in the fifth column of FIG. 35 indicates applications that have permission to read application "AP-3568." For example, if control unit 31 needs to use any function of application "AP-3568" when application "AP-4315" is under execution, control unit 31 transmits to memory controller 35 a request for permission to read application "AP-3568." Application "AP-4315" is indicated in the fifth column of authorization data for application "AP-3568." On the basis of the data, memory controller 35 may accept the request for permission to read application "AP-3568" when memory controller 35 receives the request. After accepting the request, memory controller 35 may read application "AP-3568" from application area 40A of management area 40, and transmit it to control unit 31.

Similarly, the data in the sixth column of FIG. 35 indicates applications that are allowed to read the data of application "AP-3568". The data in the seventh column of FIG. 35 indicates applications that are allowed to edit the data of application "AP-3568," and the data in the eighth column of FIG. 35 indicates applications that are allowed to delete the data of application "AP-3568."

[2.2] Registration and Update of Reliability Related Information

As shown in FIG. 36, data within registration application area 52R of application information storing unit 52 of management server 16 (FIG. 6) has the item "reliability related information," instead of the item "reliability index" as in the first embodiment (FIG. 8). Upon completion of the examination of application "AP-3568," the administration entity of management server 16 may input the authorization data shown in FIG. 35 into management server 16. After the authorization data has been input into management server 16, management server 16 may create a new record for application "AP-3568" in registration application area 52R. The data of the fifth, the sixth, the seventh, and the eighth columns illustrated in FIG. 35 may be used as the authorization data in the item "reliability related information" in the new record.

Management server 16 may next update the data in the illustrated item "reliability related information." The "reliability related information" in FIG. 36 may be updated to correspond to applications indicated in any of the columns from the first column to the fourth column of the authorization data of FIG. 35. For example, application "AP-3712" is indicated in the first column of the authorization data of application "AP-3568" of FIG. 35. Thus, management server 16 may add the identification number of application "AP-3568" to the sub-item "reading application" in the item "reliability related information" of the record corresponding to application "AP-3712" in registration application area 52R, as illustrated in FIG. 36.

Next, management server 16 may read the data in downloaded application area 53A of each of user information storing unit 53-1, user information storing unit 53-2, . . . , and user information storing unit 53-k (FIG. 6). Then, from each of the first column to the fourth column of the authorization data of application "AP-3568" in FIG. 35, management server 16 may list all user information storing units 53, with data within the item "reliability related information" that was updated in the above-mentioned operation. In other words, management server 16 may list all of user information storing units 53 that include identification numbers of applications indicated in the authorization data (FIG. 35) of application "AP-3568." Management server 16 may then add the identification number of application "AP-3568" to the corresponding sub-item of the item "reliability related information" of user information storing units 53 that are listed. Then, management server 16 may transmit a notice to mobile terminals 11 that the identification number of application "AP-3568" was added to the item "reliability related information" for each of the user information storing units 53 that the identification number of application "AP-3568" was added.

For example, according to the data of user information storing unit 53-2 shown in FIG. 7, mobile terminal 11-2 stores application "AP-0123" in application area 40A-2 of management area 40-2 of memory 12 (FIG. 4). Application "AP-0123" is included in the first column of the authorization data shown in FIG. 35 to indicate that application "AP-3568," which is newly examined, is given a right to read application "AP-0123." Therefore, management server 16 may transmit to mobile terminal 11-2 a notice that the identification number of application "AP-3568" was newly entered in the sub-item "reading application" of the item "reliability related information" corresponding to application "AP-0123" in user information storing unit 53-2 (FIG. 7).

Referring to FIGS. 3 and 4, mobile terminal 11 may download into memory 12 an application having contents that have been examined. Reliability related information corresponding to the application may also be downloaded into mobile terminal 11 along with the application. Memory controller 35 (FIG. 3) of mobile terminal 11 may record the reliability related information. The reliability related information may be recorded in reliability information area 40R of management area 40 allotted to the application. (FIG. 4)

As mentioned in the preceding example, mobile terminal 11-1 may receive a notice from management server 16 that the identification number of application "AP-3568" has been newly entered in the sub-item "reading application" of the item "reliability related information" in user information storing unit 53-2. User information storage unit 53-2 corresponds to application "AP-0123." Memory controller 35 of mobile terminal 11-1 may include the identification number of application "AP-3568" in the item "reading application" of the data stored in reliability information area 40R-2 of management area 40-2, which is allocated to application "AP-0123."

According to the above-mentioned operations, the data stored in registration application area 52R of application information storing unit 52 and the data recorded in reliability information area 40R of management area 40 of each mobile terminal 11 may remain updated. Accordingly, new data is maintained.

[2.3] Coordinated Operations Between Applications Using Reliability Related Information Referring now to FIGS. 1, 3 and 4, when an application needs to use functions or data of another application in mobile terminal 11, control unit 31 may transmit a request. The request may be to permit use of the application, or the data of the application, and include the identification number of the memory area where the requested application is stored (referred to as "requested application's area number" hereinafter). In addition, the request may include the identification number of the application that initiates the request. The request may be transmitted to memory controller 35.

The memory area that is indicated by the requested application's area number may be one of the memory areas of management areas 40. As a result, memory controller 35, may read the reliability related information from reliability information area 40R of management area 40 allotted to the requested application. Memory controller 35 may next determine whether the identification number of the requesting application is contained in the item in the reliability related information that corresponds to the content of the request.

For example, control unit 31 may transmit to memory controller 35 a request while under the execution of application "AP-2568." The request may be for permission to read application "AP-0123" stored in application area 40A-2. Memory controller 35 may read the reliability related information from reliability information area 40R-2. In addition, memory controller 35 may check whether the identification number of application "AP-2568" is contained in the item "reading application" of the reliability related information read from reliability information area 40R-2. If the identification number of the requesting application ("AP-2568") is contained in the corresponding item, memory controller 35 may accept the request of control unit 31.

Once the request is accepted, the memory controller 35 may execute operations to fulfill the request. On the contrary, if the identification number of the requesting application is not contained in the item "reading application," memory controller 35 may reject the request of control unit 31. Accordingly, the operations of memory controller 35 that are carried out using reliability related information may flexibly manage coordinated operations between applications.

[3] Third Embodiment

In the third embodiment, the flow of operations for delivering an application is different from that of the first embodiment, but to a large extent the features of the third embodiment are similar to those of the first embodiment. Therefore, the following description will focus on those aspects of the third embodiment that are different from the first embodiment. Similar names and symbols will be used for components of the third embodiment that correspond with those of the first embodiment.

[3.1] Overall Configuration of Application Delivery System

Referring to FIG. 1, in the third embodiment, just as in the first embodiment, when the administration entity of content server 20 requests an examination of an application, the application may be examined by the administration entity of management server 16. A reliability index may then be assigned to the application. However, in the third embodiment, after the reliability index is assigned to the application, the administration entity of management server 16 may create a message digest of the application.

The message digest may be created using a hash function. A data set created from an original data set using a hash function is irreversible. Accordingly, an application cannot be restored from a message digest of the application. However, there is almost no possibility of the same message digest being created from applications having different contents since the contents of each application almost certainly differ, however slightly. Therefore, if any part of the content of an application has changed, the message digest created from the original application using a hash function, and the message digest created from the changed application using the same hash function will not be the same.

Since the size of a message digest is usually much smaller than that of the application corresponding to the message digest, message digests may require a relatively small storage space, and can be transmitted more quickly. The administration entity of management server 16 may store the created message digest in application information storing unit 52 (FIG. 5) along with the reliability index of the application.

FIG. 37 shows an example of data stored in application information storing unit 52 in the third embodiment. However, FIG. 37 does not show the item "publication," because in the third embodiment, management server 16 may not publicize to mobile terminal 11 information on applications that are given reliability indexes.

Furthermore, in the third embodiment, applications themselves are not stored in application information storing unit 52 of management server 16 (FIG. 5). Instead, the applications may be stored in content servers 20 that are providers of the applications. Therefore, in the data format shown in FIG. 37, no application is listed in the item "storage location information." The information in the item "storage location information" is instead addresses, such as URLs that indicate the storage location where each of the applications are stored.

In addition, in the third embodiment, content servers 20 that are providers of applications may deliver their applications directly to each mobile terminal 11. In the third embodiment, therefore, it is not necessary to create temporary custody application area 52T in application information storing unit 52 of management server 16 (FIG. 6). Also, the item "storage number" listed in user information storing unit 53 of management server 16 for specifying each application stored in temporary custody application area 52T, is not included in the third embodiment as this is also unnecessary.

FIG. 38 is a diagram showing an example configuration of the application information management system in the third embodiment. FIG. 39 is a format chart showing an example of data stored in user information storing unit 53 in the third embodiment. Moreover, in the third embodiment, when memory controller 35 of mobile terminal 11-1 receives a message digest from management server 16, memory controller 35 may temporarily store the message digest. Then, when memory controller 35 receives an application that is given a reliability index above a determined level such as, "1" or more than "1," memory controller 35 may create a message digest of the received application using the same hash function used by the management server 16. In addition, memory controller may verify the newly created message digest against the message digest that was received from management server 16.

[3.2] Delivery of Application

Figure 40:
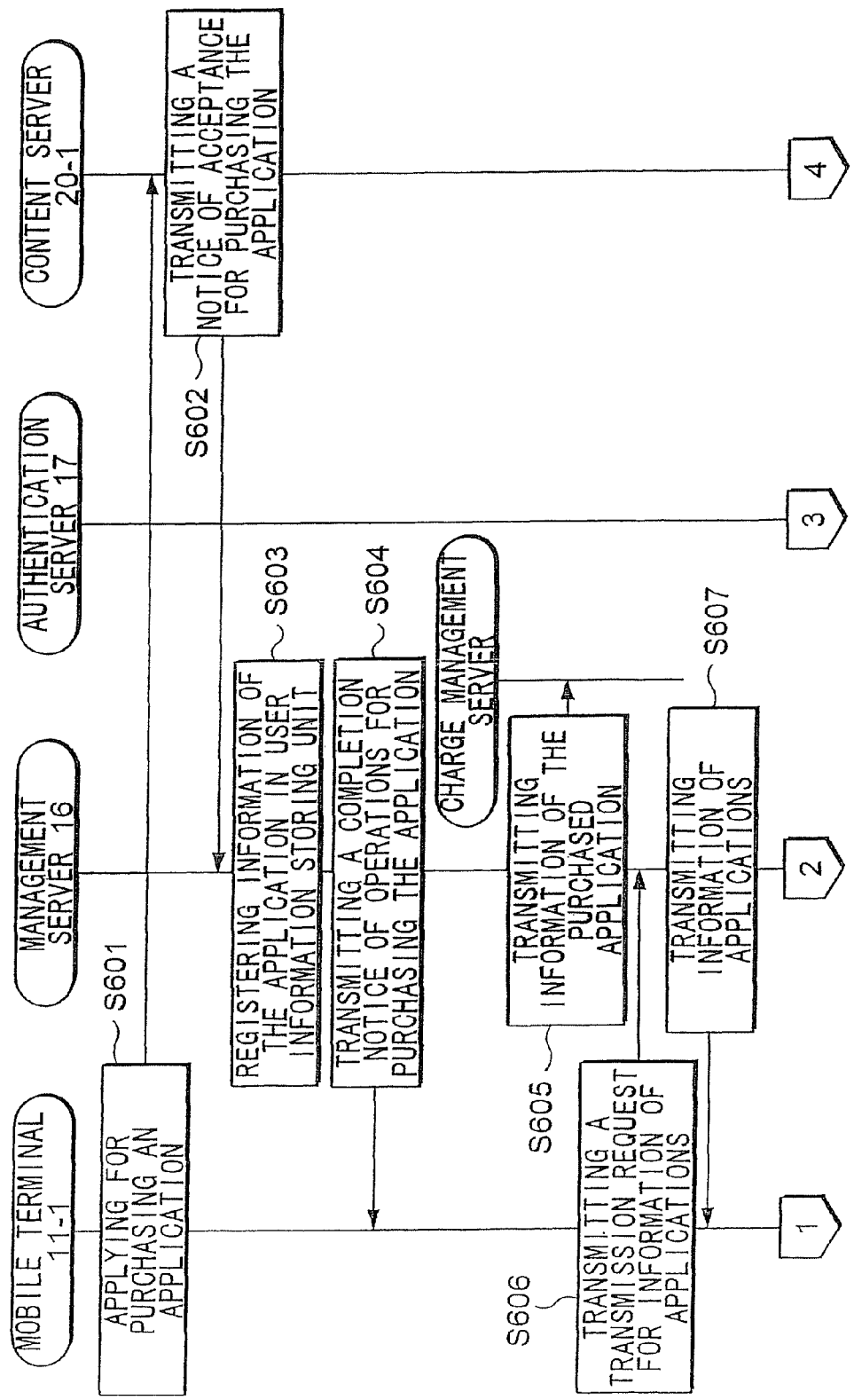

A series of example operations, to be executed when the user of mobile terminal 11-1 purchases and downloads an application will now be described with reference to FIG. 40, FIG. 41, and FIG. 42. In this example, the downloaded application may be given a reliability index greater than or equal to a determined level, such as "1" or more than "1." In addition, the downloaded applications may be provided by content server 20-1. The screens displayed by display unit 21 (FIG. 2) of mobile terminal 11-1 in the example flow of operation hereinafter explained, are similar to the screens illustrated in FIGS. 21 and 22. The screens illustrated in FIGS. 21 and 22 were used to explain the download operation in the first embodiment. Therefore, FIGS. 21 and 22 are also referred to in the following explanation.

The user of mobile terminal 11-1, for example, may display a home page of content server 20-1 in mobile terminal 11-1. The user may elect to purchase an application given in the home page (step S601). The user of mobile terminal 11-1 may also follow the procedure for settling the usage charges of the application as previously discussed. Content server 20-1 may check whether the contents of purchase request meet the requirements. If the contents of purchase request meet the requirements, content server 20-1 may transmit a notice of acceptance to management server 16 to purchase the application (step S602). The notice of acceptance may include the identification number of mobile terminal 11-1 that will be purchasing the application, and the identification number of the purchased application. In addition to transmitting the notice of acceptance, content server 20-1 may also record the identification number of mobile terminal 11-1 that requested purchase of the application.

After receiving the notice of acceptance from content server 20-1, management server 16 may specify the mobile terminal 11-1 that purchased the application. The mobile terminal 11-1 may be specified according to the identification number of the mobile terminal 11-1 contained in the received notice of acceptance. Management server 16 may then register the identification number of the application contained in the notice of acceptance in download-ready application area 53 of user information storing unit 53-1 (FIG. 38) that corresponds to mobile terminal 11-1 (step S603).

Next, management server 16 may transmit a notice of completion of operations to purchase the application to mobile terminal 11-1 (step S604). When mobile terminal 11-1 receives the notice of completion, mobile terminal 11-1 may display a symbol, such as the letter "a" on display unit 21. The symbol may be displayed to inform the user of mobile terminal 11-1 that the newly purchased application is ready to be downloaded from management server 16.

If the purchased application is an application with usage charges managed by management server 16, management server 16 may transmits billing information for the purchased application to the charge management server (step S605). The billing information may include the identification number of the application, the identification number of mobile terminal 11-1, the time and date of purchase of the application, etc.

The user of mobile terminal 11-1 may push appli-button 23 (FIG. 2) of mobile terminal 11-1 to display an application menu screen such as the example screen shown as screen D21 (FIG. 21). When example screen D21 is displayed, the user of mobile terminal 11-1 may push button "2" of operating unit 22, for example, to select the item "2.Download of application." When button "2" is depressed, mobile terminal 11-1 may transmit to management server 16 a request for application information (step S606). The request for application information may be a request to transmit information pertaining to applications that can be downloaded to mobile terminal 11-1.

After receiving the request for application information, management server 16 may transmits to mobile terminal 11-1 names and identification numbers of applications that are registered in download-ready application area 53B of user information storing unit 53-1, as the information of applications (step S607).

After receiving the application information, mobile terminal 11-1 may display an application download screen such as, screen D22 (FIG. 21). In response to the D22 example screen, the user of mobile terminal 11-1 can select an application for download by pushing a button whose number corresponds to the number of the application on the screen. For example, if the user pushes button "1" when screen D22 is displayed, the application titled "Schedule manager Ver.2" is selected. When an application is selected by an operation of the user of mobile terminal 11-1, mobile terminal 11-1 transmits the identification number of the selected application to management server 16 (step S608).

After receiving the identification number of the selected application, management server 16 may read the storage requirements of the selected application stored in downloaded application area 53A (FIG. 38). In addition, management server 16 may check whether memory 12 of mobile terminal 11-1 has enough free space to store the selected application (step S609)

In step S609, if memory 12 of mobile terminal 11-1 does not have enough free space to store the selected application, management server 16 may transmit a request to mobile terminal 11-1 to select an application to be deleted from memory 12 (step S610). When mobile terminal 11-1 receives the request to select an application, mobile terminal 11-1 displays a delete screen such as screen D23 (FIG. 21) on display unit 21 (FIG. 2). In response to the example delete screen, the user of mobile terminal 11-1 may push button "9." In response to button "9" mobile terminal 11-1 may display a selection screen such as screen D24 (FIG. 21) on display unit 21.

On example screen D24, the names of applications that are currently stored in management area 40 may be listed. In response to the information displayed on the screen, the user of mobile terminal 11-1 can select an application to be deleted from memory 12. Selection may be made by pushing a button whose number corresponds to the number of the application on the screen. Mobile terminal 11-1 may transmit the identification number of the selected application to management server 16 (step S611). After the operation in step S611 is carried out, mobile terminal 11-1 may display a notification screen such as screen D25 (FIG. 25) on display unit 21.

On the contrary, in step S609, if memory 12 of mobile terminal 11-1 has enough free space for storing the selected application, the operations in step S610 and step S611 may be skipped. Management server 16 may execute the operation in step S612. In addition, mobile terminal 11-1 may display a standby screen such as screen D25 (FIG. 22) on display unit 21.

Management server 16 may then read the information related to the selected application from application information storing unit 52 (FIG. 38). The information may include a message digest of the application, the reliability index of the application, the storage location information of the application, etc. As previously discussed, the message digest is a certificate of content of the application that may be created by the management server 16 using a hash function when the application is assigned a reliability index. The information may be read using the identification number of the application. The management server 16 may transmit the information to mobile terminal 11-1 (step S612).

Mobile terminal 11-1 may receive the message digest of the application, the reliability index of the application, the storage location information of the application, etc., from management server 16. Mobile terminal 11-1 may then transmit to content server 20-1, a request to transmit the application (step S613). The request to transmit the application may be made using the storage location information of the application. The request to transmit the application may include the identification number of mobile terminal 11-1 and the identification number of the application.

After receiving the request to transmit the application, content server 20-1 may check whether the identification number contained in the request matches the identification number of the mobile terminal, for which content server 20-1 accepted the request to purchase the application in step S602. If these identification numbers match, content server 20-1 may transmit a request to authentication server 17 (FIG. 1) to transmit "PK-MT-1" (the public key of mobile terminal 11-1) (step S614). In response to the request to transmit "PK-MT-1," authentication server 17 may transmit "PK-MT-1" to content server 20-1 (step S615). After receiving "PK-MT-1," content server 20-1 may encrypt the purchased application using "PK-MT-1" (step S616).

Due to the encryption, unauthorized users cannot utilize the application if the application is wiretapped during transmission from content server 20-1 to mobile terminal 11-1. As a result, unauthorized usage of the application can be prevented. Content server 20-1 may transmit the encrypted application to mobile terminal 11-1 (step S617).

When mobile terminal 11-1 receives the encrypted application, mobile terminal 11-1 may decrypt the application using "SK-MT-1" (the secret key of mobile terminal 11-1) (step S618). Mobile terminal 11-1 may create a message digest for the decrypted application using the same hash function previously used by the management server 16. In addition, mobile terminal 11-1 may compare the newly created message digest and the message digest that was received from management server 16 through the operation in step S612 (step S619). If the message digest from management server 16 and the newly created message digest match, it is confirmed that the application received by mobile terminal 11-1 has not been altered. If on the other hand, the message digests do not match, the application is not stored in memory 12, and mobile terminal 11-1 may transmit a failure notice to management server 16 indicating failure to receive the proper application.

In step S619, if the message digests match, mobile terminal 11-1 may store the application in one of application areas 40A of management areas 40 in memory 12 (FIG. 38) (step S620). If in step S609, memory 12 (FIG. 3) does not have enough free space to store the application, the newly received application may be written in the management area 40 where the application selected to be deleted in step S611, is stored. In step S609, if there is enough free space in memory 12, the received application may be written in one of management areas 40 that did not have an application stored.

Figure 25:
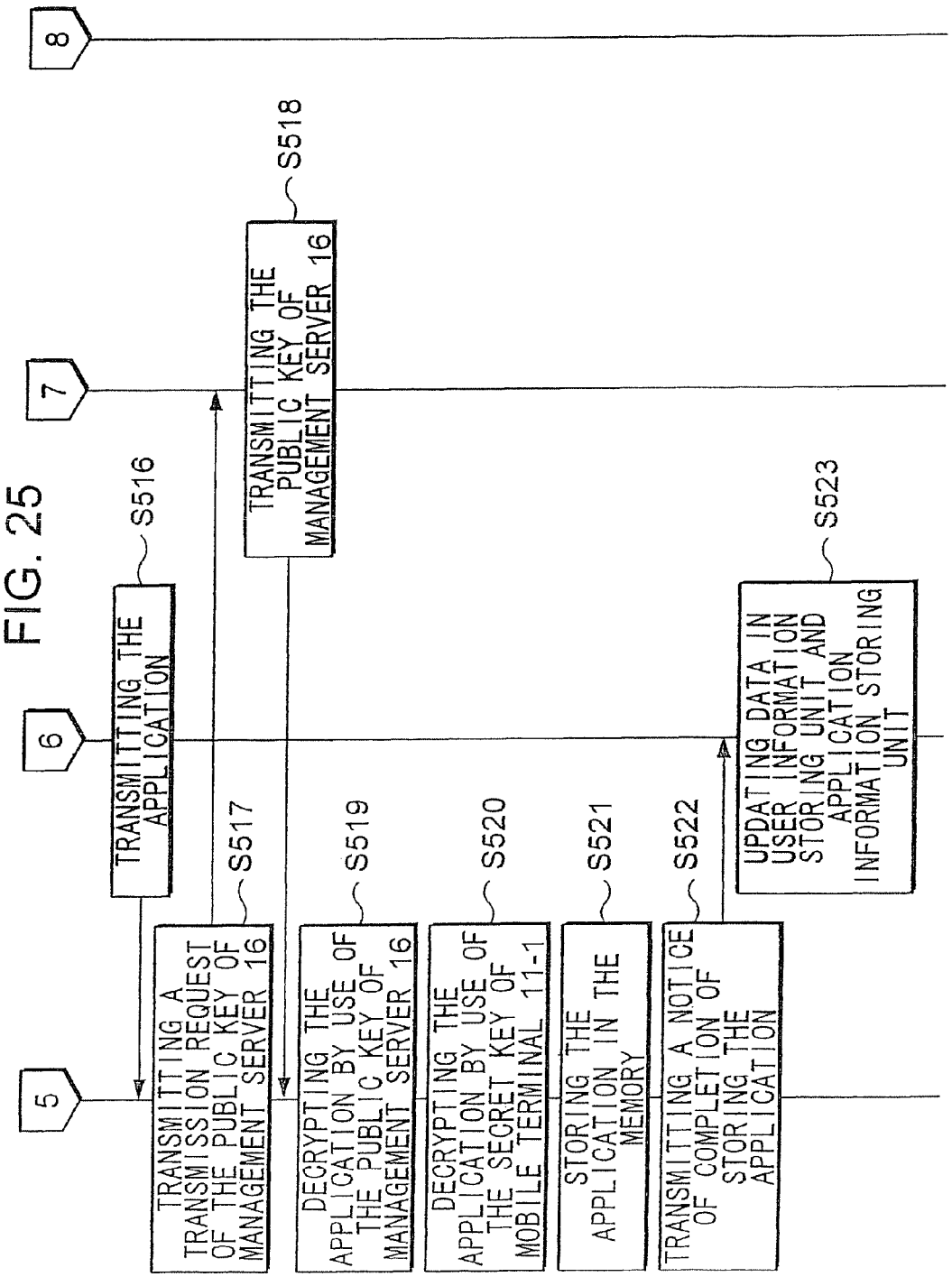

After mobile terminal 11-1 completes the operation of storing the application, mobile terminal 11-1 may transmit a completion notice indicating completion of storing of the application (step S621). After the operation in step S621, mobile terminal 11-1 may display a standby screen on display unit 21 (FIG. 2) such as screen D26 (FIG. 25).

After receiving the completion notice, management server 16 may update the data in user information storing unit 53 (FIG. 38) (step S622). More specifically, if an application is deleted from memory 12 of mobile terminal 11 to store the purchased application, management server 16 may move the information of the deleted application registered in downloaded application area 53A to download-ready application area 53B (FIG. 38). Management server 16 may also move the information of the newly stored application from download-ready application area 53B to the corresponding location in downloaded application area 53A.

The previously discussed operations of the third embodiment describes the flow of operations executed when a user of mobile terminal 11 purchases and downloads an application with a reliability index at or above a determined level such as "1" or more than "1." On the other hand, if a user of mobile terminal 11 purchases and downloads an application with a reliability index below a determined level, such as "0," management server 16 may not need to transmit a message digest and a reliability index of the application to mobile terminal 11-1. In addition, only the operations in steps S601 to S604, steps S606 to S611, steps S613 to S618, and steps S620 to S622 described in FIGS. 40-42 may be followed. Moreover, the list of applications for selecting an application for deletion that may be displayed in step S610 and in step S611 may be a list of applications stored in free area 41 (FIG. 38) instead of the list of applications stored in management area 40 (FIG. 38).

According to the previously discussed operations, a newly purchased application may be stored in memory 12 of mobile terminal 11-1, but the application may not be activated. Therefore, the user of mobile terminal 11-1 may need to execute an activation operation to make the newly purchased application usable. The activation operation in the third embodiment is similar to the activation operation of the first embodiment. The deactivation operation and the deleting operation in the third embodiment are also similar to the those operations in the first embodiment.

[4] Modifications

[4.1] First Modification

In the first modification, the application delivery system may include a plurality of management servers. The management servers may be synchronized with one another, and the data in their databases may be frequently updated. Mobile terminals or content servers that desire to communicate with a management server may choose any one of the management servers, which can speed up the communication process. According to the first modification, the overall speed of a transaction in the application delivery system may be improved. In addition, the durability of the management servers against system failures may be improved, because the management servers may carry out their tasks in a distributed processing system.

[4.2] Second Modification

In the second modification, users of mobile terminals may have several options for locations to store applications for the mobile terminals. The location options may also include storage devices in addition to internal memories of the mobile terminals. For example, the storage devices may be removable storage devices, such as several kinds of IC card memories, User Identification Modules (UIMs), and external storage devices that can be connected to the mobile terminals. According to the second modification, applications can easily be shared and moved among several mobile terminals with these removable memory devices that contain applications.

[4.3] Third Modification

In the third modification, mobile terminals may comprise input/output interfaces. The input/output interfaces may allow mobile terminals to communicate with other information terminals through cables or radio waves that are different from the mobile communication network. Therefore, mobile terminals can obtain applications from other information terminals through their input/output interfaces.

[4.4] Fourth Modification

In the fourth modification, management servers can identify the identification numbers listed in the application information storing unit of each of the applications whose contents are similar, but whose application providers are different. Moreover, if necessary, each of the applications may be given a different reliability index from other applications with similar content. For example, applications provided by reliable content providers may be given relatively high reliability indexes and applications provided by less reliable content providers may be given relatively low reliability indexes. As a result, different conditions can be given to applications having similar content.

[4.5] Fifth Modification

In the fifth modification, an application can occupy a plurality of memory areas in the memory of a mobile terminal. Therefore, even an application of a large size can be processed by a mobile terminal.

[4.6] Sixth Modification

In the sixth modification, management areas for storing applications, whose contents are examined and free areas for storing applications, whose contents are not examined may be interchangeable. The memory controller may manage application information whether an application in a memory area is given a reliability index or not. In addition, the memory controller may not mistake an application assigned a reliability index with an application that is not assigned a reliability index regardless of whether the application is in a management area or a free area. For example, if there is a shortage of free space in management areas, free areas with free space can be switched to be designated as management areas. As a result, a more efficient utilization of memory area can be achieved.

[4.7] Seventh Modification

In the seventh modification, a third party entity that is different from the administration entity of the management server may conduct examinations of applications. In addition, the third party entity may provide information on the reliability of the applications. The reliability information provided by the third party entity may be transmitted to the management server. The management server and the mobile terminals may then use the reliability information.

The third party entity may manage a content authentication server. The content authentication server may publish a certificate for an application when the application is transmitted from a content server to the management server. The certificate may be published to the management server. The management server may confirm whether the application has been changed due to falsification by the content server, etc.

For example, after examining an application, the third party entity may create a message digest of the application by use of a hash function. When the management server receives the application from a content server, the management server may transmit to the content authentication server, a request to transmit the message digest that corresponds to the application. In response to the request, the content authentication server may transmit the message digest to the management server. After receiving the message digest, the management server may create another message digest of the application by use of the same hash function that the third party entity used. The management server may verify the message digest received from the content authentication server and the newly created message digest. According to the verification, the management server can confirm that the received application is proper.

In the seventh modification, there is no need for the management server to obtain an application without encryption, since the third party entity guarantees the contents. For example, content servers can deliver applications that are encrypted using public keys of mobile terminals. The encrypted applications may be delivered to the mobile terminals through the management server. Since the management server knows due to the guarantee, that the contents of the applications are not changed, there is no need for the management server to verify the integrity of the applications. As a result, content servers can transmit applications to the management server without encrypting the applications using secret keys of the content servers.

[4.8] Eighth Modification

In the eighth modification, reliability related information may be used for managing requests made by an application to use functions or data of another application or a control program. The reliability related information may provide indications with regard to each of the relationships between the various functions and data. The various functions and data may be used for judging whether the requests should be accepted or not.

According to the eighth modification, a mobile terminal can carryout flexible control of coordinated operations. For example, application A may be allowed to call function 1 of application B but not be allowed to call function 2 of application B.

[5] Effects of the Invention

As explained above, according to methods, systems, or apparatuses of the present invention, a plurality of applications stored in the memory of a mobile terminal can be coordinated and executed. In addition, a memory controller may supervise data exchanges between the applications and requests by the applications for functions of other applications on the basis of reliability indexes given to each of the applications. Accordingly, the risk of undesirable distribution and/or destruction of high value data such as personal information and monetary data is reduced. As a result, when applications are executed in mobile terminals, both improvement of user friendliness of the mobile terminals and maintenance of information security may be realized.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

The invention claimed is:

1. An application delivery system for managing an application that is storable in a mobile terminal, the application delivery system comprising:
a mobile terminal configured to receive and store at least one application, wherein the application includes reliability information indicative of a coordinated operational relationship with other applications;
the mobile terminal comprising a memory controller, the memory controller configured to enable the execution of a first application storable in the mobile terminal;
the memory controller further configured to enable access to at least one of data and features associated with a second application storable in the mobile terminal in accordance with instructions of the first application, as a function of the reliability information of the first application.

2. The application delivery system of claim 1, wherein the mobile terminal further comprises a memory coupled with the memory controller, wherein the memory controller is configured to direct the storage and manipulation of applications that are storable in the memory as a function of the reliability information associated with each of the applications.

3. The application delivery system of claim 1, further comprising a memory coupled with the memory controller, wherein the memory controller is configured to store in and delete from the memory at least one of an application and reliability information as a function of instructions wirelessly receivable by the mobile terminal.

4. The application delivery system of claim 1, wherein the mobile terminal further comprises a control unit configured to execute the first application as a function of enablement by the memory controller.

5. The application delivery system of claim 4, wherein the memory controller is configured to read, write and delete data associated with the second application in response to a request from the control unit as a function of the reliability information of the first application.

6. An application delivery system for managing an application that is storable in a mobile terminal, the application delivery system comprising:
a mobile terminal configured to store a first application and a second application, wherein each of the first application and the second application include reliability information indicative of a coordinated operational relationship with other applications;
the mobile terminal comprising a memory controller, the memory controller configured to enable execution of the first application; and
the memory controller further configured to selectively enable access by the first application to at least one of data or features associated with the second application as a function of consideration of the reliability information of the first application and the second application.

7. The application delivery system of claim 6, wherein the memory controller is configured to receive the first application or the second application over a wireless network, the memory controller further configured to read the reliability information of the first application or the second application and store the first application or the second application in a memory location selected based on the respective reliability information that is read.

8. The application delivery system of claim 6, wherein the memory controller is further configured to selectively enable access by the first application to at least one of data or features associated with the second application in response to receipt of a request to permit use of the second application by the first application, wherein the request is transmittable to the memory controller by the first application.

9. The application delivery system of claim 8, wherein the request comprises identification of a memory area included in the mobile terminal where the second application is stored.

* * * * *